United States Patent
Sharma et al.

(10) Patent No.: US 12,223,097 B2
(45) Date of Patent: Feb. 11, 2025

(54) FAST IDENTITY ONLINE (FIDO) DEVICE ONBOARDING (FDO) PROTOCOL COMPUTING DEVICE HARDWARE ATTESTATION SYSTEM

(71) Applicant: Dell Products L.P., Round Rock, TX (US)

(72) Inventors: Anurag Sharma, Cedar Park, TX (US); Daniel E. Cummins, Hudson, NH (US); Jason Matthew Young, Round Rock, TX (US); Muzhar S. Khokhar, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 430 days.

(21) Appl. No.: 17/717,820

(22) Filed: Apr. 11, 2022

(65) Prior Publication Data

US 2023/0325535 A1  Oct. 12, 2023

(51) Int. Cl.
*G06F 21/73* (2013.01)
*G06F 21/33* (2013.01)
*G06F 21/60* (2013.01)
*G06F 21/10* (2013.01)

(52) U.S. Cl.
CPC ............. *G06F 21/73* (2013.01); *G06F 21/33* (2013.01); *G06F 21/602* (2013.01); *G06F 21/107* (2023.08)

(58) Field of Classification Search
CPC ........ G06F 21/73; G06F 21/33; G06F 21/602; G06F 21/107
USPC .......................................................... 726/17
See application file for complete search history.

(56) References Cited

U.S. PATENT DOCUMENTS

| | | | |
|---|---|---|---|
| 10,511,436 B1 * | 12/2019 | Machani | H04L 9/085 |
| 2010/0033300 A1 | 2/2010 | Brandin | |
| 2015/0178521 A1 | 6/2015 | Ching | |
| 2017/0250814 A1 | 8/2017 | Brickell et al. | |
| 2019/0340623 A1 | 11/2019 | Rivkind et al. | |
| 2021/0021432 A1 * | 1/2021 | Atkins | H04L 9/50 |

OTHER PUBLICATIONS

Fido Alliance, "Fido Device Onboard Specification," Proposed Standard, Mar. 23, 2021, 108 pages This version: https://fidoalliance.org/specs/FDO/FIDO-Device-Onboard-v1.0-PS-20210323.

* cited by examiner

*Primary Examiner* — Anthony D Brown
(74) *Attorney, Agent, or Firm* — Joseph Mencher

(57) ABSTRACT

A voucher management system receives, from a computing device manufacturer system, an ownership voucher that transfers ownership of a computing device from the computing device manufacturer system to the voucher management system, and a hardware attestation certificate for the computing device, and associates them with the computing device in a voucher management database. When the voucher management system determines that the ownership of the computing device should be transferred to an end user system, it automatically generates second ownership transfer data by signing an end user system public key with a voucher management system private key, provides the second ownership transfer data in the ownership voucher in order to transfer ownership of the computing device from the voucher management system to the end user system, and provides the ownership voucher and the hardware attestation certificate to the end user system.

20 Claims, 39 Drawing Sheets

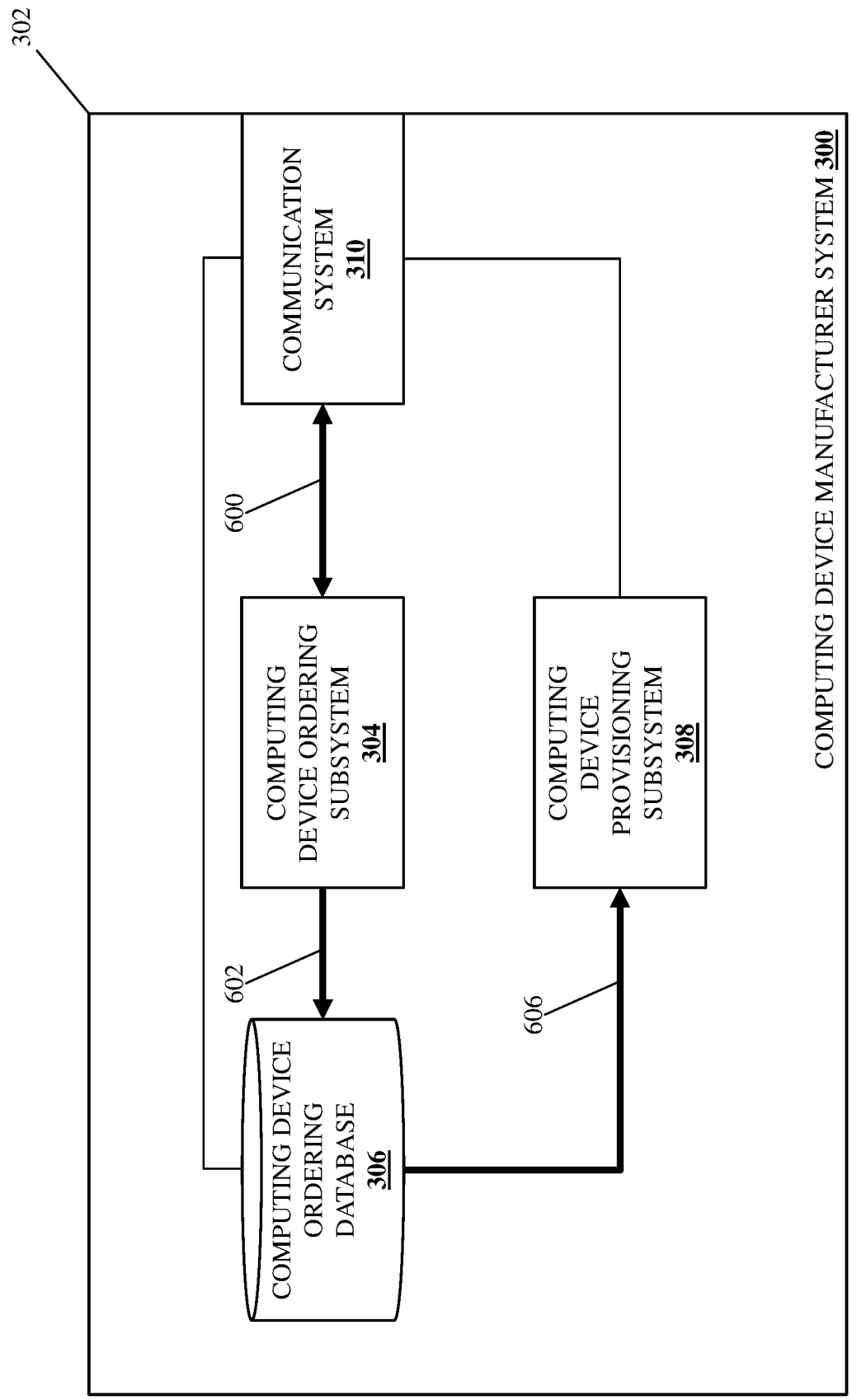

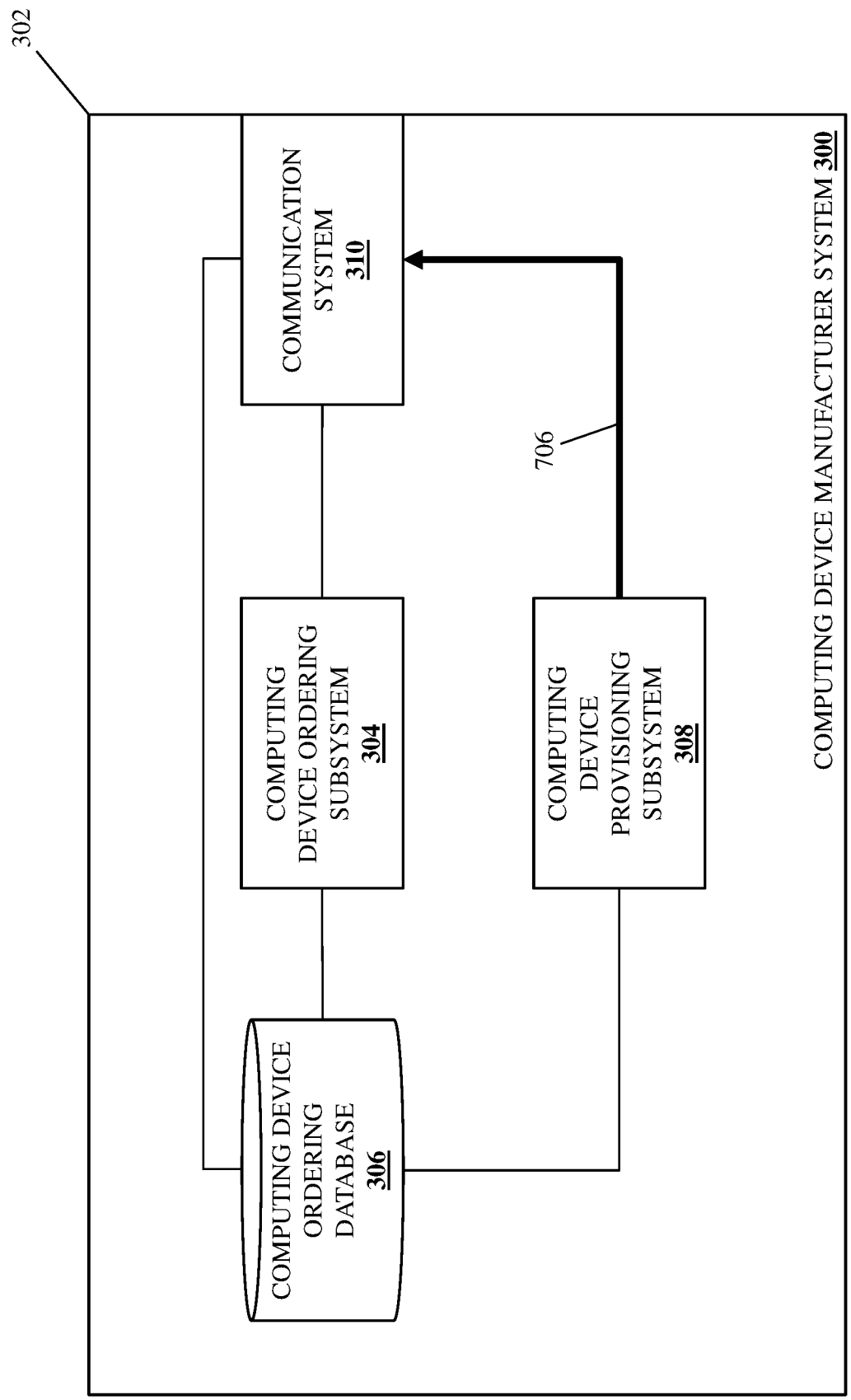

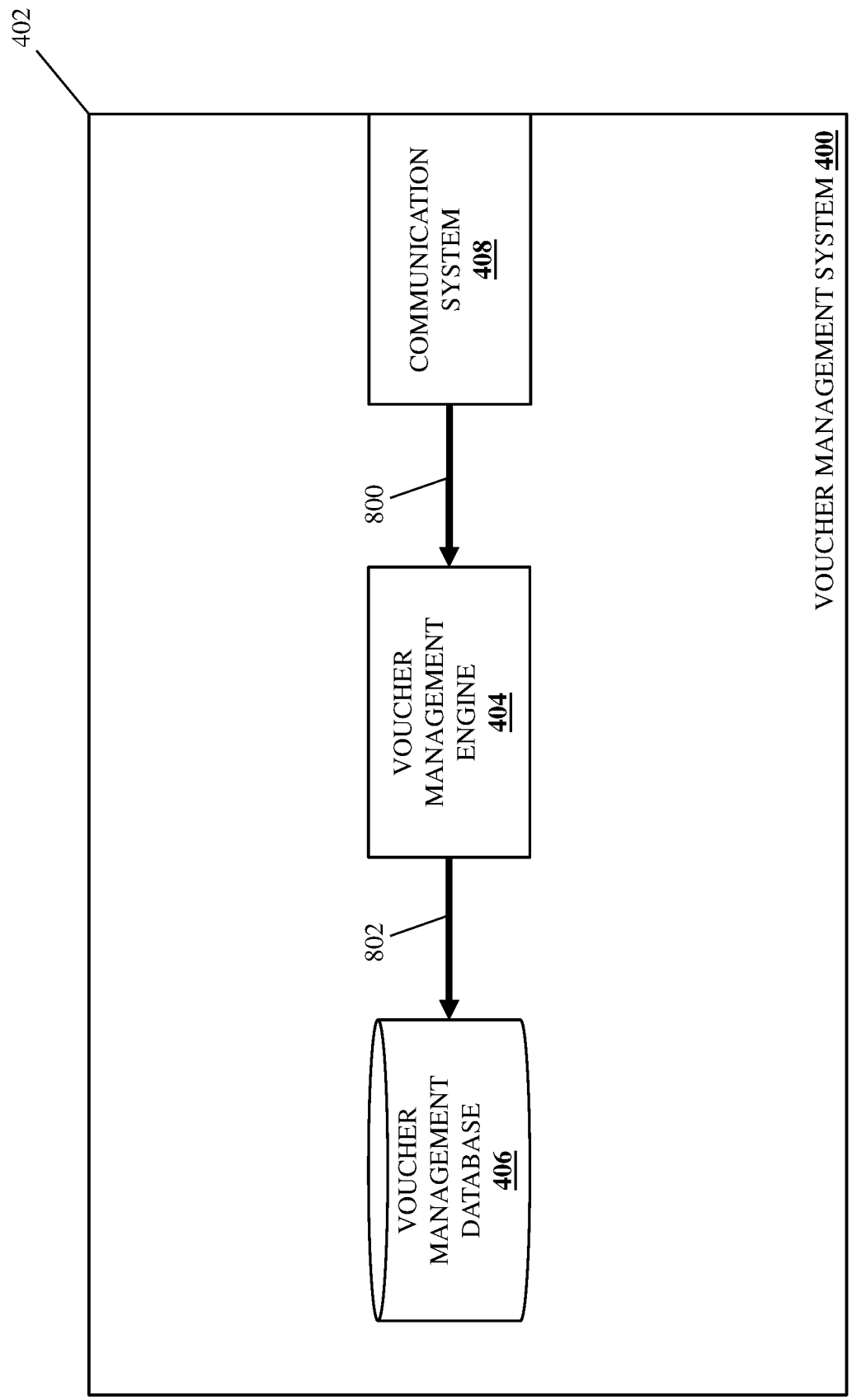

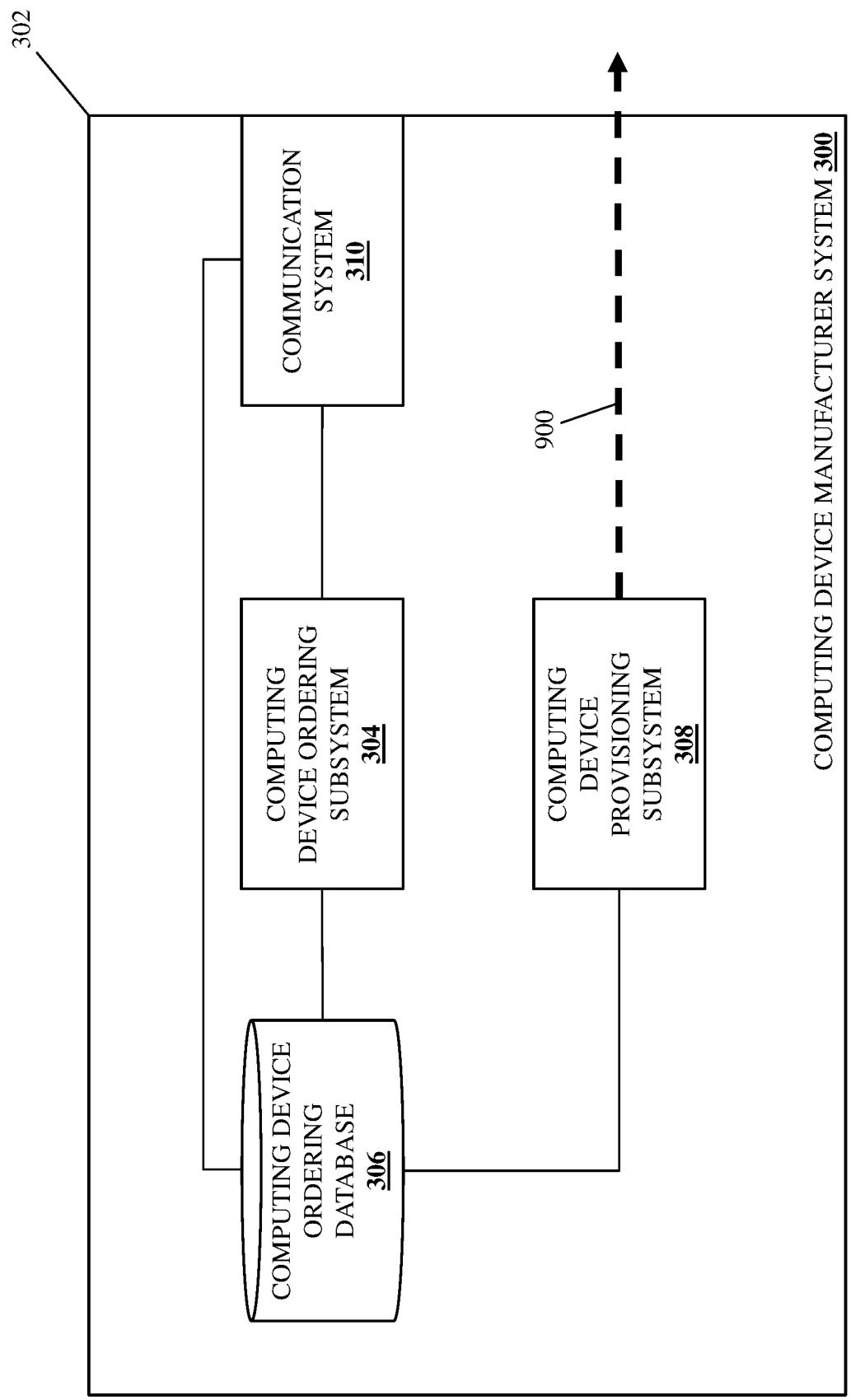

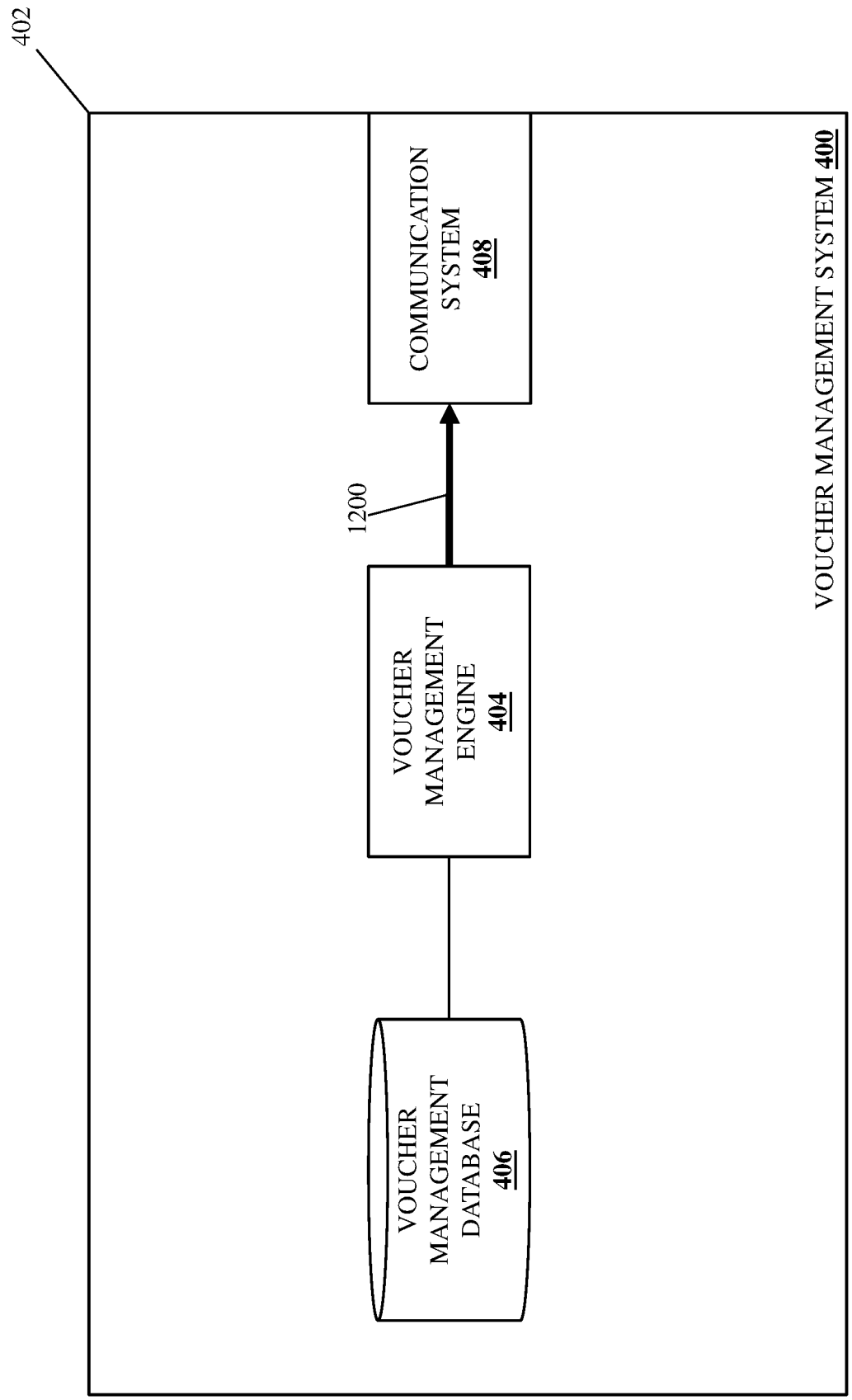

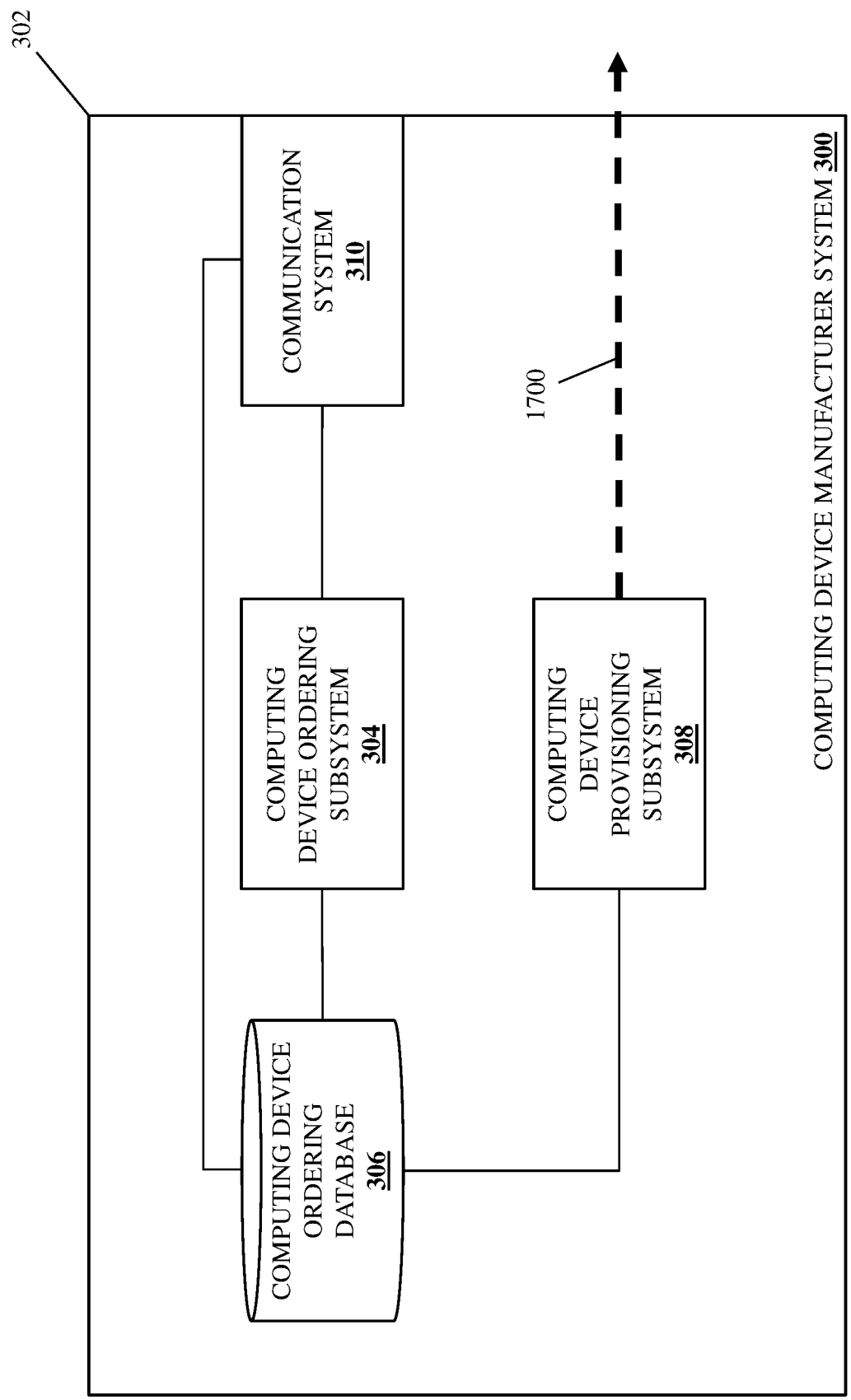

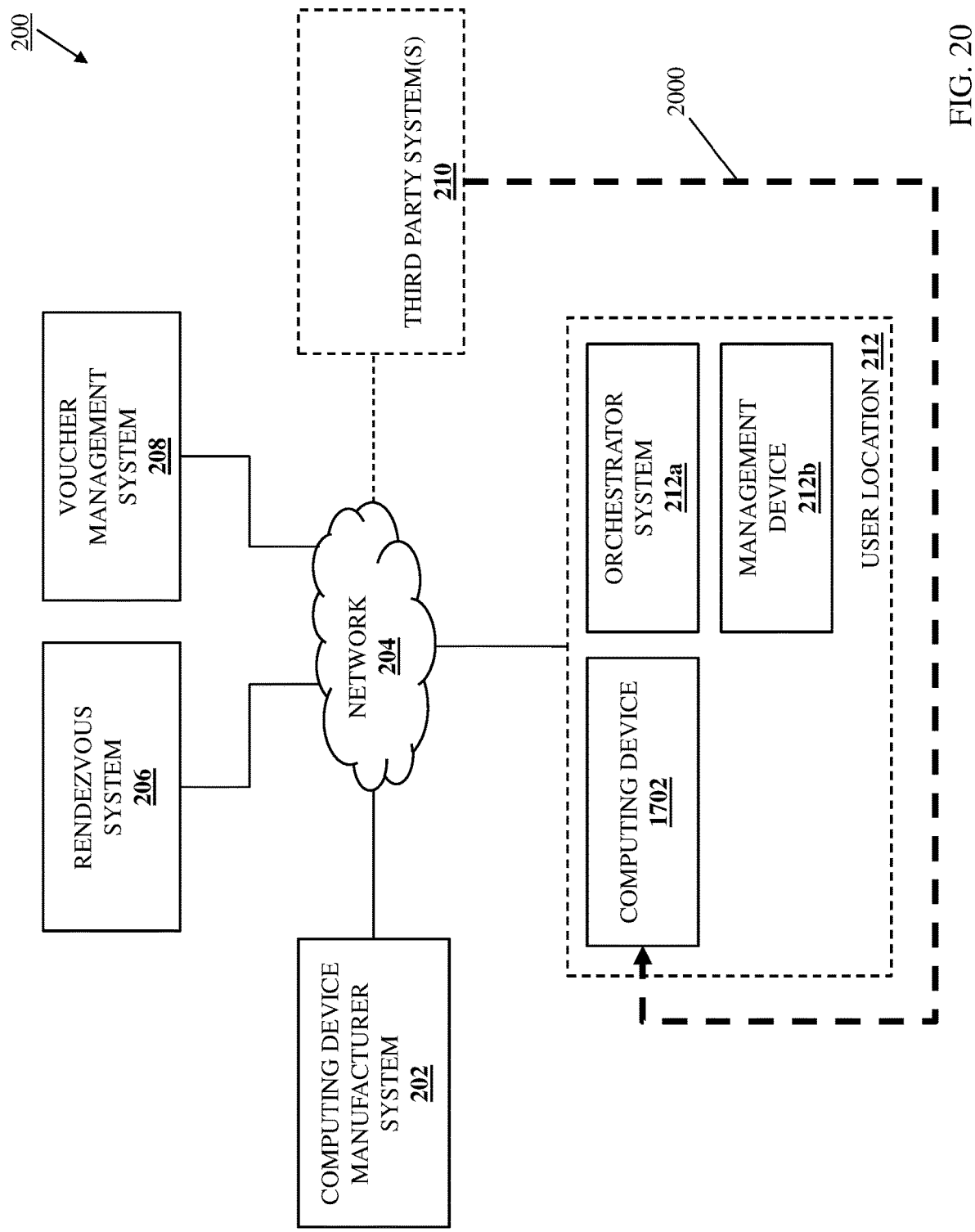

FAST IDENTITY ONLINE (FIDO) DEVICE ONBOARDING (FDO) PROTOCOL COMPUTING DEVICE HARDWARE ATTESTATION SYSTEM

BACKGROUND

The present disclosure relates generally to information handling systems, and more particularly to performing hardware attestation for information handling systems utilizing Fast IDentity Online (FIDO) Device Onboarding (FDO) protocols.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The Fast IDentity Online (FIDO) Alliance has promulgated a set of security-focused technologies and protocols ("FIDO protocols" below) intended to simplify and enhance cybersecurity. Information handling systems such as, for example, server devices and/or other computing devices known in the art, may benefit by performing authentication via the FIDO Device Onboarding (FDO) protocol, particularly when provided at the "edge" of a network ("edge computing devices"). For example a computing device manufacturer may manufacture the edge computing device using the FDO Device Initialization (DI) (FDO-DI) protocol, which provides for the generation of a public/private key pair, secure storage of the private key in the edge computing device, and inclusion of the public key in a digital ownership voucher that defines an "owner" of the edge computing device, with that digital ownership voucher configured to be transferred to using public/private key signing techniques to different "owners" of the edge computing device as it moves through the supply chain (e.g., Value-Added Resellers (VARs) and/or other resellers known the art) to an end user that provides the "last owner" of the edge computing device. However, the use of such digital ownership vouchers raises some issues.

To provide a specific example of the transfer of "ownership" of an edge computing device from a computing device manufacturer to a reseller via the FDO protocol, the computing device manufacturer will use its computing device manufacturer private key to sign a combination of edge computing device information and a reseller public key to produce first signed ownership transfer data, provide that first signed ownership transfer data in the digital ownership voucher to indicate that the reseller is the "owner" of the edge computing device, and transfer the digital ownership voucher to the reseller. The reseller may then transfer "ownership" of the edge computing device to the end user by using its reseller private key to sign a combination of edge computing device information and an end user public key to produce second signed ownership transfer data, provide that second signed ownership transfer data in the digital ownership voucher along with the first signed ownership data to indicate that the end user is the "owner" of the edge computing device, and transfer the digital ownership voucher to the end user.

As such, the FDO protocol discussed above may require "owners" of the edge computing device to store digital ownership vouchers, generate and maintain respective public/private key pairs, retrieve the public key from any new owner, combine the edge computing device information and that public key and sign it with their private key to produce signed ownership transfer data, provide signed ownership transfer data in digital ownership vouchers, and/or transfer digital ownership vouchers to new owners. As such, implementation of the FDO protocol as discussed above will require digital infrastructure transformations across the supply chain, as well as the coordination, collaboration, and education of computing device manufacturers, resellers, and end users, which will operate to slow down the adoption of the FDO protocol.

Furthermore, one of skill in the art in possession of the present disclosure will recognize that the FDO protocols discussed above operate to address security with regard to the onboarding of computing devices, but do not address security with regard to the supply chain provisioning of the computing devices to end users. As such, FDO protocols assume that the computing device shipped, delivered, and/or otherwise provided to an end user have not been tampered with (e.g., adding, removing, or modifying hardware in the computing device), but do not perform any operations that would verify that lack of tampering.

Accordingly, it would be desirable to provide a FIDO Device Onboarding (FDO) protocol computing device hardware attestation system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a voucher management engine that is configured to: receive, from a computing device manufacturer system: an ownership voucher having first ownership transfer data including a voucher management system public key that has been signed by a computing device manufacturer system private key in order to transfer ownership of a computing device from the computing device manufacturer system to the voucher management system; and a hardware attestation certificate for the computing device; associate the ownership voucher and the hardware attestation certificate with the computing device in a voucher management database; and determine that the ownership of the computing device should be transferred to the end user system and, in response: automatically generate, in response to determining that ownership of the computing device should be transferred to the end user system, second ownership transfer data by signing an end user system public key with a voucher management system private key; provide the second ownership transfer data in the ownership voucher in order to transfer ownership of the computing device from the voucher management system to the end user system; and provide the ownership voucher and the hardware attestation certificate to the end user system.

BRIEF DESCRIPTION OF THE DRAWINGS

FIG. 6B is a schematic view illustrating an embodiment of the computing device manufacturer system of FIG. 3 operating during the method of FIG. 5.

FIG. 7B is a schematic view illustrating an embodiment of the computing device manufacturer system of FIG. 3 operating during the method of FIG. 5.

FIG. 8C is a schematic view illustrating an embodiment of the voucher management system of FIG. 4 operating during the method of FIG. 5.

FIG. 9A is a schematic view illustrating an embodiment of the computing device manufacturer system of FIG. 3 operating during the method of FIG. 5.

FIG. 12A is a schematic view illustrating an embodiment of the voucher management system of FIG. 4 operating during the method of FIG. 5.

FIG. 17A is a schematic view illustrating an embodiment of the computing device manufacturer system of FIG. 3 operating during the method of FIG. 5.

FIG. 20 is a schematic view illustrating an embodiment of the networked system of FIG. 2 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
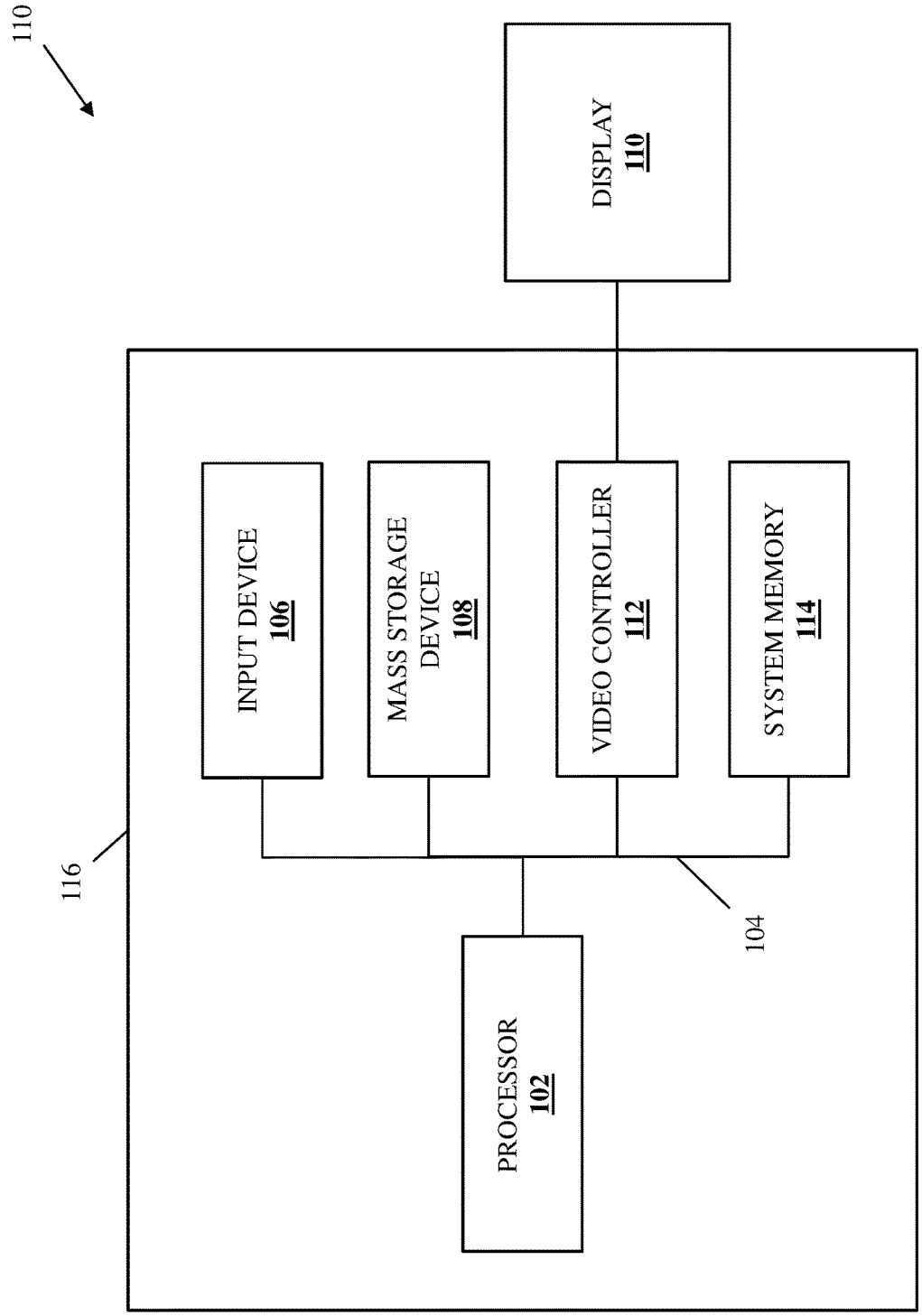
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
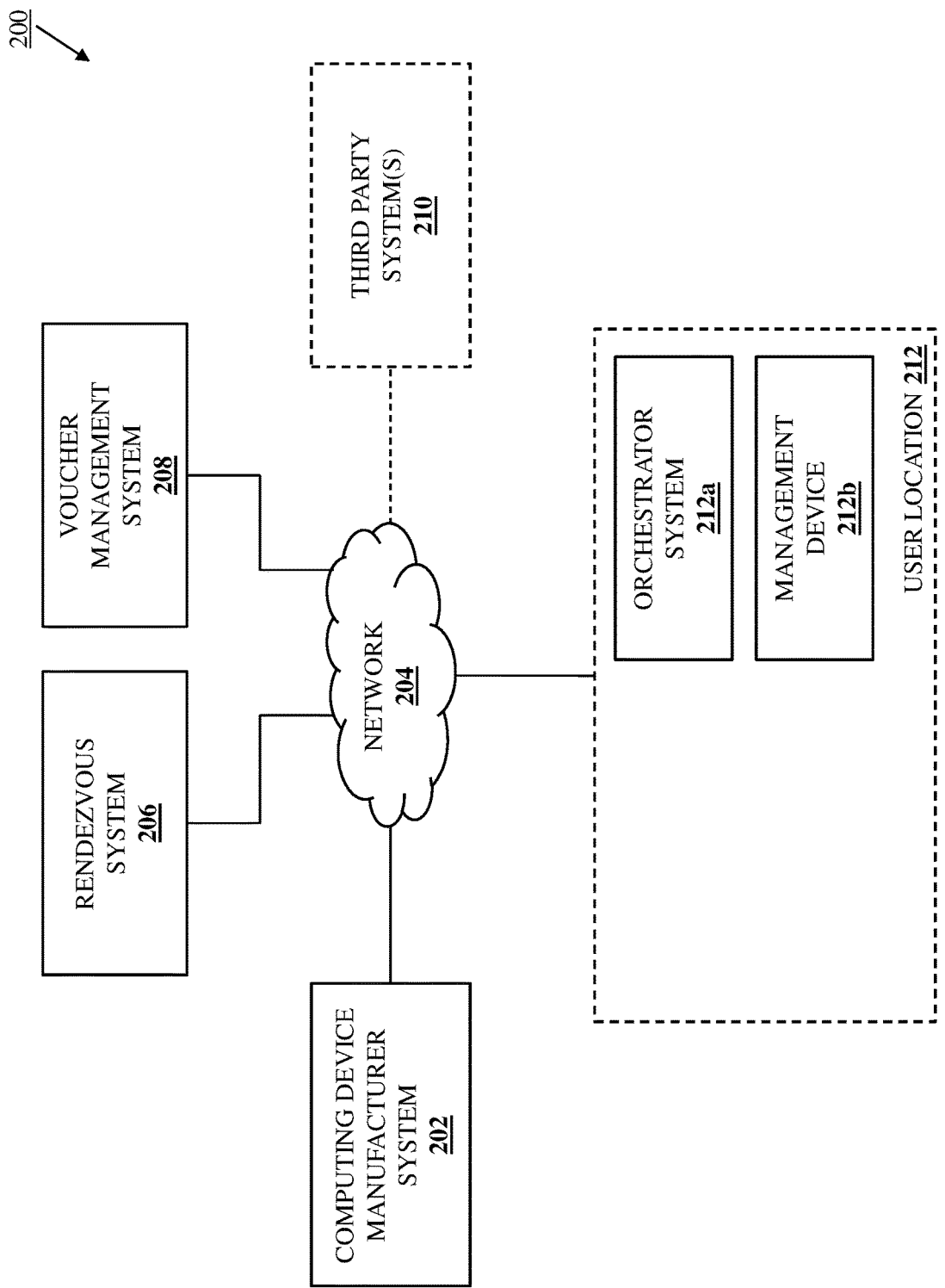
FIG. 2 is a schematic view illustrating an embodiment of a networked system that may include the FDO protocol ownership voucher management system of the present disclosure.

Referring now to FIG. 2, an embodiment of a networked system 200 is illustrated that may include the FDO protocol ownership voucher management system of the present disclosure. In the illustrated embodiment, the networked system 200 includes a computing device manufacturer system 202. In a specific example, the computing device manufacturer system 202 may be provided by DELL® Inc. of Round Rock, Texas, United States, although computing device manufacturing systems provided by other computing device manufacturers will fall within the scope of the present disclosure as well. In an embodiment, the computing device manufacturer system 202 may include one or more of the IHS 100 discussed above with reference to FIG. 1, and is discussed below as including a variety of computing device manufacturer subsystems that allow for the manufacture and provisioning of computing devices to end users and/or third parties (e.g., the resellers discussed herein). However, while illustrated and discussed as being provide by particular subsystems and devices, one of skill in the art in possession of the present disclosure will recognize that computing device manufacturer system 202 provided in the networked system 200 may include any subsystems and/or devices that may be configured to operate similarly as the computing device manufacturer system 202 discussed below. In the illustrated embodiment, the computing device manufacturing system 202 includes one or more devices coupled to a network 204 that may be provided by a Local Area Network (LAN), the Internet, combinations thereof, and/or any of a variety of other networks that would be apparent to one of skill in the art in possession of the present disclosure.

In the illustrated embodiment, the networked system 200 also includes a rendezvous system 206 that is coupled to the network 204. In an embodiment, the rendezvous system 206 may be provided by the IHS 100 discussed above with reference to FIG. 1 and/or may include some or all of the components of the IHS 100, and in the specific examples below is described as being provided by one or more server devices. However, while illustrated and discussed as being provided by server device(s), one of skill in the art in possession of the present disclosure will recognize that the functionality of the rendezvous system 206 discussed below may be provided by other devices that are configured to operate similarly as the rendezvous system 206 discussed below. The networked system 200 also includes a voucher management system 208 that is coupled to the network 204. In an embodiment, the voucher management system 208 may be provided by the IHS 100 discussed above with reference to FIG. 1 and/or may include some or all of the components of the IHS 100, and in the specific examples below is described as being provided by one or more server devices. However, while illustrated and discussed as being provided by server device(s), one of skill in the art in possession of the present disclosure will recognize that the functionality of the voucher management system 208 discussed below may be provided by other devices that are configured to operate similarly as the voucher management system 208 discussed below.

The embodiment illustrated in FIG. 2 illustrates how one or more third-party systems 210 may optionally be coupled to the network 204 (as indicated by the dashed lines used for the third-party system(s) 210). In specific examples, any of the third-party subsystem(s) 210 may be provided by Value-Added Resellers (VARs) and/or other resellers known in the art. In an embodiment, any of the third-party subsystem(s) 210 may include one or more of the IHS 100 discussed above with reference to FIG. 1, and are discussed below and including a variety of third party subsystems that allow for the reselling of computing devices manufactured by the computing device manufacturer system 202 to an end user. However, while described as being provided by particular subsystems and devices, one of skill in the art in possession of the present disclosure will recognize that third-party subsystem(s) 210 provided in the networked system 200 may include any subsystems and/or devices that may be configured to operate similarly as the third-party subsystem(s) 210 discussed below.

In the illustrated embodiment, the networked system 200 also includes a user location 212 that includes a plurality of devices that are coupled to the network 204, and that may be any location at which an end user may receive a computing device manufactured by the computing device manufacturer system 202. In the specific example illustrated in FIG. 2, the user location 212 includes an orchestrator system 212a that is coupled to the network 204. In an embodiment, the orchestrator system 212a may be provided by the IHS 100 discussed above with reference to FIG. 1 and/or may include some or all of the components of the IHS 100, and in the specific examples below is described as being provided by a virtual machine that may run on one or more server devices to perform edge computing device orchestration for edge computing devices. However, while illustrated and discussed as being provided by a virtual machine running on particular device(s) and performing particular edge computing device orchestration functionality, one of skill in the art in possession of the present disclosure will recognize that the orchestrator system 212a discussed below may be provided by other devices that are configured to operate similarly as the orchestrator system 212a discussed below.

In the specific example illustrated in FIG. 2, the user location 212 includes a management device 212b that is coupled to the network 204. In an embodiment, the management device 212b may be provided by the IHS 100 discussed above with reference to FIG. 1 and/or may include some or all of the components of the IHS 100, and in the specific examples below is described as being provided by a desktop computing device, a laptop/notebook computing device, a tablet computing device, a mobile phone, etc. However, while illustrated and discussed as being provided by particular device(s), one of skill in the art in possession of the present disclosure will recognize that the functionality of the management device 212b discussed below may be provided by other devices that are configured to operate similarly as the management device 212b discussed below. As such, while a specific networked system 200 has been illustrated and described, one of skill in the art in possession of the present disclosure will recognize that the FDO protocol ownership voucher management system of the present disclosure may be provided with a variety of components and component configurations while remaining within the scope of the present disclosure as well.

In the embodiment illustrated in FIG. 2, the rendezvous system 206 is illustrated as coupled to each of the computing device manufacturer system 202 and the user location 212 via the network 204, although one of skill in the art in possession of the present disclosure will appreciate how the rendezvous system 206 may be provided in a variety of manners that will fall within the scope of the present disclosure. For example, the rendezvous system 206 may be provided by the computing device manufacturer system 202, and continuing with the example above in which the computing device manufacturer is DELL® Inc. of Round Rock, Texas, United States, the rendezvous system 206 may be reachable via computing device manufacturer rendezvous system reachability information (e.g., "rendezvous.dell.com"), with the computing device manufacturer system 202 configuring the computing devices discussed below with that computing device manufacturer rendezvous system reachability information during manufacture in such scenarios. In another example, the rendezvous system 206 may be provided by third party system(s) 210 (a VAR in this example), and may be reachable via third party rendezvous system reachability information (e.g., "rendezvous.var.com"), with the computing device manufacturer system 202 configuring the computing devices discussed below with the third party rendezvous system reachability information during manufacture in such scenarios. Further still, in some embodiments, the rendezvous system 206 may be provided by the end user or at the user location 212, and the end user may map (e.g., using Domain Name Server (DNS) mapping techniques) end user rendezvous system reachability information (e.g., "rendezvous.enduser.com") to the computing device manufacturer rendezvous system reachability information or the third party rendezvous system reachability information discussed above in such scenarios.

Figure 3:
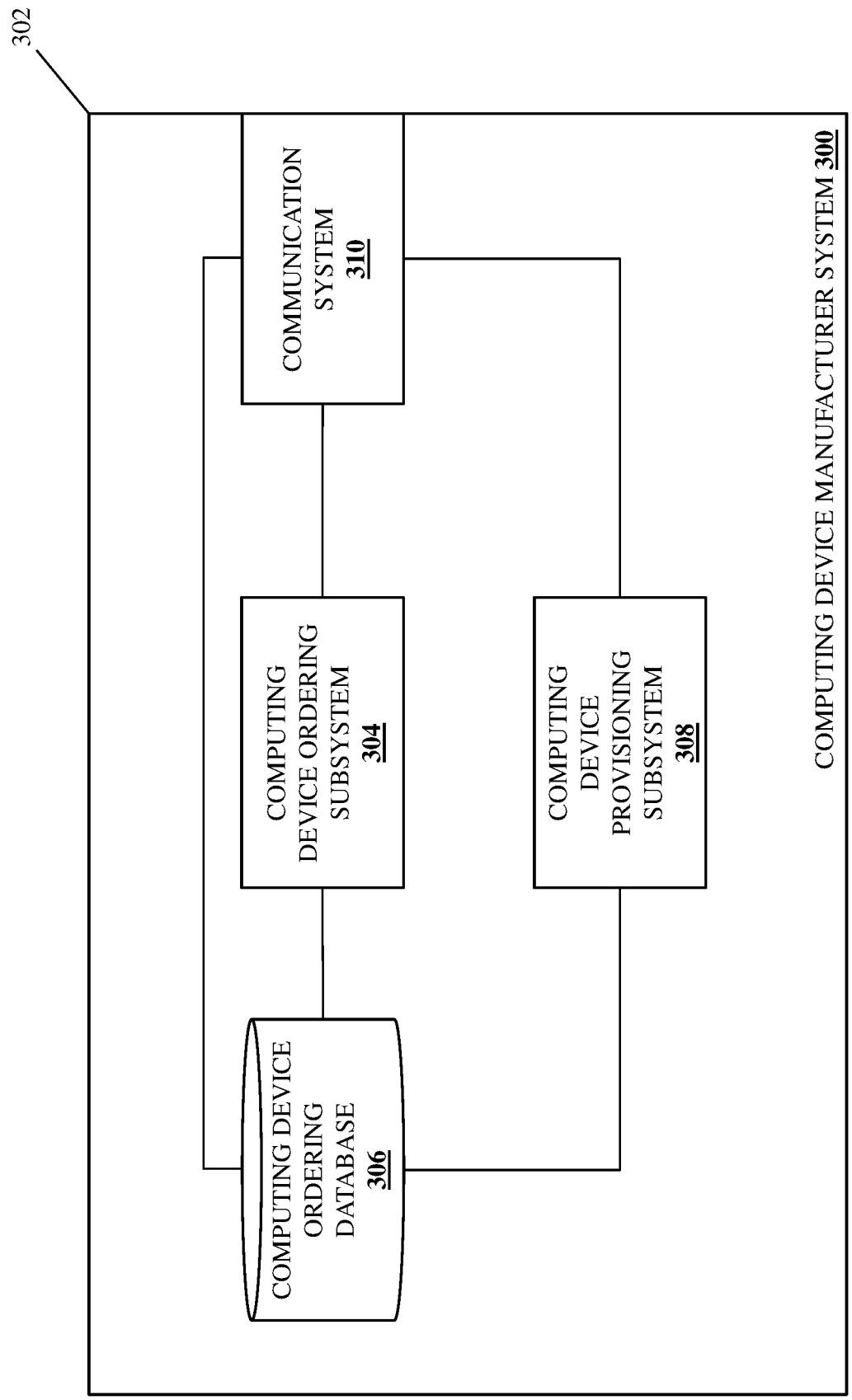
FIG. 3 is a schematic view illustrating an embodiment of a computing device manufacturer system that may be included in the networked system of FIG. 2.

Referring now to FIG. 3, an embodiment of a computing device manufacturer system 300 is illustrated that may provide the computing device manufacturer system 202 discussed above with reference to FIG. 2. As such, the computing device manufacturer system 300 may include one or more of the IHS 100 discussed above with reference to FIG. 1, and is discussed below as including a variety of computing device manufacturer subsystems that allow for the manufacture and provisioning of computing devices to end users and/or third parties. In specific examples the computing device manufacturer system 300 may be provided by DELL® Inc. of Round Rock, Texas, United States (although computing device manufacturing systems provided by other computing device manufacturers will fall within the scope of the present disclosure as well).

In the illustrated embodiment, the computing device manufacturer system 300 includes one or more computing device manufacture locations 302 that one of skill in the art in possession of the present disclosure will recognize may include one or more facilities utilized by a computing device manufacturer to manufacture and provide computing devices to end users and/or third parties (e.g., the resellers discussed herein). For example, the computing device manufacture location(s) 302 may include a computing device ordering subsystem 304. In an embodiment, the computing device ordering subsystem 304 may be provided by the IHS 100 discussed above with reference to FIG. 1 and/or may include some or all of the components of the IHS 100, and in the specific examples below is described as being provided by one or more server devices that are configured to provide for the ordering of computing devices from a computing device manufacturer. However, while illustrated and discussed as being provided by server device(s), one of skill in the art in possession of the present disclosure will recognize that the functionality of the computing device ordering subsystem 304 discussed below may be provided by other devices that are configured to operate similarly as the computing device ordering subsystem 304 discussed below.

The computing device manufacture location(s) 302 may also house one or more storage systems that are coupled to the computing device ordering subsystem 304 and that provide a computing device ordering database 306 that is configured to store computing device order information associated with the ordering of any computing devices from a computing device manufacturer. The computing device manufacture location(s) 302 may also include a computing device provisioning subsystem 304 that is coupled to the computing device ordering database 306 (e.g., via a coupling to the storage system). In an embodiment, the computing device provisioning subsystem 304 may include one or more of the IHS 100 discussed above with reference to FIG. 1, as well as any subsystems that one of skill in the art in possession of the present disclosure will appreciate are configured to manufacture computing devices and provide those computing devices to end users and/or third parties (e.g., the resellers discussed herein). However, while illustrated and discussed as being provided by particular devices and subsystems, one of skill in the art in possession of the present disclosure will recognize that the functionality of the computing device provisioning subsystem 304 discussed below may be provided by other devices and/or subsystems that are configured to operate similarly as the computing device provisioning subsystem 304 discussed below.

The computing device manufacture location(s) 302 may also house a communication system 308 that is coupled to the computing device ordering subsystem 304, the computing device provisioning subsystem 308, and the computing device ordering database 306 (e.g., via a coupling between the communication system 308 and the storage subsystem) and that may be provided by Network Interface Controllers (NICs), wireless communication systems (e.g., BLUETOOTH®, Near Field Communication (NFC) components, WiFi components, cellular components etc.), and/or any other communication components that would be apparent to one of skill in the art in possession of the present disclosure will recognize as allowing the network communications to and from the computing device manufacturer system 300 described below. However, while a specific computing device manufacturer system 300 has been illustrated and described, one of skill in the art in possession of the present disclosure will recognize that computing device manufacturer systems (or other devices and/or subsystems operating according to the teachings of the present disclosure in a manner similar to that described below for the computing device manufacturer system 300) may include a variety of components and/or component configurations for providing conventional computing device manufacturer functionality, as well as the functionality discussed below, while remaining within the scope of the present disclosure as well.

Figure 4:
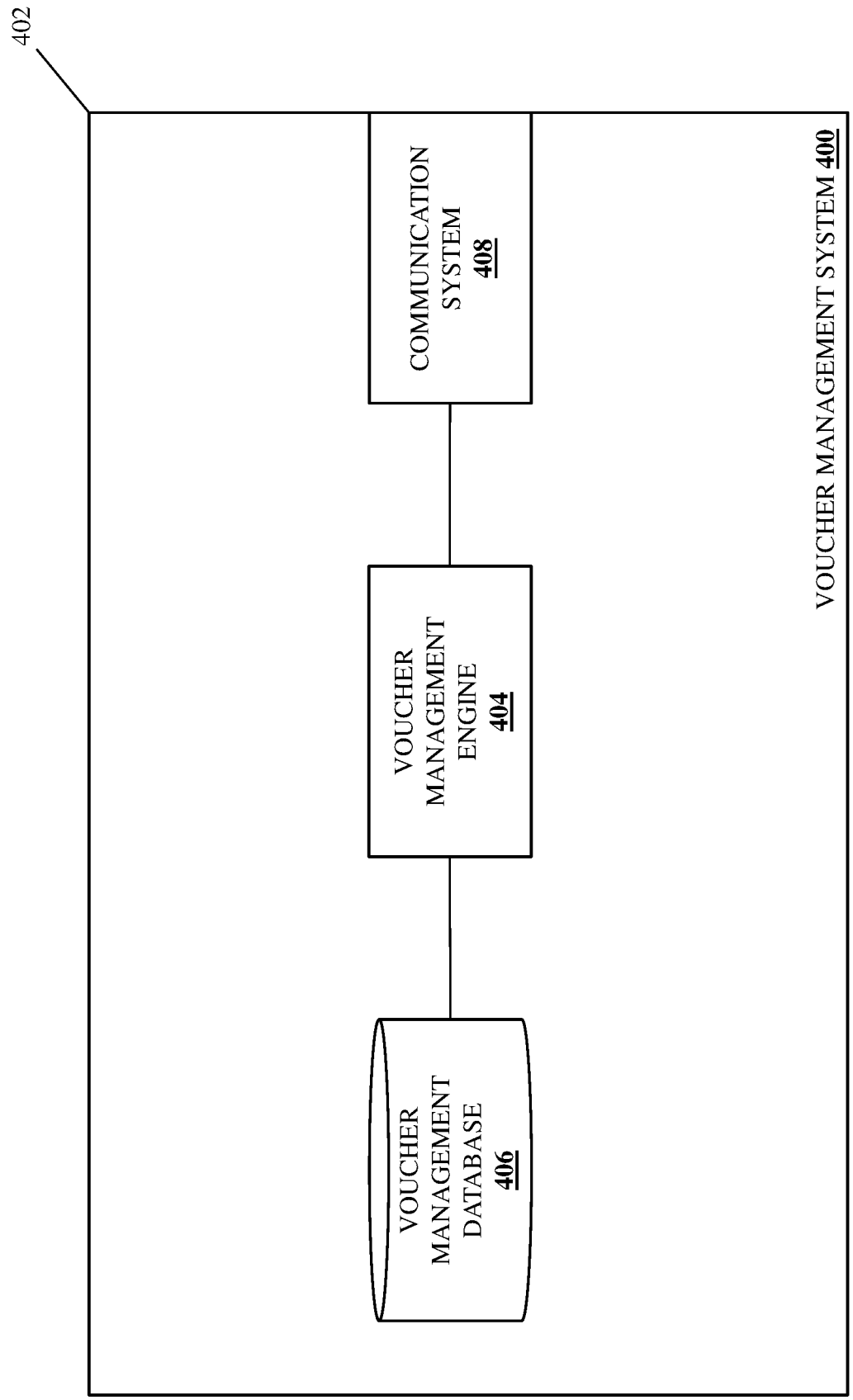
FIG. 4 is a schematic view illustrating an embodiment of a voucher management system that may be included in the networked system of FIG. 2 and that may provide the FDO protocol ownership voucher management system of the present disclosure.

Referring now to FIG. 4, an embodiment of a voucher management system 400 is illustrated that may provide the voucher management system 208 discussed above with reference to FIG. 2. As such, the voucher management system 400 may be provided by the IHS 100 discussed above with reference to FIG. 1 and/or may include some or all of the components of the IHS 100, and in specific examples may be provided by one or more server devices. Furthermore, while illustrated and discussed as being provided by server device(s), one of skill in the art in possession of the present disclosure will recognize that the functionality of the voucher management system 400 discussed below may be provided by other devices that are configured to operate similarly as the voucher management system 400 discussed below. In the illustrated embodiment, the voucher management system 400 includes a chassis 402 that houses the components of the voucher management system 400, only some of which are illustrated and discussed below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a voucher management engine 404 that is configured to perform the functionality of the voucher management engines, voucher management subsystems, and/or voucher management systems discussed below.

The chassis 402 may also house a storage system (not illustrated, but which may include the storage 108 discussed above with reference to FIG. 1) that is coupled to the voucher management engine 404 (e.g., via a coupling between the storage system and the processing system) and that includes a voucher management database 406 that is configured to store any of the information utilized by the voucher management engine 404 discussed below. The chassis 402 may also house a communication system 408 that is coupled to the voucher management engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific voucher management system 400 has been illustrated and described, one of skill in the art in possession of the present disclosure will recognize that voucher management system (or other devices operating according to the teachings of the present disclosure in a manner similar to that described below for the voucher management system 400) may include a variety of components and/or component configurations for providing conventional voucher management functionality, as well as the functionality discussed below, while remaining within the scope of the present disclosure as well.

Figure 5A:
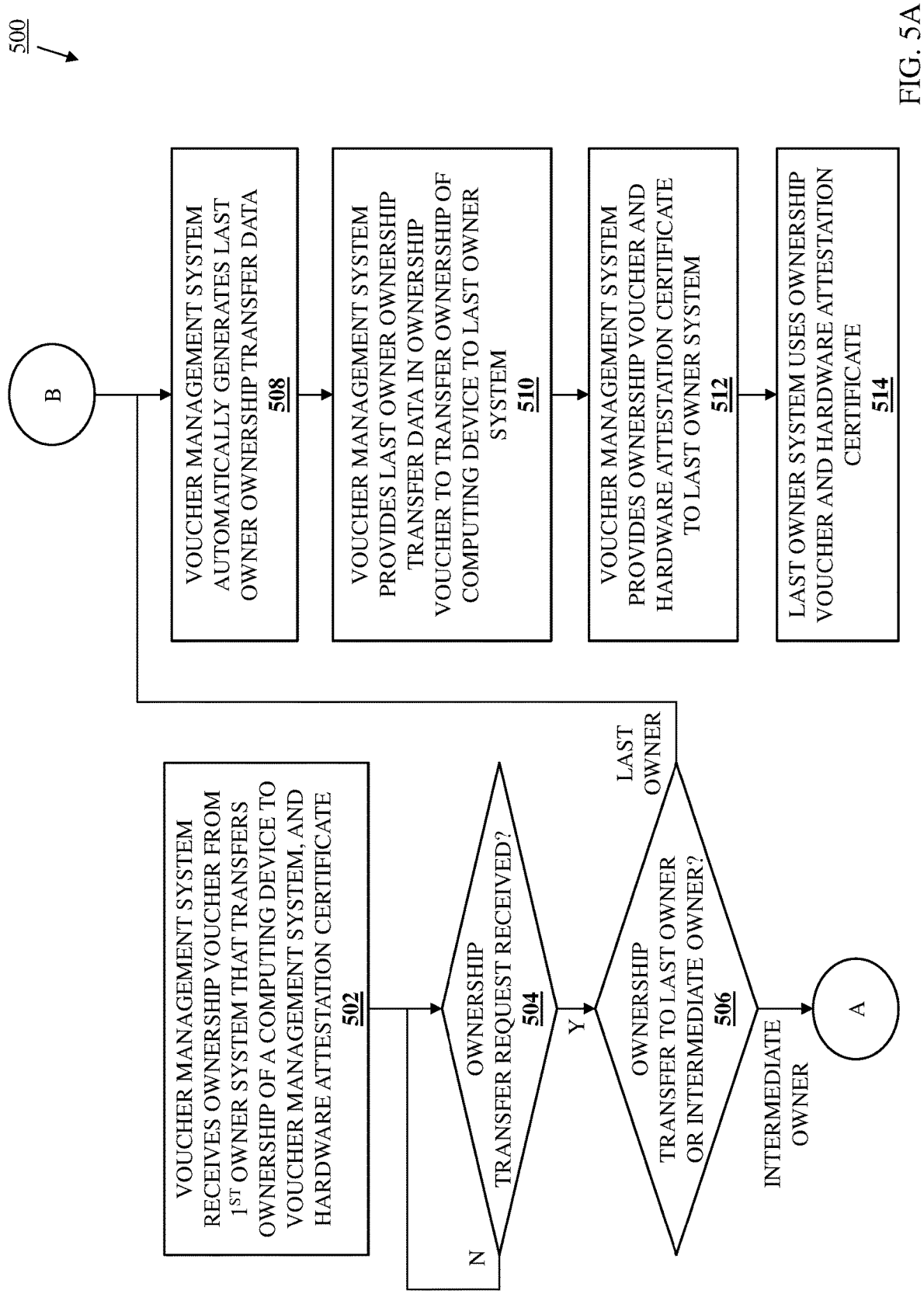
FIG. 5A is a flow chart illustrating an embodiment of a portion of a method for managing ownership vouchers.
Figure 5B:
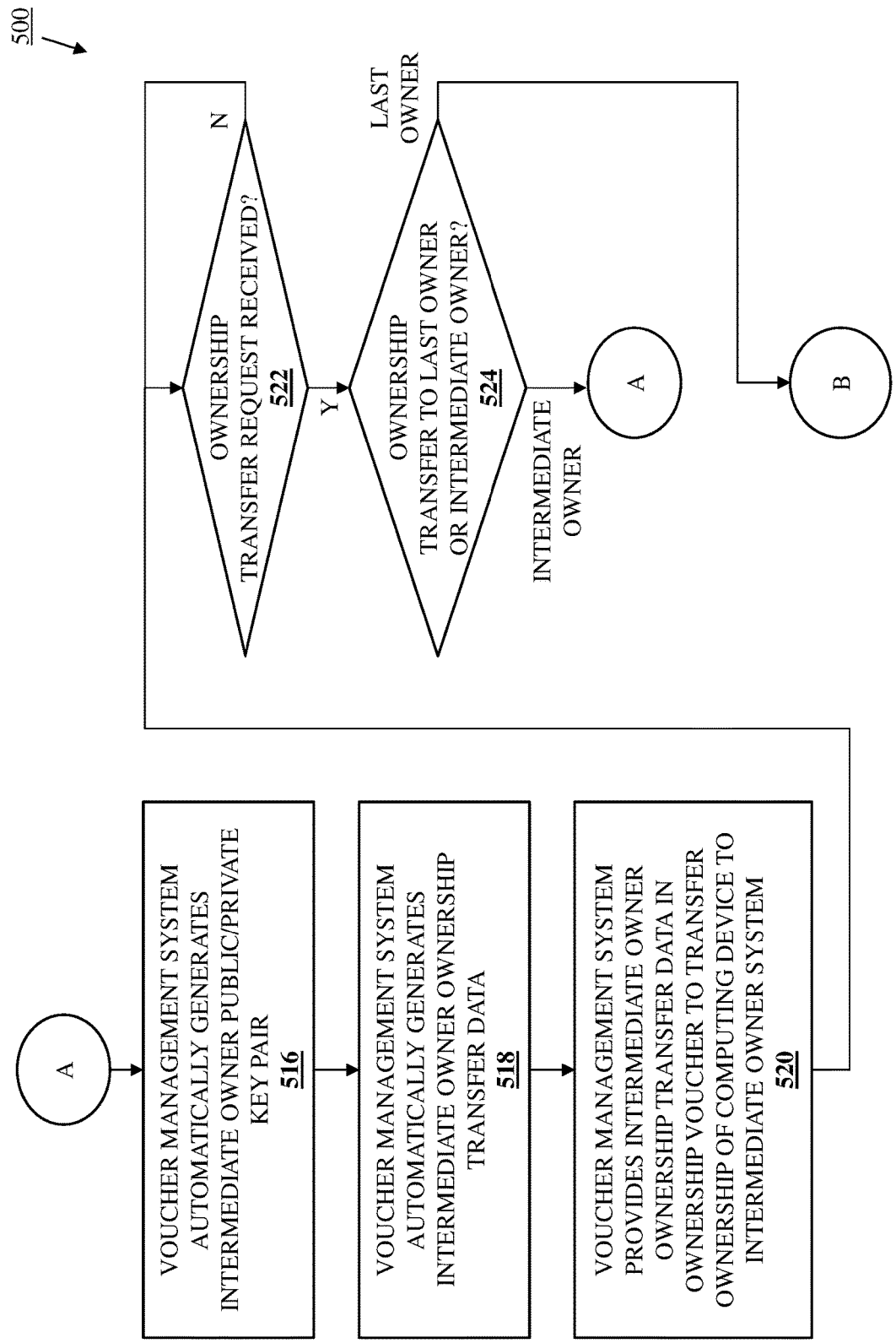
FIG. 5B is a flow chart illustrating an embodiment of a portion of the method for managing ownership vouchers of FIG. 5A.

Referring now to FIGS. 5A and 5B, an embodiment of a method 500 for managing ownership vouchers is illustrated. As discussed below, the systems and methods of the present disclosure provide an ownership voucher management system that manages ownership vouchers utilized in the FDO protocol and hardware attestation certificates in order to facilitate the transfer of ownership of a computing device from a first owner to a last owner, and in some cases between one or more intermediate owners between the first owner and the last owner, while also providing for verification that hardware in the computing device has not been modified. For example, the FIDO protocol ownership voucher management system of the present disclosure may be provided in a networked system including a first owner system and a second owner system coupled to a voucher management system. The voucher management system receives, from the first owner system, an ownership voucher having first ownership transfer data including a voucher management system public key that has been signed by a first owner system private key in order to transfer ownership of a computing device from the first owner system to the voucher management system, as well as a hardware attestation certificate. The voucher management system determines that the ownership of the computing device should be transferred to the second owner system and, in response, automatically generates second ownership transfer data by signing a second owner system public key with a voucher management system private key, and provides the second ownership transfer data in the ownership voucher in order to transfer ownership of the computing device from the voucher management system to the second owner system, and provides the hardware attestation certificate to the second owner system. As such, the transfer ownership of a computing device between owners in a supply chain using ownership vouchers according to the FIDO protocol is simplified for owners, while also providing for the verification that hardware in those computing devices has not been modified.

Figure 6A:
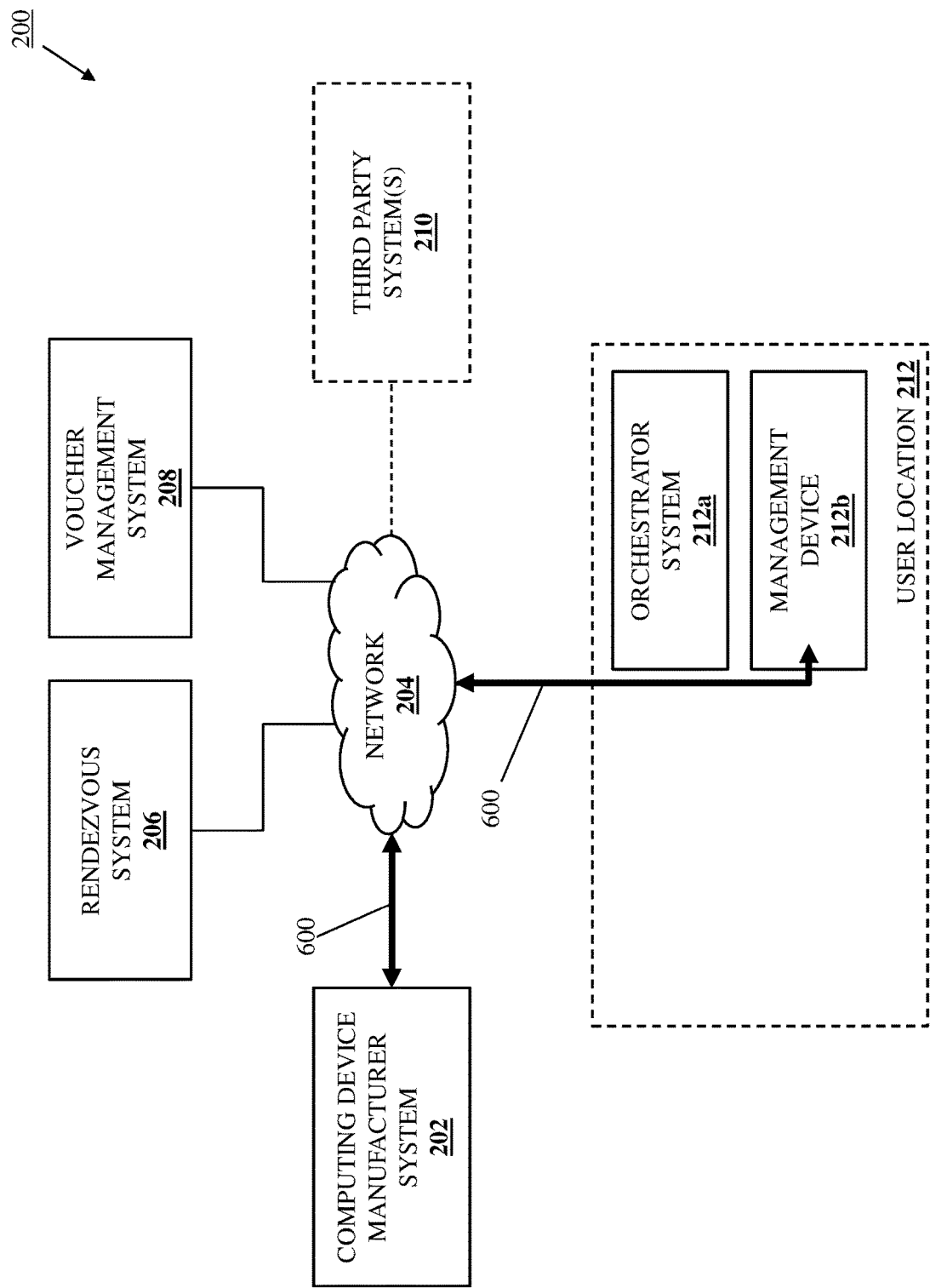
FIG. 6A is a schematic view illustrating an embodiment of the networked system of FIG. 2 operating during the method of FIG. 5.

The method 500 begins at block 502 where a voucher management system receives an ownership voucher from a first owner system that transfers ownership of a computing device to the voucher management system, and a hardware attestation certificate. In an embodiment, during or prior to the method 500, an "end user" at the user location 212 (also called a "last owner" below) may order a computing device from the computing device manufacturer system 202 (the "first owner system" in this example). For example, with reference to FIGS. 6A and 6B, the management device 212b may perform computing device ordering operations 600 that include exchanging computing device ordering communications via the network 204 and with the computing device ordering subsystem 304 in the computing device manufacturing system 300 via the communication system 310. As illustrated in FIG. 6B, the computing device ordering subsystem 304 may then perform computing device ordering information storage operations 602 that include storing any of a variety of computing device ordering information generated during the computing device ordering operations 600 in the computing device ordering database 306 included in the computing device manufacturer system 300 (e.g., a sales database at a computing device manufacturer). Furthermore, the computing device provisioning subsystem 308 in the computing device provisioning subsystem 300 may perform computing device ordering information utilization operations 606 to utilize any of the computing device ordering information stored in the computing device ordering database 306 in order to provide for the manufacture of the computing device that was ordered by the end user.

In a specific example, the manufacture of the computing device ordered by the end user may include performing any of a variety of other computing device manufacturing operations that one of skill in the art in possession of the present disclosure would recognize as providing for the functionality discussed below. For example, the manufacture of the computing device ordered by the end user may include operating and utilizing information according to the FDO-DI protocol to provide a "pointer" (e.g., the rendezvous system reachability information discussed above) to the rendezvous system 206 in the computing device, generate a public/private key pair (e.g., a computing device public key and a corresponding computing device private key), and generate a hash of the computing device manufacturer public key, and storing the pointer, computing device private key, and the hash of the computing device manufacturer key in the computing device (e.g., using a Trusted Execution Environment (TEE) such as a Trusted Platform Module (TPM) in the computing device). In a specific example, the manufacture of the computing device may include providing an FDO client in the TEE in the computing device that operate to maintain device ownership credentials provided by the rendezvous system reachability information/pointer, the computing device private key, and the hash of the computing device manufacturer public key.

Figure 7A:
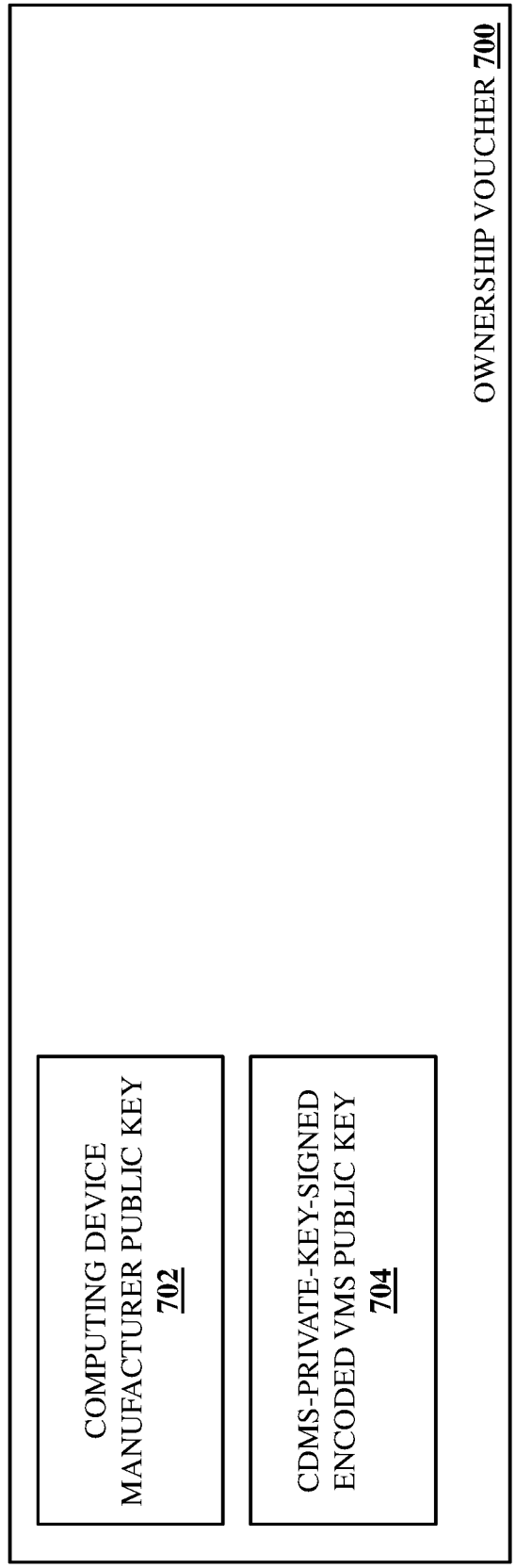
FIG. 7A is a schematic view illustrating an embodiment of an ownership voucher that may be generated during the method of FIG. 5.

In an embodiment, at block 502, the computing device provisioning subsystem 308 may perform computing device ownership transfer operations that include generating an ownership voucher for the computing device ordered by the end user, and using the ownership voucher to transfer ownership of the computing device ordered by the end user to the voucher management system 208. With reference to FIG. 7A, the computing device provisioning subsystem 308 may generate an ownership voucher 700 that includes a computing device manufacturer public key 702 of the computing device manufacturer (e.g., a computing device manufacturer public key hash value generated by performing a hashing operation on a computing device manufacturer public key). Furthermore, the computing device provisioning subsystem 308 may use the ownership voucher 700 to transfer ownership of the computing to the voucher management system 208 by using a computing device manufacturer system (CDMS) private key controlled by the computing device manufacturer to sign an encoded voucher management system (VMS) public key of the voucher management system 208 to generate a CDMS-private-key-signed encoded VMS public key 704, and providing that CDMS-private-key-signed encoded VMS public key 704 in the ownership voucher 700. However, while a simplified version of the ownership voucher 700 is illustrated and described below, one of skill in the art in possession of the present disclosure will recognize that an ownership voucher provided according to the FDO protocol may include a hash of the computing device public key, the computing device manufacturer public key, and the computing device public key.

In a specific example, the computing device provisioning subsystem 308 may generate the CDMS-private-key-signed encoded VMS public key 704 according to the FDO protocol by retrieving a VMS public key of the voucher management system 208, and performing a hashing operation on a combination of that VMS public key, a Globally Unique IDentifier (GUID) for the computing device that was ordered by the end user, computing device information associated with the computing device that was ordered by the end user (e.g., serial number(s), Media Access Control (MAC) address(es), etc.), and/or other any other information that would be apparent to one of skill in the art in possession of the present disclosure, in order to generate an encoded VMS public key. The computing device provisioning subsystem 308 may then sign that encoded VMS public key with the CDMS private key to provide the CDMS-private-key-signed encoded VMS public key 704. However, while a specific example of the generation of the CDMS-private-key-signed encoded VMS public key 704 has been described, one of skill in the art in possession of the present disclosure will appreciate how the computing device provisioning subsystem 308 may perform other operations according to the FDO protocol in order to transfer ownership of the computing device ordered by the end user to the voucher management system 208 using the ownership voucher 700 while remaining within the scope of the present disclosure.

In an embodiment, at block 502, the computing device provisioning subsystem 308 may also perform hardware attestation certificate generation operations that include generating a hardware attestation certificate for the computing device that identifies a hardware inventory of the computing device and that is configured to verify that the computing device has not been altered subsequent to its manufacture, as discussed in further detail below. In a specific example, the hardware attestation certificate may be generated using Secured Component Verification (SCV) techniques utilized to generate hardware attestation certificates provided in computing device available from DELL® Inc. of Round Rock, Texas, United States, and/or other Trusted Computing Group (TCG) hardware certificate attestation generation techniques that would be apparent to one of skill in the art in possession of the present disclosure. As such, an SCV generator in the computing device provisioning subsystem 308 may identify an inventory of the computing device ordered by the end user and "built" or otherwise manufactured by the computing device provisioning subsystem 308. A specific example of a portion of an inventory of a computing device is provided below:

```
{ "COMPONENTS": [
    {
        "COMPONENTCLASS": {
            "COMPONENTCLASSREGISTRY": "2.23.133.18.3.1",
            "COMPONENTCLASSVALUE": "00020001"
        },
        "MANUFACTURER": "Dell Inc.",
        "MODEL": "Dell IoT GW 5000",
        "REVISION": "Not Specified",
        "SERIAL": "11T8PY2"
    },
```

-continued

```
{
    "COMPONENTCLASS": {
        "COMPONENTCLASSREGISTRY": "2.23.133.18.3.1",
        "COMPONENTCLASSVALUE": "00010002"
    },
    "MANUFACTURER": "GenuineIntel",
    "MODEL": "179",
    "FIELDREPLACEABLE": "true",
    "REVISION": "21767"
},
{
    "COMPONENTCLASS": {
        "COMPONENTCLASSREGISTRY": "2.23.133.18.3.1",
        "COMPONENTCLASSVALUE": "00090002"
    },
    "MANUFACTURER": "Microsoft",
    "MODEL": "Broadcom NetXtreme Gigabit Ethernet",
    "FIELDREPLACEABLE": "true",
    "SERIAL": "4C-D9-8F-76-88-97"
},
{
    "COMPONENTCLASS": {
        "COMPONENTCLASSREGISTRY": "2.23.133.18.3.1",
        "COMPONENTCLASSVALUE": "00070002"
    },
    "MANUFACTURER": "(Standard disk drives)",
    "MODEL": "DELL PERC H740P Adp SCSI Disk Device",
    "FIELDREPLACEABLE": "true",
    "SERIAL": "008c225e78edd3032500020986f098cd",
    "REVISION": "5.05"
}, ...]
```

In response to identifying the inventory of the computing device ordered by the end user and "built" or otherwise manufactured by the computing device provisioning subsystem 308, the SCV generator in the computing device provisioning subsystem 308 may generate a Certificate Signing Request (CSR) with X.509 extended attributes (e.g., a subject alternate name, subject directory attributes, etc.), with the CSR requesting the signing of the information identified as the inventory of the computing device ordered by the end user using a computing device manufacturer private key (e.g., as prescribed by the TCG specification). The SCV generator in the computing device provisioning subsystem 308 may then transmit the CSR to a private key signing module in the computing device provisioning subsystem 308 (e.g., a manufacturing/factor server device that controls the computing device manufacturer private key described herein).

In response to receiving the CSR, the private key signing module in the computing device provisioning subsystem 308 may then sign the information identified as the inventory of the computing device ordered by the end user using the computing device manufacturer private key in order to generate "platform" hardware attestation certificate (e.g., an X.509 certificate associated with the computing device ordered by the end user) that encodes the information identified as the inventory of the computing device ordered by the end user in a manner that identifies the hardware inventory of the inventory of the computing device ordered by the end user and is configured for use in verifying that the computing device has not been altered subsequent to its manufacture, discussed in further detail below. A specific example of a hardware attestation certificate is provided below:

```
Certificate:
    Data:
        Version: 3 (0x2)
        Serial Number: 4097 (0x1001)
        Signature Algorithm: sha256WithRSAEncryption
        Issuer: C=US, ST=TX, L=Round Rock, O=Dell, OU=Edge, CN=factory@dell.com
        Validity
            Not Before: Nov 29 01:46:50 2020 GMT
            Not After : Nov 29 01:46:50 2021 GMT
        Subject: C=US, CN=ECE Secured Component Verification Certificate Spec V1
        Subject Public Key Info:
            Public Key Algorithm: rsaEncryption
                RSA Public-Key: (2048 bit)
                Modulus:
                    00:a3:87:66:4e:5b:c8:d1:ec:88:48:b8:2c:b7:7c:
                    96:ce:c0:75:dc:84:39:a8:45:c1:d5:d7:33:d7:8e:
                    ...
                Exponent: 65537 (0x10001)
        X509v3 extensions:
            X509v3 Basic Constraints:
                CA:FALSE
            X509v3 Key Usage:
                Digital Signature, Key Encipherment
            X509v3 Subject Alternative Name:
                0S..g.......Dell Inc..g.....PowerEdge R740..g......
Not Specified..g........1234567
    2.23.133.5.1.7.2:
        0.....g......1<...........Dell Inc...PowerEdge T440..11T8PY2.
Not Specified..g.....1:..........02KM69..Dell
Inc.A01...11T8PY2.CNFCP0095R00KB...g.......g......1#...........179..GenuineIntel..21767..g.....1#.
...........179..GenuineIntel..21767..g.....13..........00AD00B300AD..HMA82GR7JJR8N-
VK..33A67FA2..g.....13...........00AD00B300AD..HMA82GR7JJR8N-
VK..33A68023..g.....13..........00AD00B300AD..HMA82GR7JJR8N-
VK..33A68105..g.....13..........00AD00B300AD..HMA82GR7JJR8N-
VK..33A68017..g.....IL...........Microsoft.#Broadcom NetXtreme Gigabit Ethernet..4C-D9-8F-76-
88-97..g......1L...........Microsoft.#Broadcom NetXtreme Gigabit Ethernet..4C-D9-8F-76-88-
96..g......1o...........(Standard disk drives).$DELL PERC H740P Adp SCSI Disk Device..5.05.
008c225e78edd3032500020986f098cd
    Signature Algorithm: sha256WithRSAEncryption
        6f:14:d9:04:a0:48:c6:ce:03:48:6e:c3:42:32:6f:4b:b1:63:
```

```
   ca:2c:49:9a:aa:72:4b:80:0b:d3:1a:0b:25:2b:30:64:65:6e:
   ...
-----BEGIN CERTIFICATE-----
MIIG5zCCBc+gAwIBAgICEAEwDQYJKoZIhvcNAQELBQAwgYAxCzAJBgNVBAYTAnVz
...
ExZs/VARNEPs39r4qXM20K37kWP8J6oyDIbTRKPQTUyoT7X8C1ncOdRcCg==
----END CERTIFICATE-----
```

However, while a specific example of the generation of a hardware attestation certificate has been described, one of skill in the art in possession of the present disclosure will appreciate how the hardware attestation certificates utilized with the system and methods of the present disclosure may be generated using other techniques while remaining within the scope of the present disclosure as well.

Figure 7C:
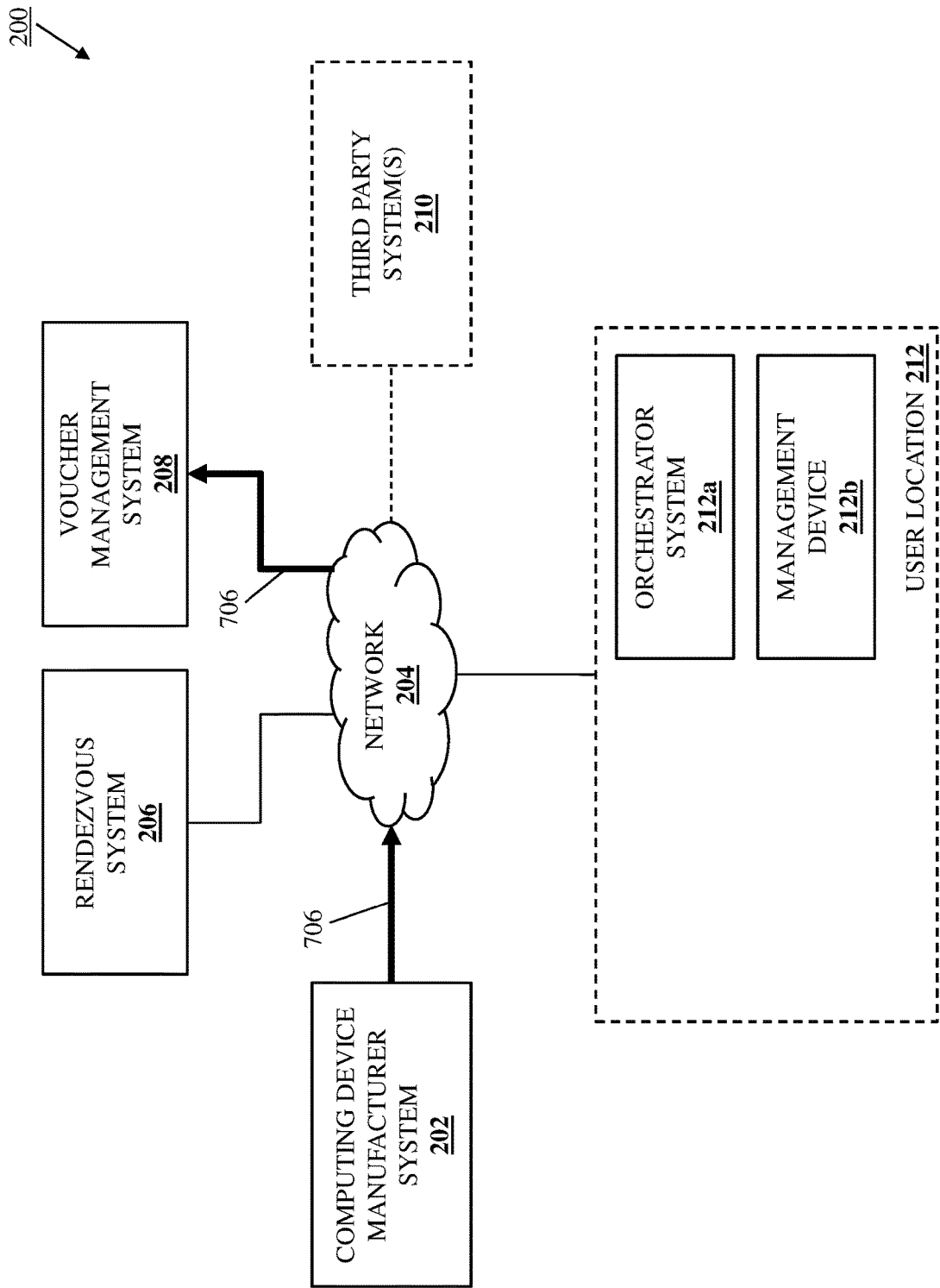
FIG. 7C is a schematic view illustrating an embodiment of the networked system of FIG. 2 operating during the method of FIG. 5.
Figure 7D:
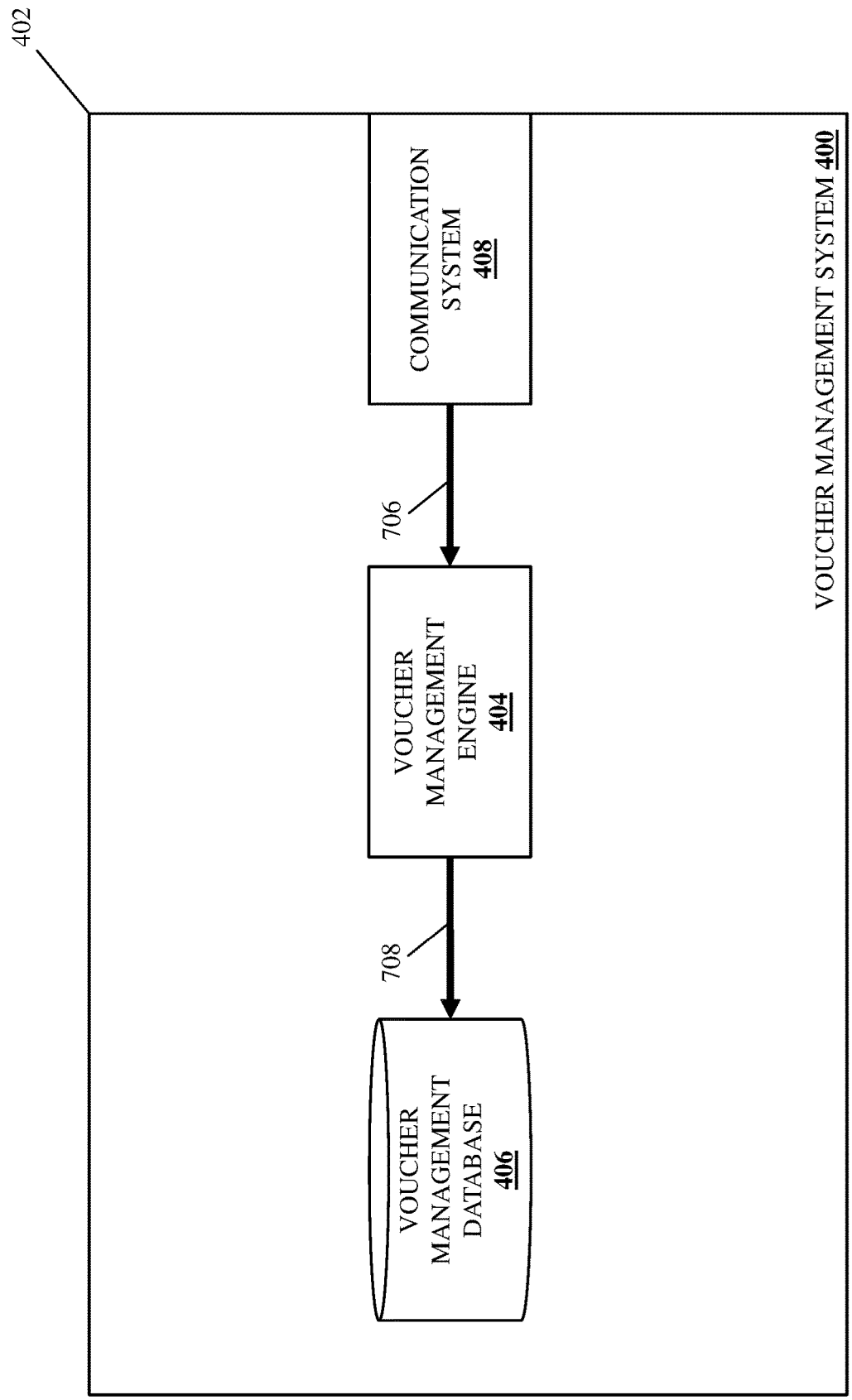
FIG. 7D is a schematic view illustrating an embodiment of the voucher management system of FIG. 4 operating during the method of FIG. 5.

With reference to FIGS. 7B, 7C, and 7D, at block 502 the computing device manufacturer system 300 may perform ownership voucher/hardware attestation certificate transmission operations 706 that include the computing device provisioning subsystem 308 transmitting the ownership voucher 700 (i.e., with the CDMS-private-key-signed encoded VMS public key 704) and the hardware attestation certificate via the communication system 310 and through the network 204 to the voucher management system 208. For example, the ownership voucher/hardware attestation certificate transmission operations 706 performed by the computing device manufacturer system 300 may utilize a secure Application Programming Interface (API) and/or any other security techniques that would be apparent to one of skill in the art in possession of the present disclosure in order to securely transmit the ownership voucher 700 and the hardware attestation certificate to the voucher management system 208. As such, at block 502, the voucher management engine 404 in the voucher management system 208/400 may receive the ownership voucher 700 via its communication system 408 from the computing device manufacturer system 202 (e.g., a "first owner system" in this example) that transfers ownership of the computing device ordered by the end user to the voucher management system 208, and may also receive the hardware attestation certificate generated for the computing device ordered by the end user, and the voucher management engine 404 in the voucher management system 208/400 may perform ownership voucher storage operations 708 that include storing the ownership voucher 700 and the hardware attestation certificate in its voucher management database 406.

Figure 8A:
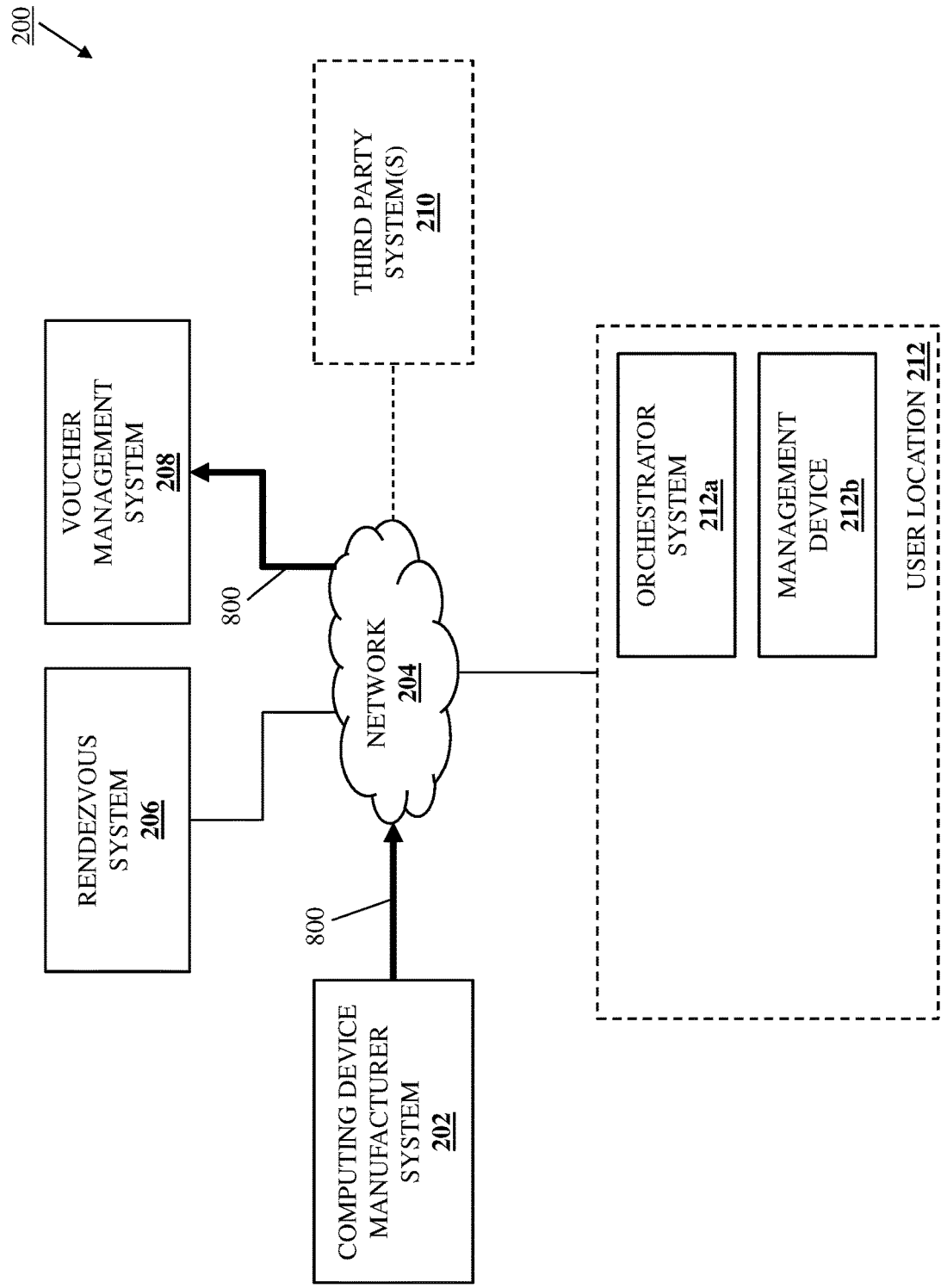
FIG. 8A is a schematic view illustrating an embodiment of the networked system of FIG. 2 operating during the method of FIG. 5.
Figure 8B:
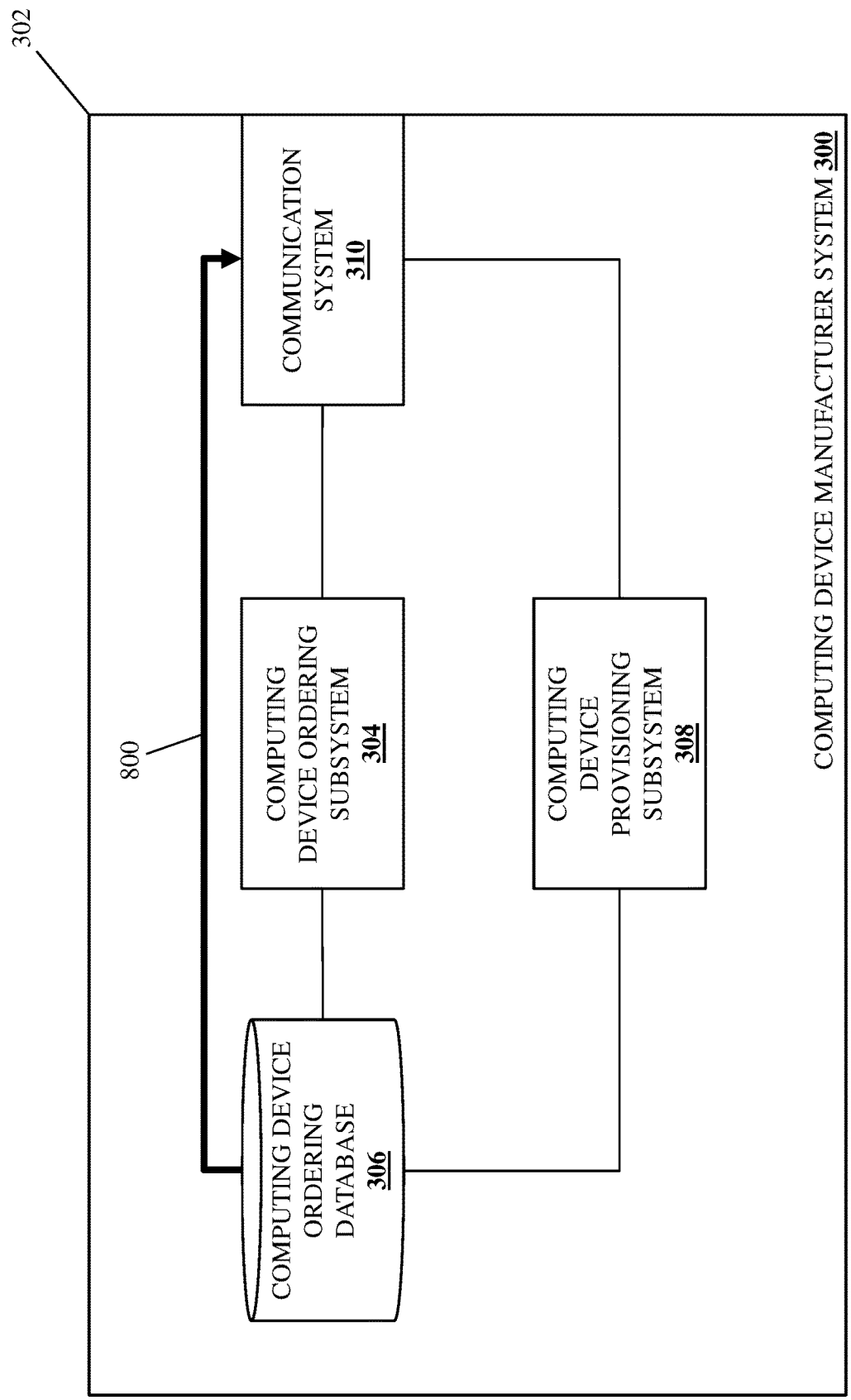
FIG. 8B is a schematic view illustrating an embodiment of the computing device manufacturer system of FIG. 3 operating during the method of FIG. 5.

With reference to FIGS. 8A, 8B, and 8C, at block 502 and in response to receiving the ownership voucher 700 and the hardware attestation certificate, the voucher management engine 404 in the voucher management system 208/400 may perform computing device ordering information retrieval operations 800 that include the voucher management engine 404 accessing the computing device ordering database 306 in the computing device manufacturer system 300 via the network 204 and its communication system 310 in order to retrieve any of the computing device ordering information about the computing device ordered by the end user. The voucher management engine 404 in the voucher management system 208/400 may then perform computing device ordering information/ownership voucher/hardware attestation certificate mapping operations 802 that include mapping any of the computing device ordering information to the ownership voucher 700 in the voucher management database 406, and mapping the computing device ordering information (e.g., a computing device serial number) to the hardware attestation certificate.

Figure 9B:
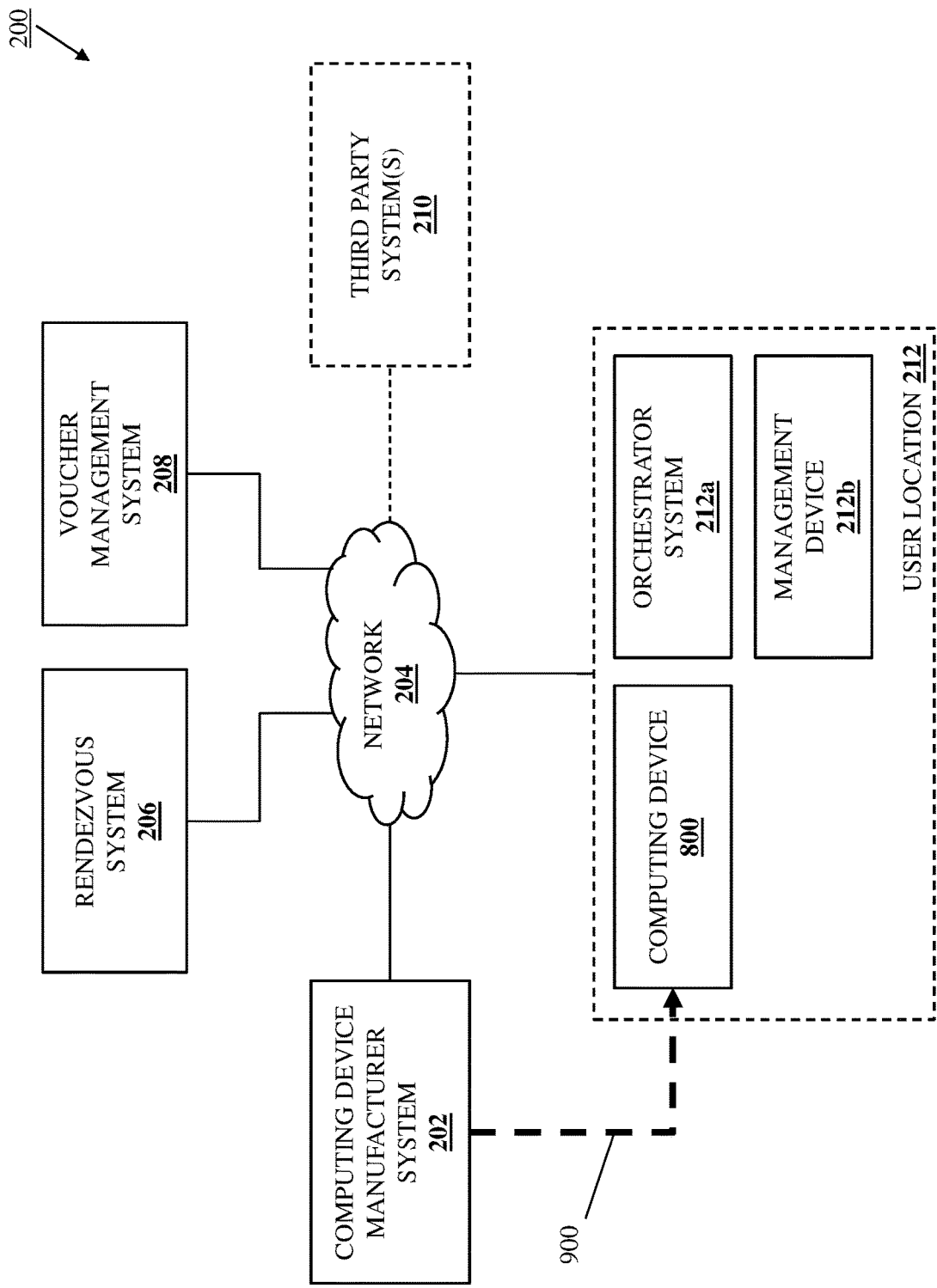
FIG. 9B is a schematic view illustrating an embodiment of the networked system of FIG. 2 operating during the method of FIG. 5.

With reference to FIGS. 9A and 9B, subsequent to the completion of the manufacturing of the computing device ordered by the end user, the computing device manufacturer system 300 may perform computing device provisioning operations 900 that include the computing device provisioning subsystem 308 in the computing device manufacturer system 202/300 providing a computing device 800 (the computing device that was ordered by the end user as discussed above) to the user location 212. As will be appreciated by one of skill in the art in possession of the present disclosure, the computing device provisioning operations 900 may be performed by shipping the computing device 800 that was ordered by the end user and manufactured by the computing device manufacturer system 202/300 to the user location 212 for use by the end user. As such, following block 502, the computing device 800 may be located at the user location 212, and the ownership voucher 700 may be stored at the voucher management system 208 and may indicate that the voucher management system 208 owns the computing device 800.

The method 500 then proceeds to decision block 504 where it is determined whether an ownership transfer request has been received. In an embodiment, at decision block 504, the voucher management engine 404 in the voucher management system 208/400 may operate to monitor for any ownership transfer requests that request the transfer of ownership of the computing device 800 to a different owner. As discussed above, at block 502 the voucher management system 208 was defined as the owner of the computing device 800 using the ownership voucher 700, and thus any request received by the voucher management engine 404 to transfer ownership of the computing device 800 to a "new" owner other than the voucher management system 208 may be recognized as the ownership transfer request at decision block 504. If, at decision block 504, it is determined that an ownership transfer request has not been received, the method 500 returns to decision block 504. As such, the method 500 may loop such that the voucher management engine 404 in the voucher management system 208/400 continues to monitor for any ownership transfer requests that request the transfer of ownership of the computing device 800 to a different owner (e.g., until an ownership transfer request is received).

If, at decision block 504, it is determined that an ownership transfer request has been received, the method 500 proceeds to decision block 506 where the method proceeds depending on whether the ownership transfer is to a last owner or an intermediate owner. In the first example provided herein, a "direct" computing-device-manufacturer-to-end-user scenario is described in which ownership of the computing device is transferred directly from the voucher management system 208 to the end user that ordered the computing device 800 (a "last owner" in that example) without having any intermediate owners in between. As will be appreciated by one of skill in the art in possession of the present disclosure, such a scenario may exist when end users order their computing devices directly from the computing device manufacturer such that those computing devices are shipped from or otherwise provided by the computing device manufacturer to the end user. However, in a second example provided below, an "indirect" computing-device-manufacturer-to-end-user scenario is described in which ownership of the computing device is transferred from the voucher management system 208 to one or more third parties ("intermediate owner(s)" in that example) before being transferred to the end user that ordered the computing device 800 (a "last owner" in this example). As will be appreciated by one of skill in the art in possession of the present disclosure, such a scenario may exist when end users order their computing devices from resellers that received those computing device either from the computing device manufacturer or other resellers, with those computing devices shipped from or provided by one of the resellers to the end user.

Figure 10A:
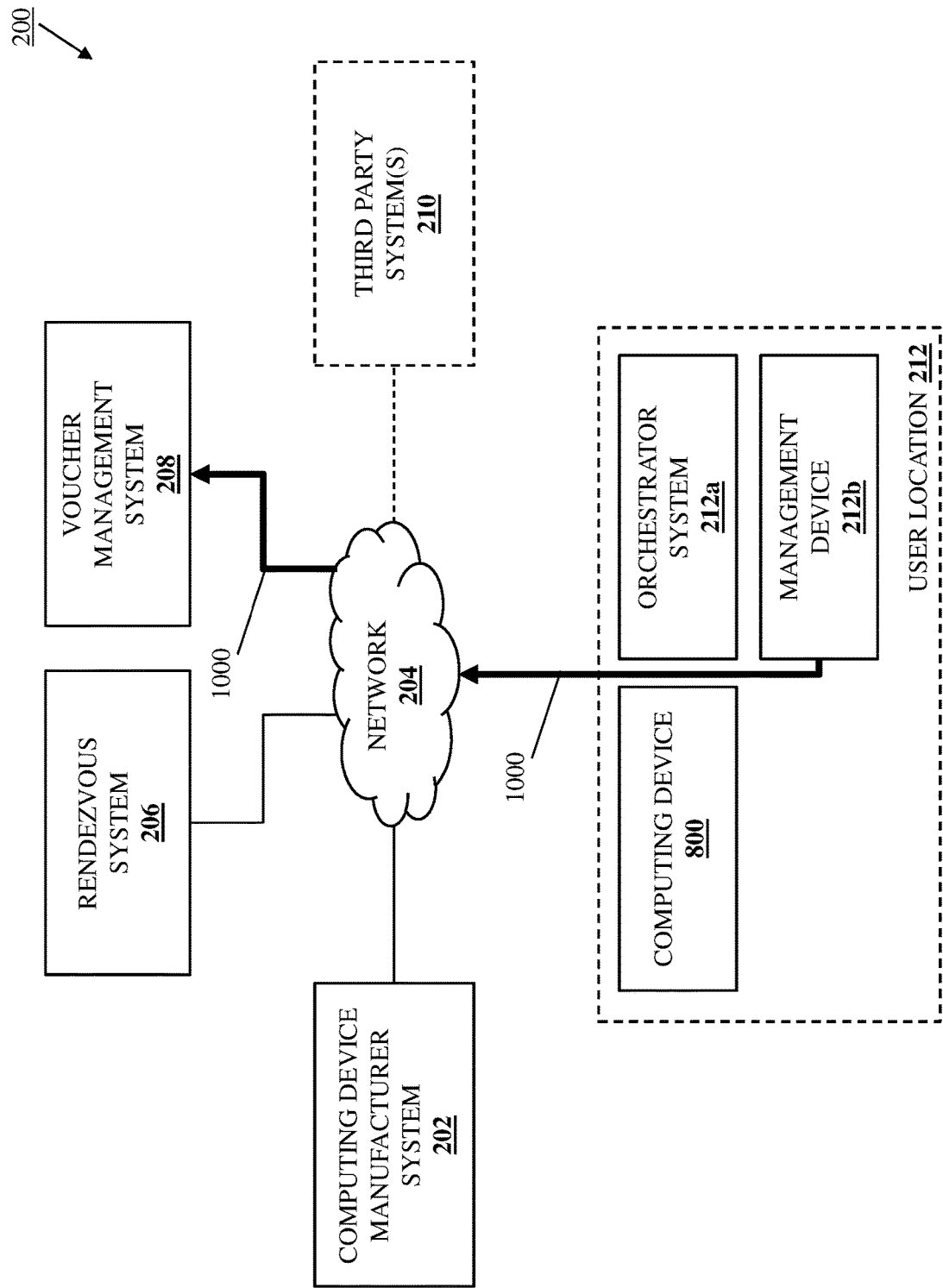
FIG. 10A is a schematic view illustrating an embodiment of the networked system of FIG. 2 operating during the method of FIG. 5.
Figure 10B:
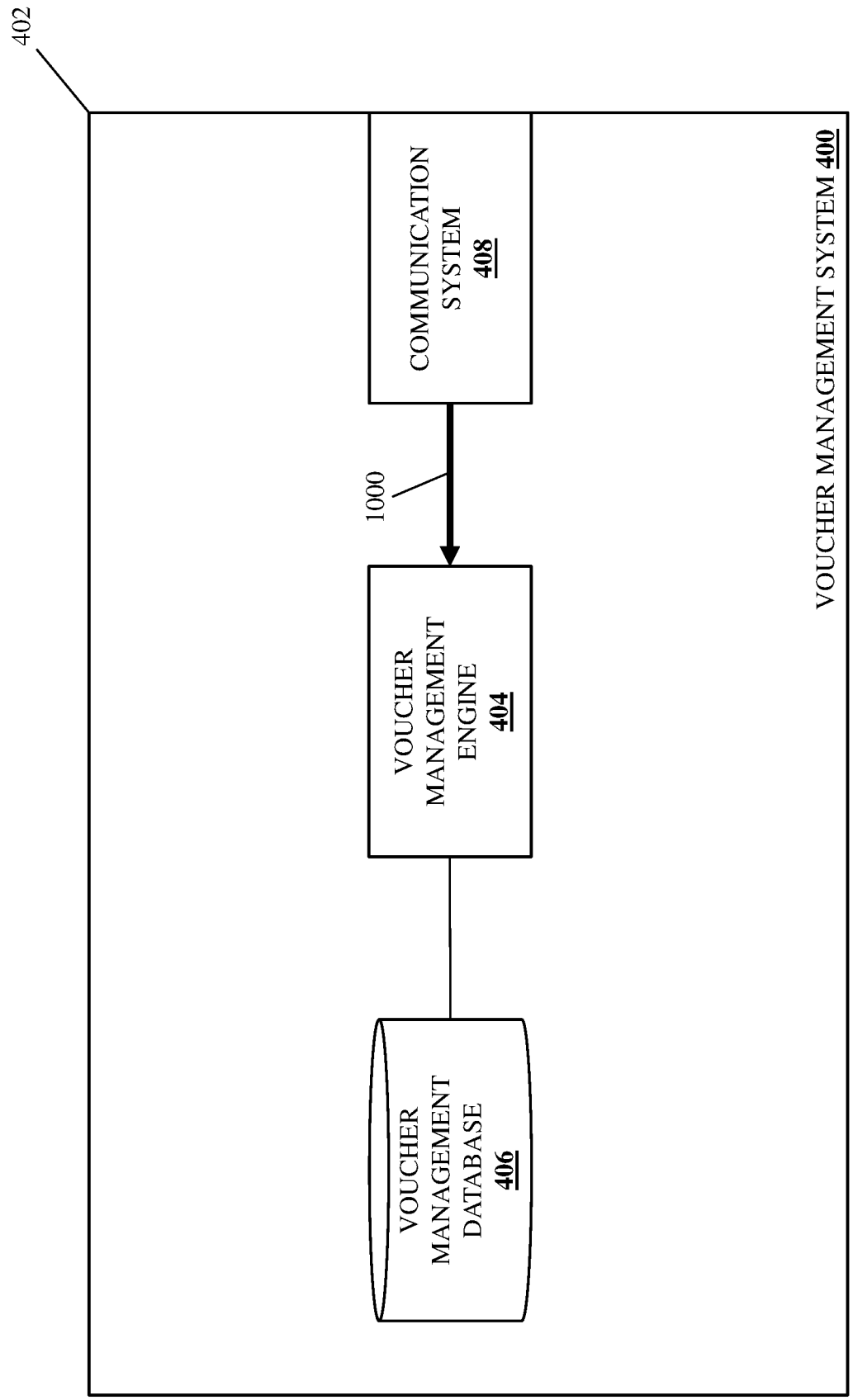
FIG. 10B is a schematic view illustrating an embodiment of the voucher management system of FIG. 4 operating during the method of FIG. 5.

If, at decision block 506, the ownership transfer is to a last owner, the method 500 proceeds to block 508 where the voucher management system automatically generates last owner ownership transfer data. With reference to FIGS. 10A and 10B, in an embodiment of decision blocks 504 and 506, the end user that received the computing device 800 at the user location 212 may utilize the management device 212b at the user location 212 to perform voucher management system access operations 1000 that include accessing the voucher management system 208 via the network 204 (e.g., via a "support" website provided by the computing device manufacturer such as "support.dell.com" using the specific example provided above). For example, the voucher management system access operations 1000 may include the end user using the management device 212b to perform Single Sign-On (SSO) operations with the voucher management engine 404 via its communication system 408, which one of skill in the art in possession of the present disclosure will recognize provides a session and user authentication service that may permit the end user to use one set of login credentials to access multiple applications provided by the voucher management system 208, as well as perform other SSO functionality known in the art in order to authenticate to the voucher management system 208.

In an embodiment, the voucher management system access operations 1000 may include the end user using the management device 212b providing an orchestrator system (OS) public key of the orchestrator system 212a to the voucher management system 208. As discussed in further detail below, in the examples provided herein, the orchestrator system 212a provides a "last owner system" to which ownership of the computing device 800 will provided using the ownership voucher 700, and the OS public key may be provided to the voucher management system 208 in order to allow that ownership transfer to be performed.

Figure 10C:
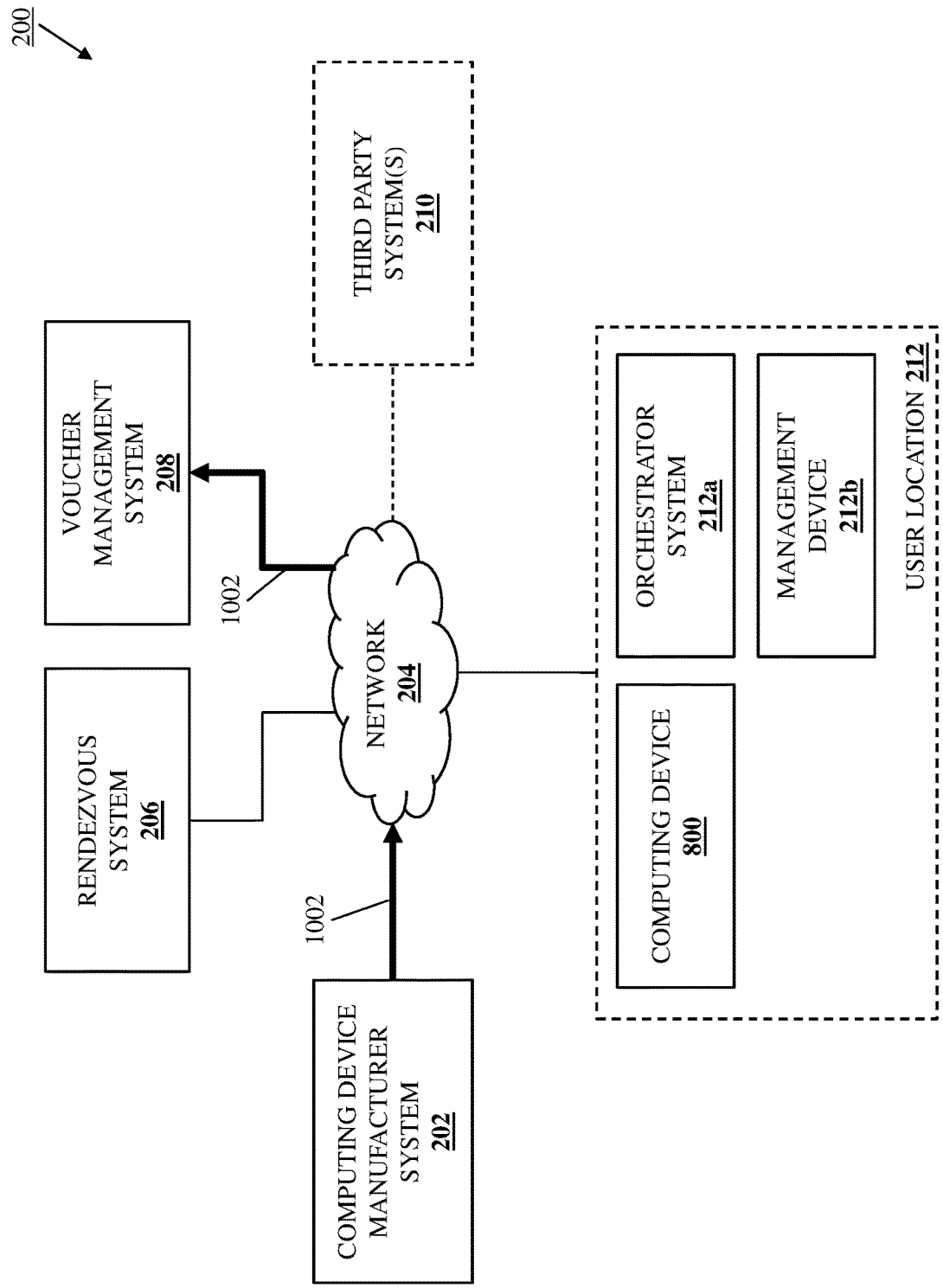
FIG. 10C is a schematic view illustrating an embodiment of the networked system of FIG. 2 operating during the method of FIG. 5.
Figure 10D:
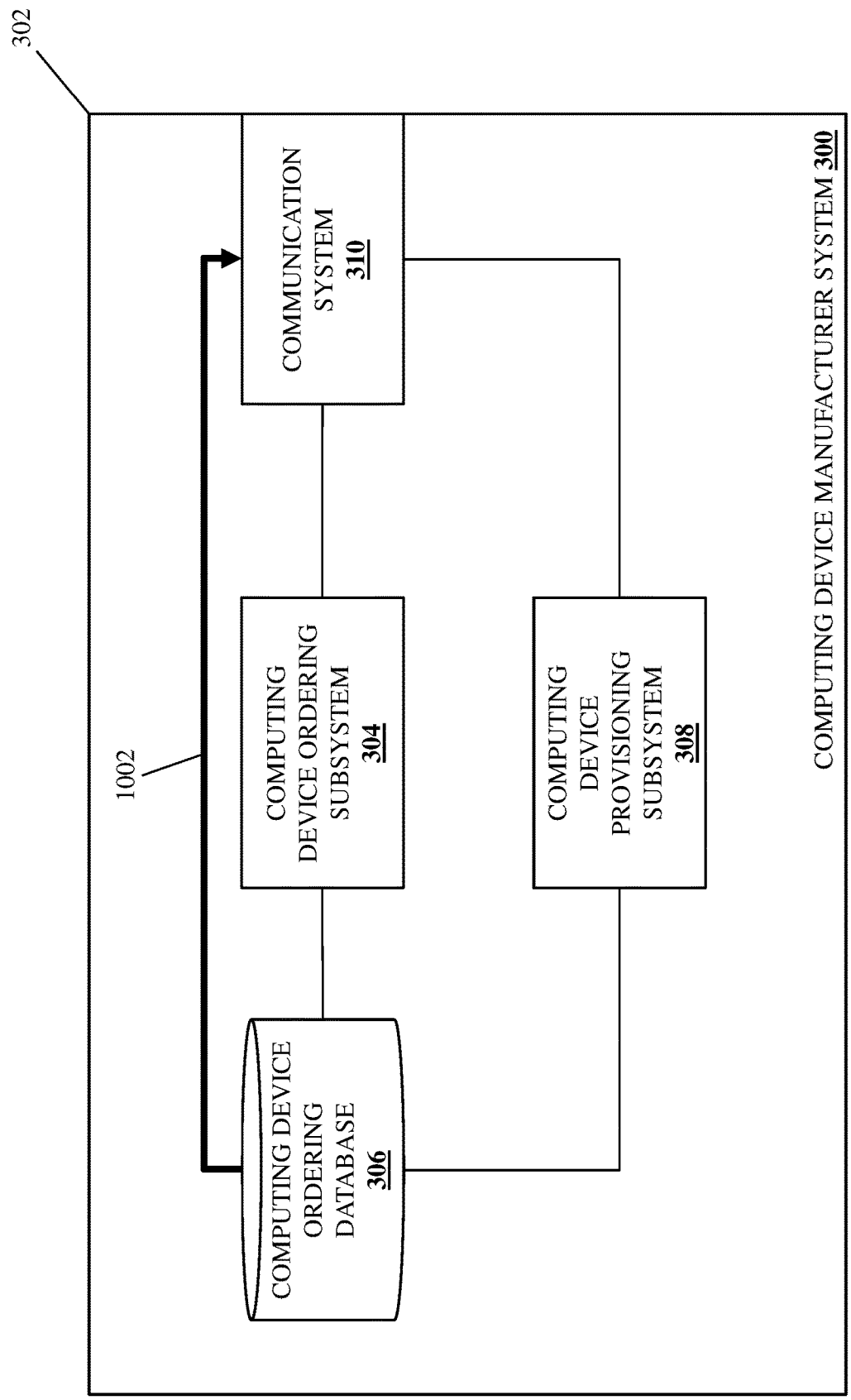
FIG. 10D is a schematic view illustrating an embodiment of the computing device manufacturer system of FIG. 3 operating during the method of FIG. 5.
Figure 10E:
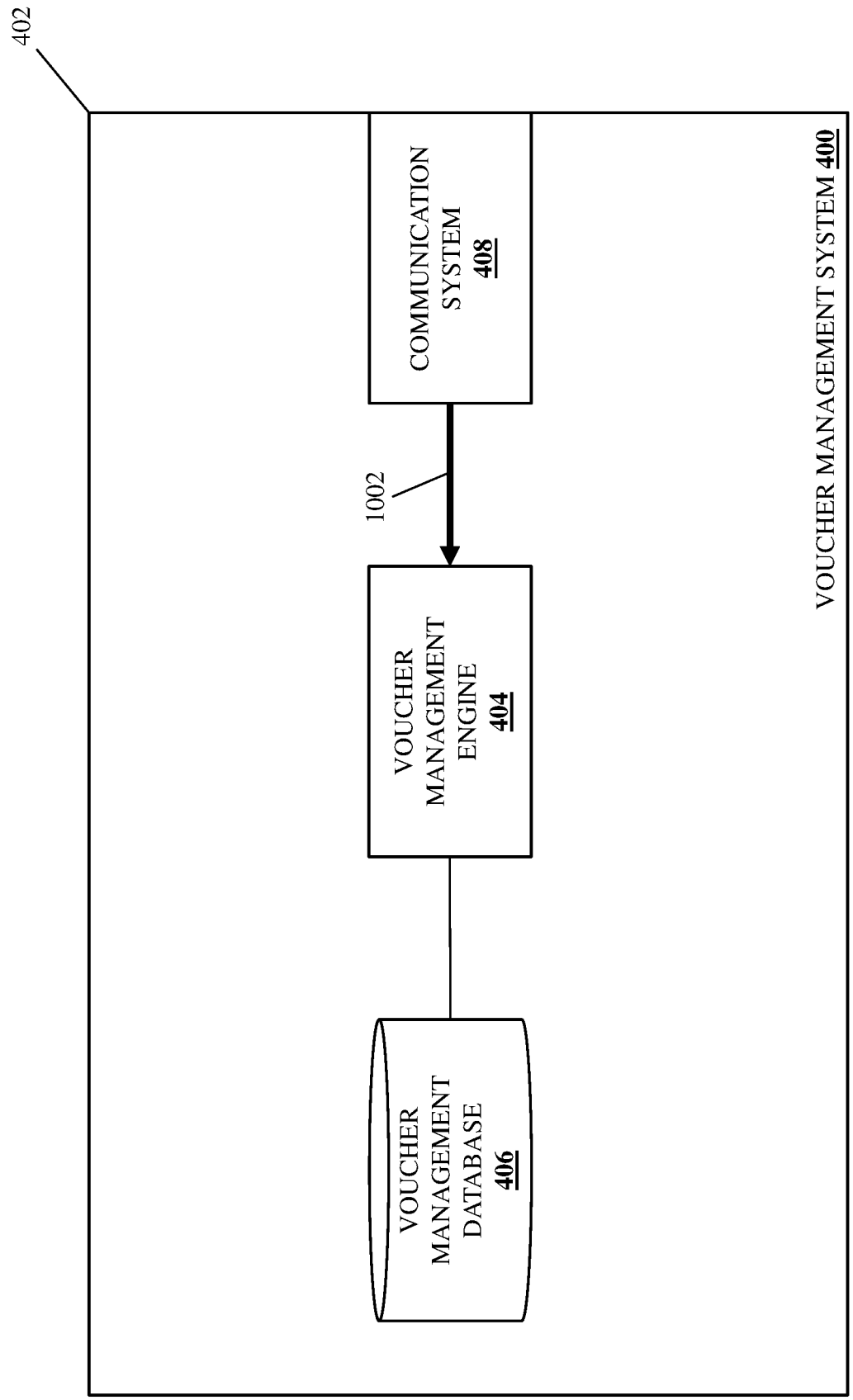
FIG. 10E is a schematic view illustrating an embodiment of the voucher management system of FIG. 4 operating during the method of FIG. 5.
Figure 10F:
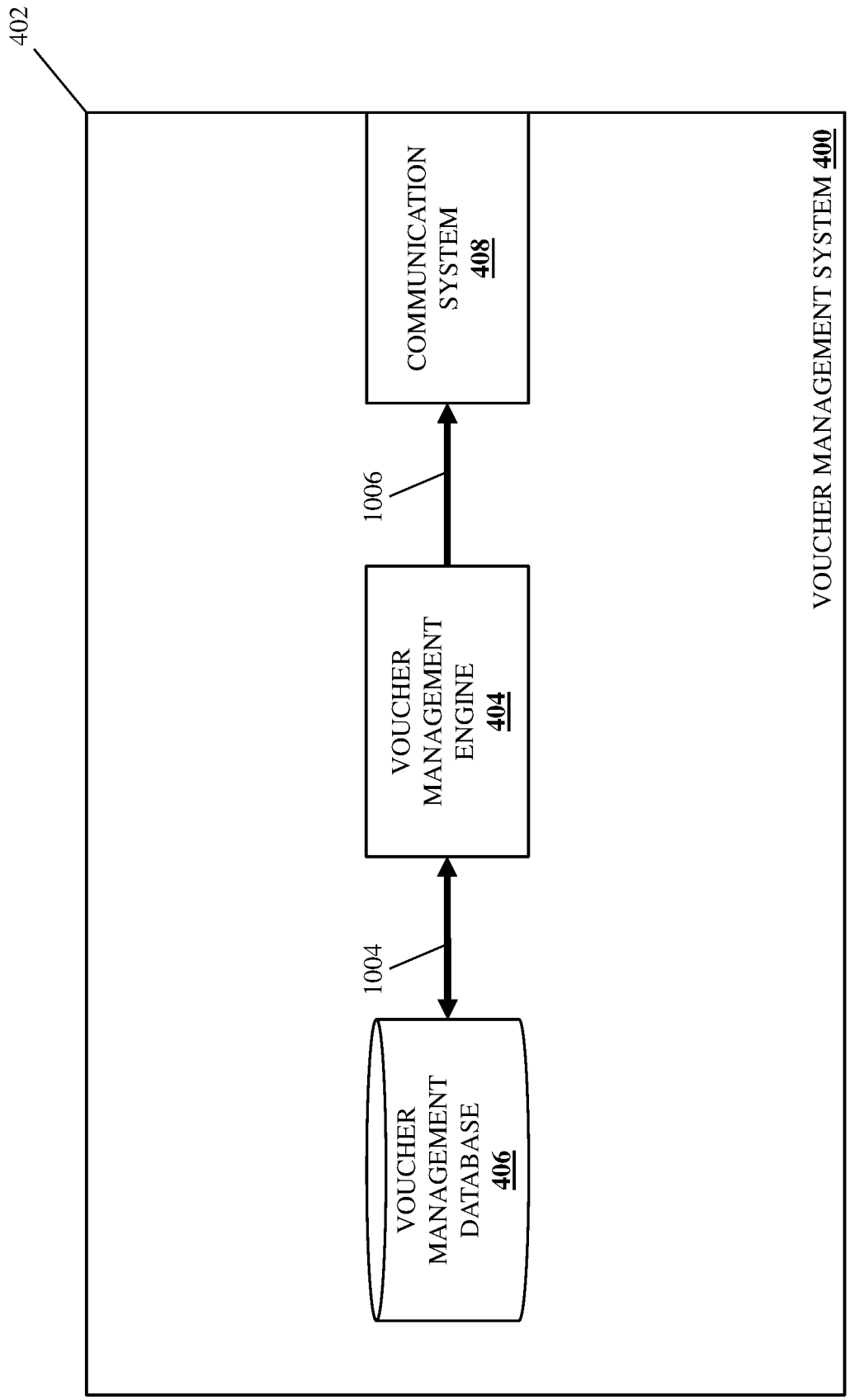
FIG. 10F is a schematic view illustrating an embodiment of the voucher management system of FIG. 4 operating during the method of FIG. 5.

With reference to FIGS. 10C, 10D, and 10E, in an embodiment of decision blocks 504 and 506 and in response to authenticating the end user, the voucher management engine 404 in the voucher management system 208 may perform computing device ordering information retrieval operations 1002 that include the voucher management engine 404 accessing the computing device ordering database 306 in the computing device manufacturer system 300 via the network 204 and its communication system 310 in order to retrieve any computing device ordering information about computing device(s) ordered by the end user that was authenticated. With reference to FIG. 10F, the voucher management engine 404 in the voucher management system 208/400 may then perform end user/ownership voucher/hardware attestation certificate identification operations 1004 that include the voucher management engine 404 using the computing device ordering information about computing device(s) ordered by the end user that was authenticated to identify any ownership vouchers (e.g., including the ownership voucher 700 discussed above) and hardware attestation certificates in the voucher management database 406 associated with computing devices ordered by the end user.

Figure 10G:
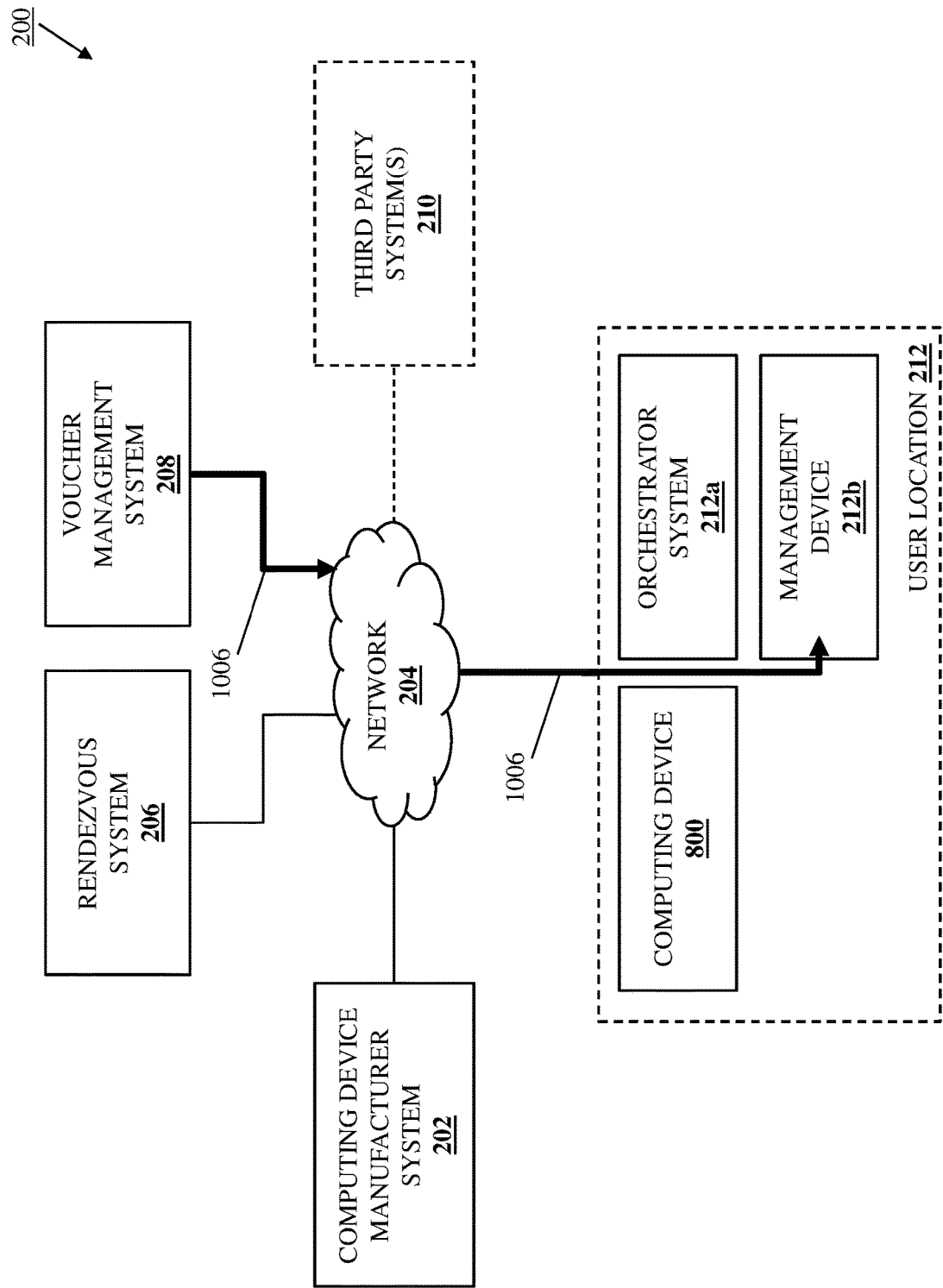
FIG. 10G is a schematic view illustrating an embodiment of the networked system of FIG. 2 operating during the method of FIG. 5.

With reference to FIGS. 10F and 10G, in an embodiment of decision blocks 504 and 506, the voucher management engine 404 in the voucher management system 208/400 may then perform ownership voucher/hardware attestation certificate display operations 1006 that include providing, for display via the network 204 using its communication system 408, any of the ownership vouchers and hardware attestation certificates identified for the end user for display on the management device 212b (e.g., via the "support" website provided by the computing device manufacturer such as "support.dell.com" using the specific example provided above). As such, one of skill in the art in possession of the present disclosure will recognize that the voucher management system 208 may provide a single, centralized location/source for the end user to review any ownership vouchers that define the ownership of any computing devices ordered by the end user, as well as hardware attestation certificates that verify that computing devices ordered by the end user have not been altered subsequent to their manufacture, discussed in further detail below. As will be appreciated by one of skill in the art in possession of the present disclosure, such a single, centralized location/source for ownership voucher and hardware attestation certificate review may be particularly beneficial to end users that order hundreds, and even thousands, of computing devices from the computing device manufacturer or third parties.

As such, an embodiment of decision blocks 504 and 506 may include the end user using the management device 212b to select one or more ownership vouchers and hardware attestation certificates that were provided for display by the voucher management system 208 on the management device 212b in order to transmit the ownership transfer request for those ownership vouchers. Continuing with the example of the ownership voucher 700 discussed above, the end user may use the management device 212b to select the ownership voucher 700 and the hardware attestation certificate associated with the computing device for which ownership was transferred via the ownership voucher 700 in order to transmit the ownership transfer request that is received by the voucher management system 208 at decision block 504, and the method will then proceed to block 508 due to the end user being the "last owner" of the computing device 800.

Figure 11A:
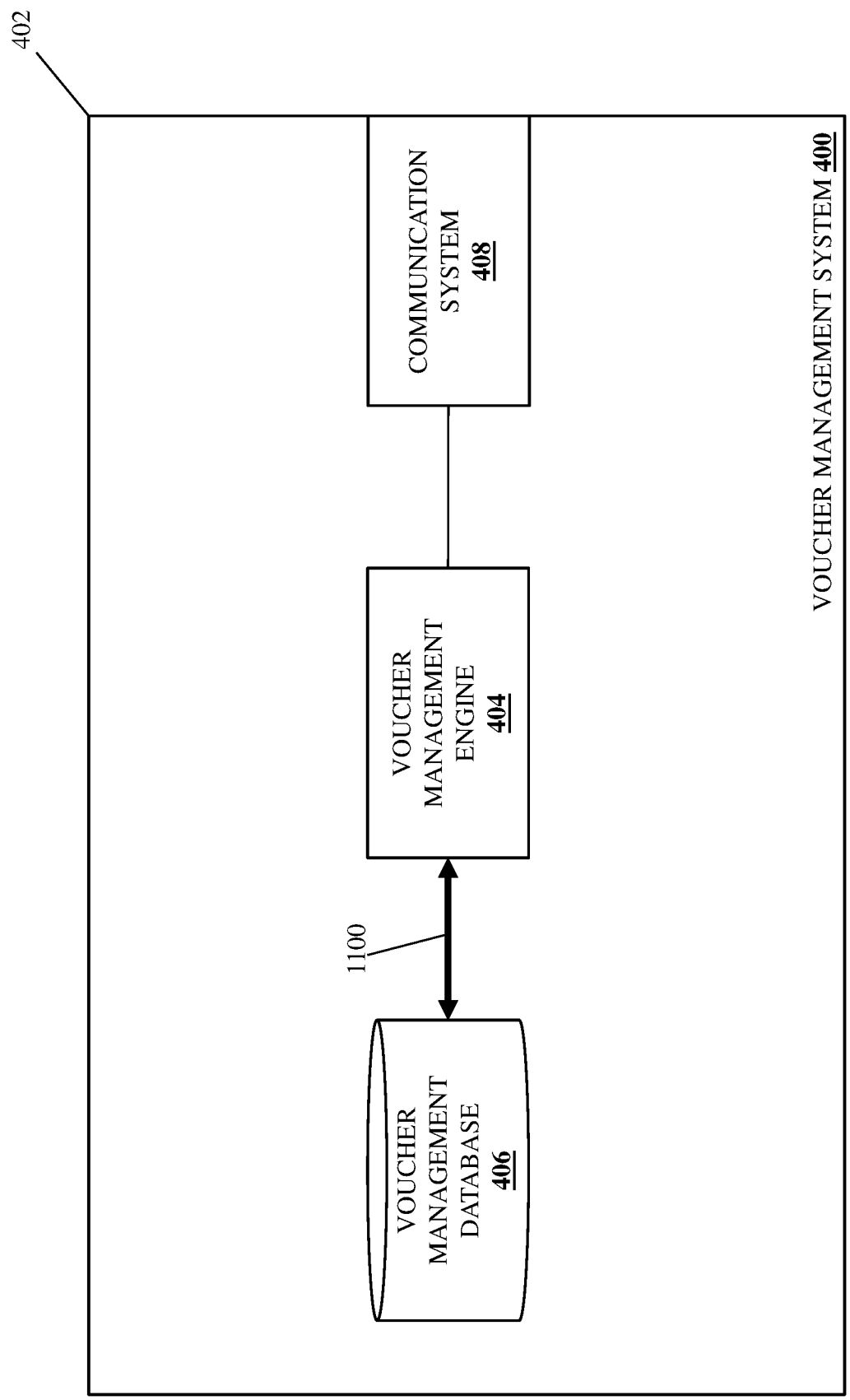
FIG. 11A is a schematic view illustrating an embodiment of the voucher management system of FIG. 4 operating during the method of FIG. 5.

With reference to FIG. 11A, in an embodiment of block 508 and in response to receiving the ownership transfer request for the computing device 800, the voucher management engine 404 in the voucher management system 208/400 may perform last owner ownership transfer data generation operations 1100 that include using a VMS private key controlled by the voucher management system 208/400 to sign an encoded orchestrator system (OS) public key of the orchestrator system 212a to generate a VMS-private-key-signed encoded OS public key 1200.

In a specific example, the voucher management engine 404 may generate the VMS-private-key-signed encoded OS public key 1200 according to the FDO protocol by using the OS public key of the orchestrator system 212a that was provided via the management device 212b as discussed above, and performing a hashing operation on that OS public key, a GUID for the computing device 800, computing device information associated with the computing device 800 (e.g., serial number(s), MAC address(es), etc.), and/or other any other information that would be apparent to one of skill in the art in possession of the present disclosure in order to generate an encoded OS public key. The voucher management engine 404 may then sign that encoded OS public key with the VMS private key to provide the VMS-private-key-signed encoded OS public key 1200. However, while a specific example of the generation of last owner ownership transfer data provide by the VMS-private-key-signed encoded OS public key 1200 has been described, one of skill in the art in possession of the present disclosure will appreciate how the voucher management engine 404 may perform other operations according to the FDO protocol in order to transfer ownership of the computing device 800 to the orchestrator system 212a using the ownership voucher 700 while remaining within the scope of the present disclosure.

Figure 11B:
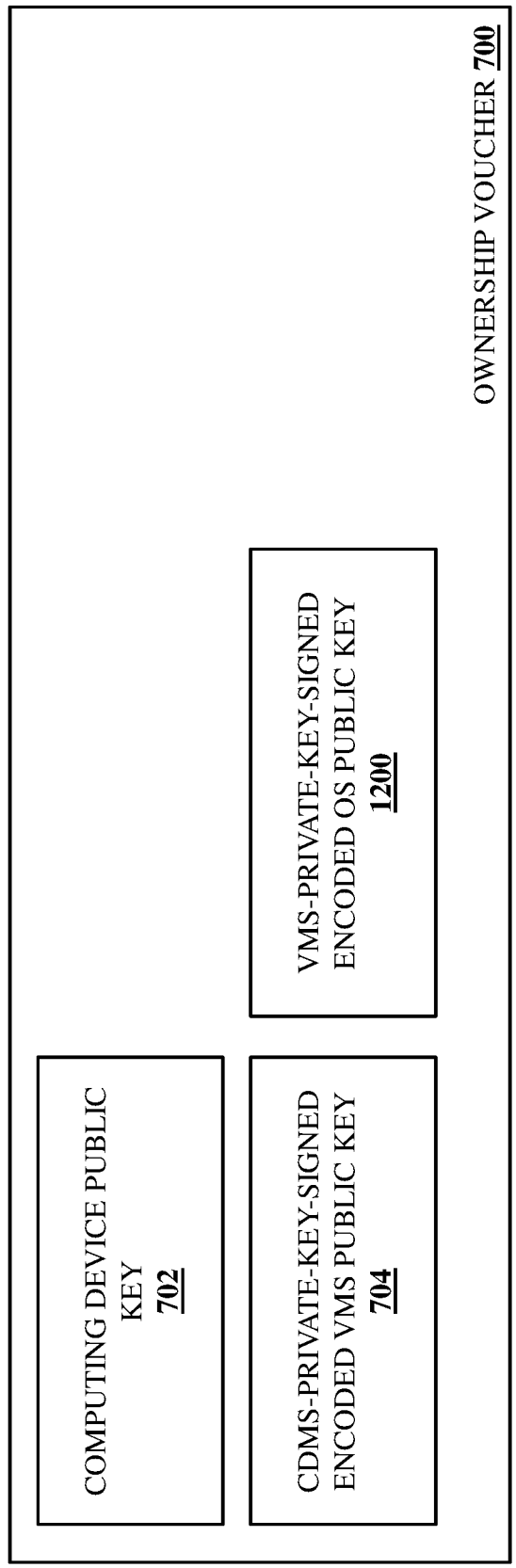
FIG. 11B is a schematic view illustrating an embodiment of the ownership voucher of FIG. 7A that may have been modified during the method of FIG. 5.

The method 500 then proceeds to block 510 where the voucher management system provides the last owner ownership transfer data in the ownership voucher to transfer ownership of the computing device to a last owner system. With reference to FIG. 11B, in an embodiment of block 510, the voucher management engine 404 in the voucher management system 208/400 may perform ownership transfer operations that include providing the VMS-private-key-signed encoded OS public key 1200 generated as discussed above in the ownership voucher 700. As will be appreciated by one of skill in the art in possession of the present disclosure, the CDMS-private-key-signed encoded VMS public key 704 provides for the transfer of the ownership of the computing device 800 from the computing device manufacturer system 202 to the voucher management system 208, allowing the VMS-private-key-signed encoded OS public key 1200 to provide for the transfer of the ownership of the computing device 800 from the voucher management system 208 to the orchestrator system 212a.

Figure 12B:
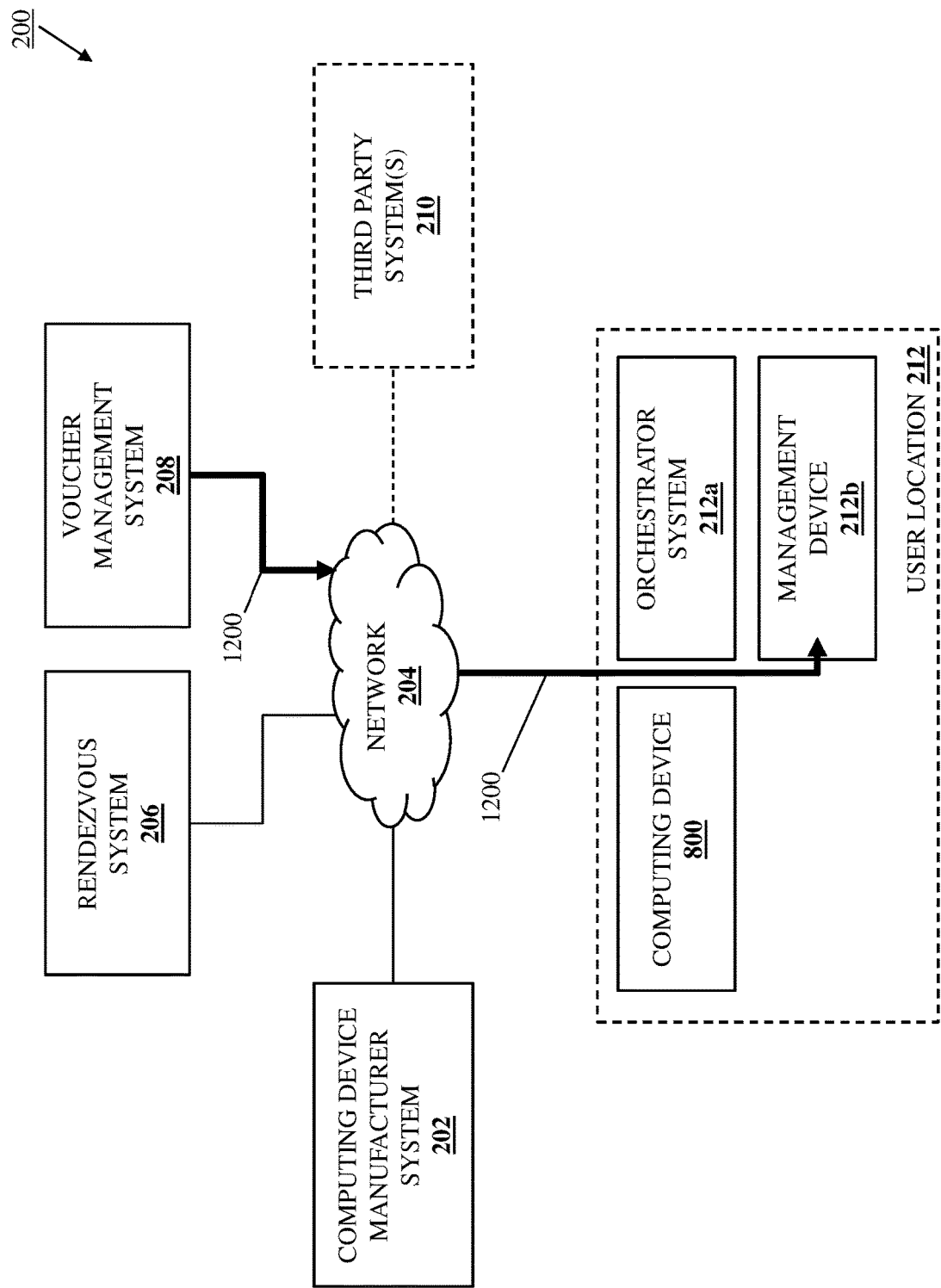
FIG. 12B is a schematic view illustrating an embodiment of the networked system of FIG. 2 operating during the method of FIG. 5.

The method 500 then proceeds to block 512 where the voucher management system provides the ownership voucher and the hardware attestation certificate to the last owner system. With reference to FIGS. 12A and 12B, in an embodiment of block 512, the voucher management engine 404 in the voucher management system 208/400 may perform ownership voucher/hardware attestation certificate transmission operations 1200 that include the voucher management engine 404 transmitting the ownership voucher 700 (i.e., with the CDMS-private-key-signed encoded VMS public key 704 and the VMS-private-key-signed encoded OS public key 1200) and the hardware attestation certificate via its communication system 408 and through the network 204 to the management device 212b at the user location 212. For example, the ownership voucher/hardware attestation certificate transmission operations 1200 performed by the voucher management engine 404 may utilize a secure API and/or any other security techniques that would be apparent to one of skill in the art in possession of the present disclosure in order to transmit the ownership voucher 700 and hardware attestation certificate to the management device 212.

Figure 12C:
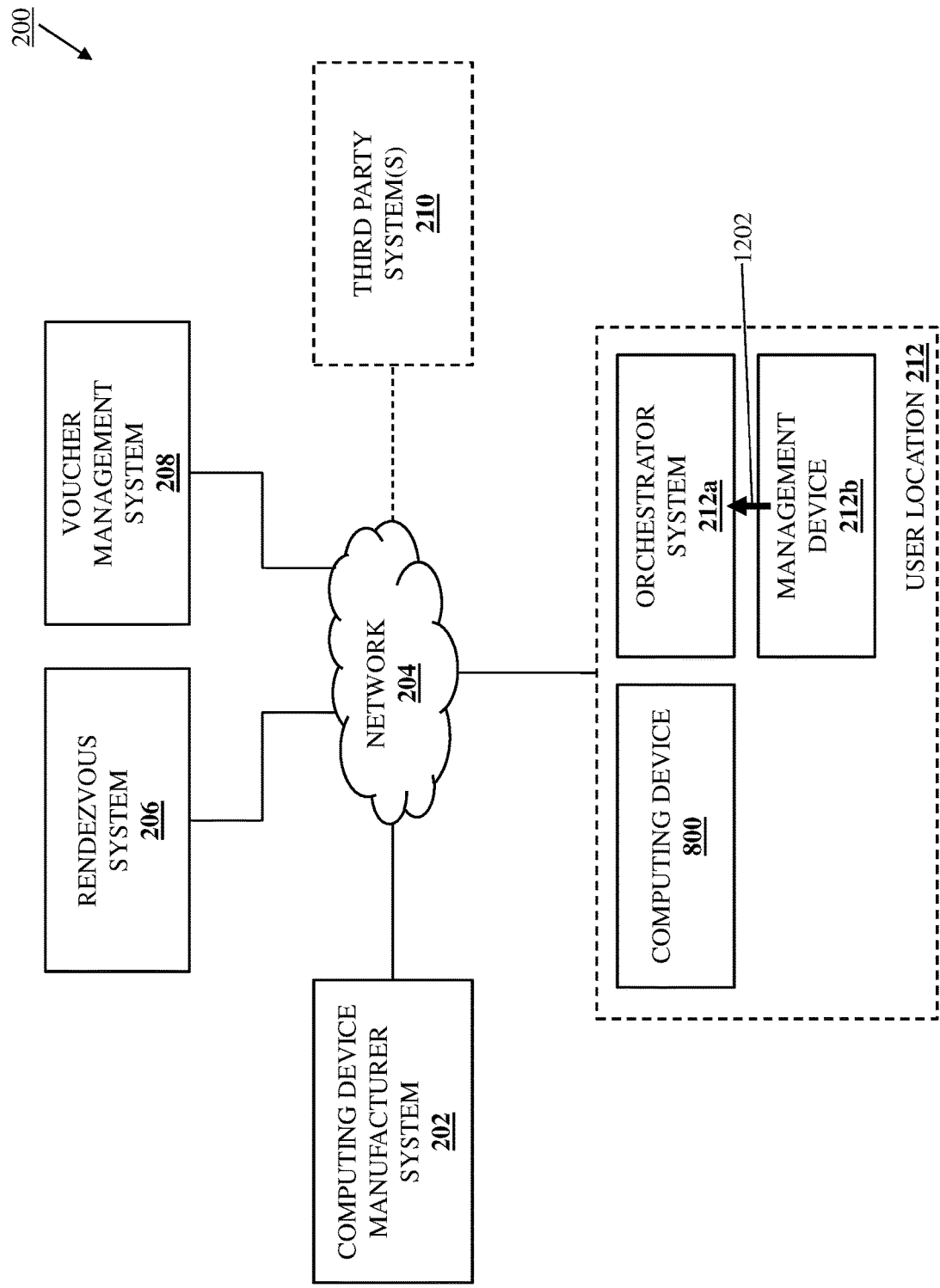
FIG. 12C is a schematic view illustrating an embodiment of the networked system of FIG. 2 operating during the method of FIG. 5.

With reference to FIG. 12C, in response to receiving the ownership voucher 700 and the hardware attestation certificate from the voucher management system 400, the management device 212b may perform ownership voucher/hardware attestation certificate transmission operations 1202 that include the management device 212b transmitting the ownership voucher 700 (i.e., with the CDMS-private-key-signed encoded VMS public key 704 and the VMS-private-key-signed encoded OS public key 1200) and the hardware attestation certificate to the orchestrator system 212a at the user location 212. As such, at block 502, the orchestrator system 212a (a "last owner" in this example) at the user location 212 may receive the ownership voucher 700 from the voucher management system 208 (via the management device 212b) that transfers ownership of the computing device 800 to the orchestrator system 212a, along with the hardware attestation certificate for the computing device 800, and the orchestrator system 212a may perform ownership voucher/hardware attestation certificate storage operations that include storing the ownership voucher 700 and the hardware attestation certificate in a database accessible at the user location 212.

In an embodiment, in response to receiving the hardware attestation certificate, the orchestrator system 212a may validate the hardware attestation certificate. For example, the orchestrator system 212a may include an SCV application (or other TCG applications known in the art) that is configured to perform a variety of platform certificate validation operations that would be apparent to one of skill in the art in possession of the present disclosure in order to validate a "chain-of-trust" for the platform hardware attestation certificate using a Certificate Authority (CA) provided by the computing device manufacturer system 202 (e.g., a DELL® CA provided by DELL® Inc. of Round Rock, Texas, United States in the examples above). However, while a specific example of the validation of the hardware attestation certificate has been described, one of skill in the art in possession of the present disclosure will appreciate how the hardware attestation certificate of the present disclosure may be validated in a variety of manners that will fall within the scope of the present disclosure as well.

Figure 13:
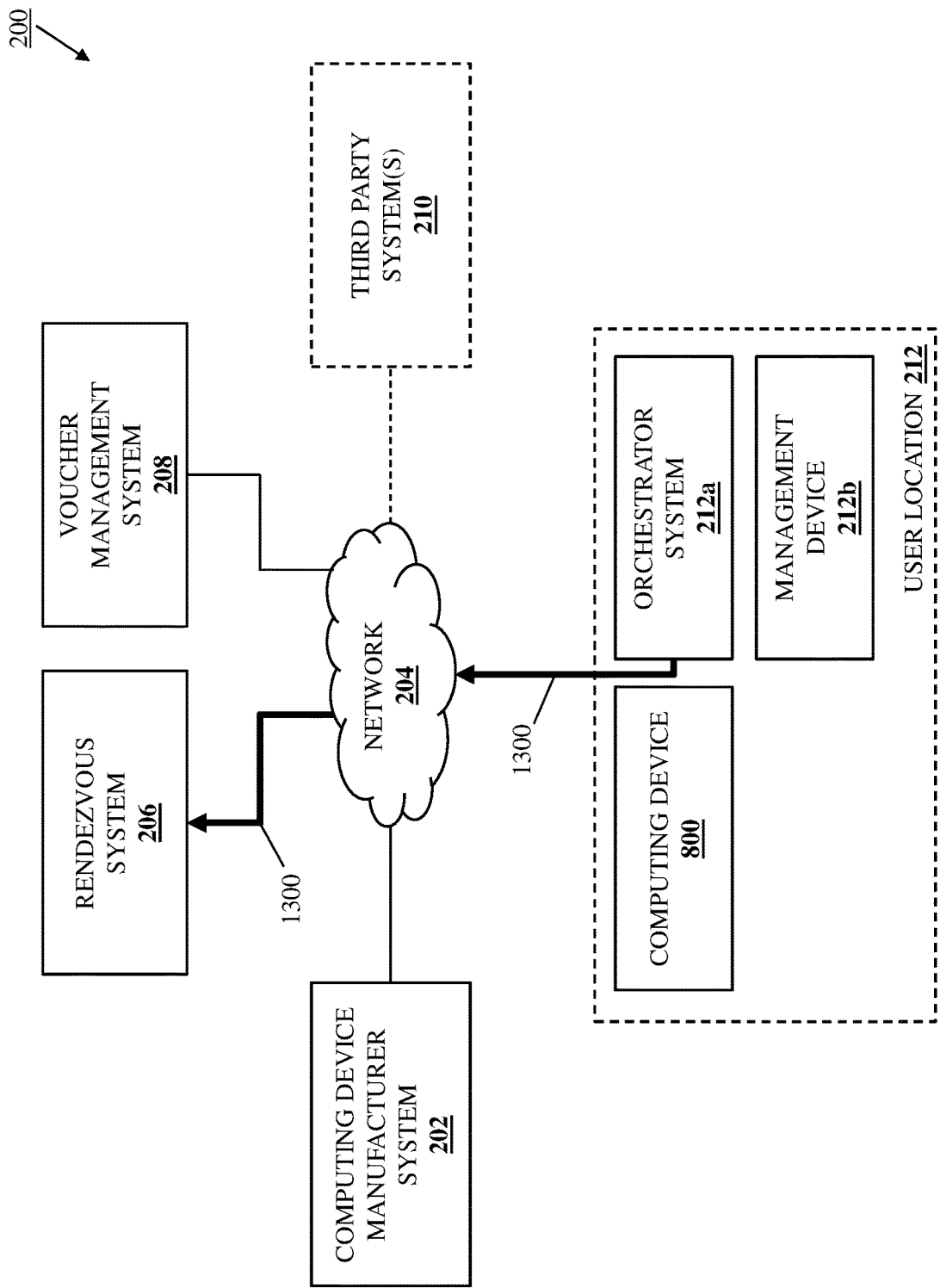
FIG. 13 is a schematic view illustrating an embodiment of the networked system of FIG. 2 operating during the method of FIG. 5.

The method 500 then proceeds to block 514 where the last owner system uses the ownership voucher and the hardware attestation certificate. With reference to FIG. 13, in an embodiment of block 514 and in response to receiving the ownership voucher 700, the orchestrator system 212a may perform rendezvous system registration operations 1300 that include registering with the rendezvous system 206 via the network 204. For example, the rendezvous system registration operations 1300 may include FDO-TOO protocol operations such as the orchestration system 212a performing a hashing operation on the ownership voucher 700 to generate an ownership voucher hash value, and providing that ownership voucher hash value to the rendezvous system 206, which one of skill in the art in possession of the present disclosure will recognize may operate to announce to the rendezvous system 206 that the orchestrator system 212a owns the computing device 800.

Figure 14:
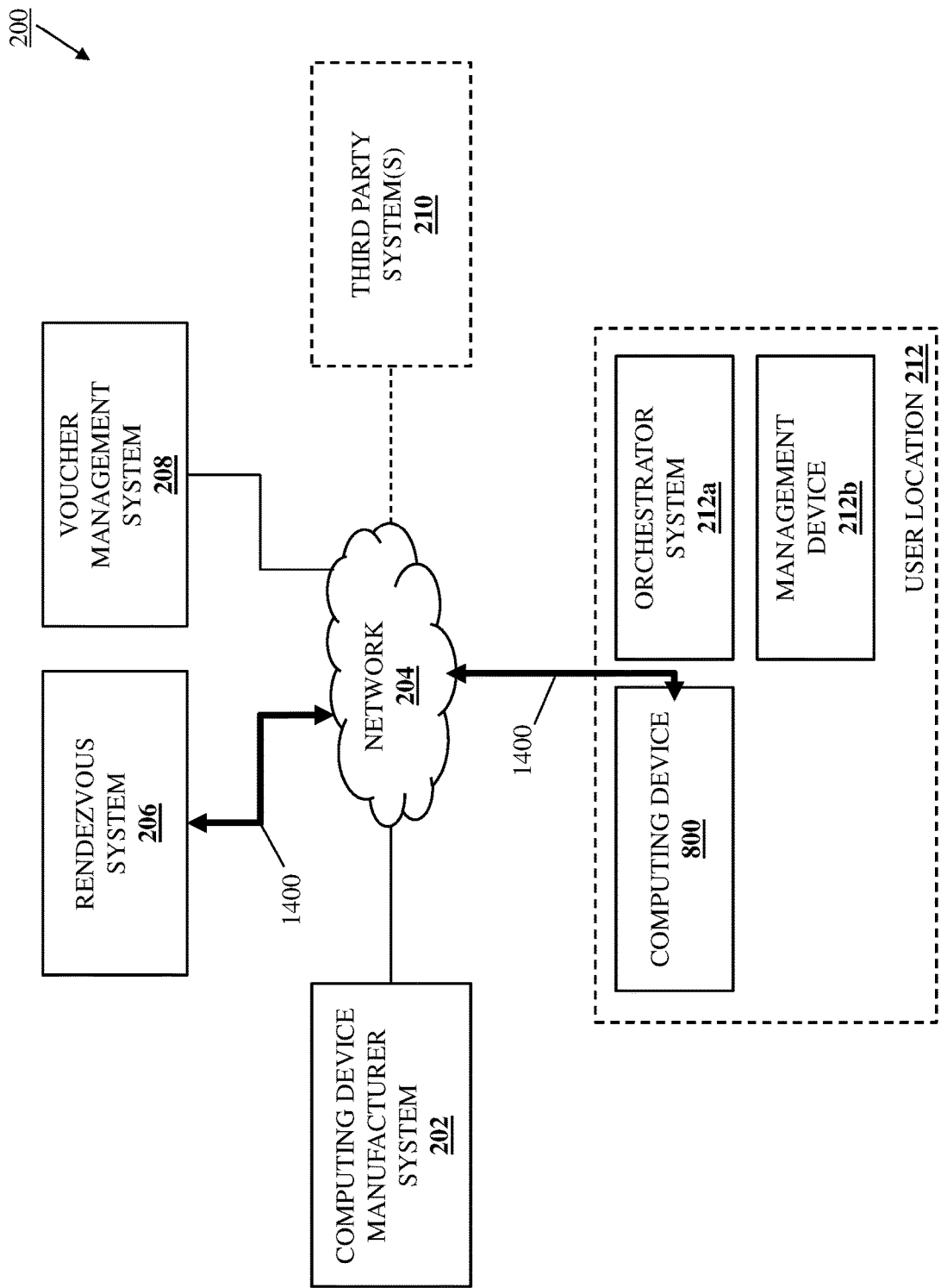
FIG. 14 is a schematic view illustrating an embodiment of the networked system of FIG. 2 operating during the method of FIG. 5.

With reference to FIG. 14, in an embodiment of block 514 and in response to being powered on, the computing device 800 may perform owner identification operations 1400 that include communicating with the rendezvous system 206 via the network 204 to identify the owner of the computing device 800. For example, the owner identification operations 1400 may include FDO-TO1 protocol operations such as the rendezvous system 206 using the communications with the computing device 800 to identify the ownership voucher hash value received from the orchestration system 212a, and then redirecting the computing device 800 to the orchestrator system 212a.

Figure 15:
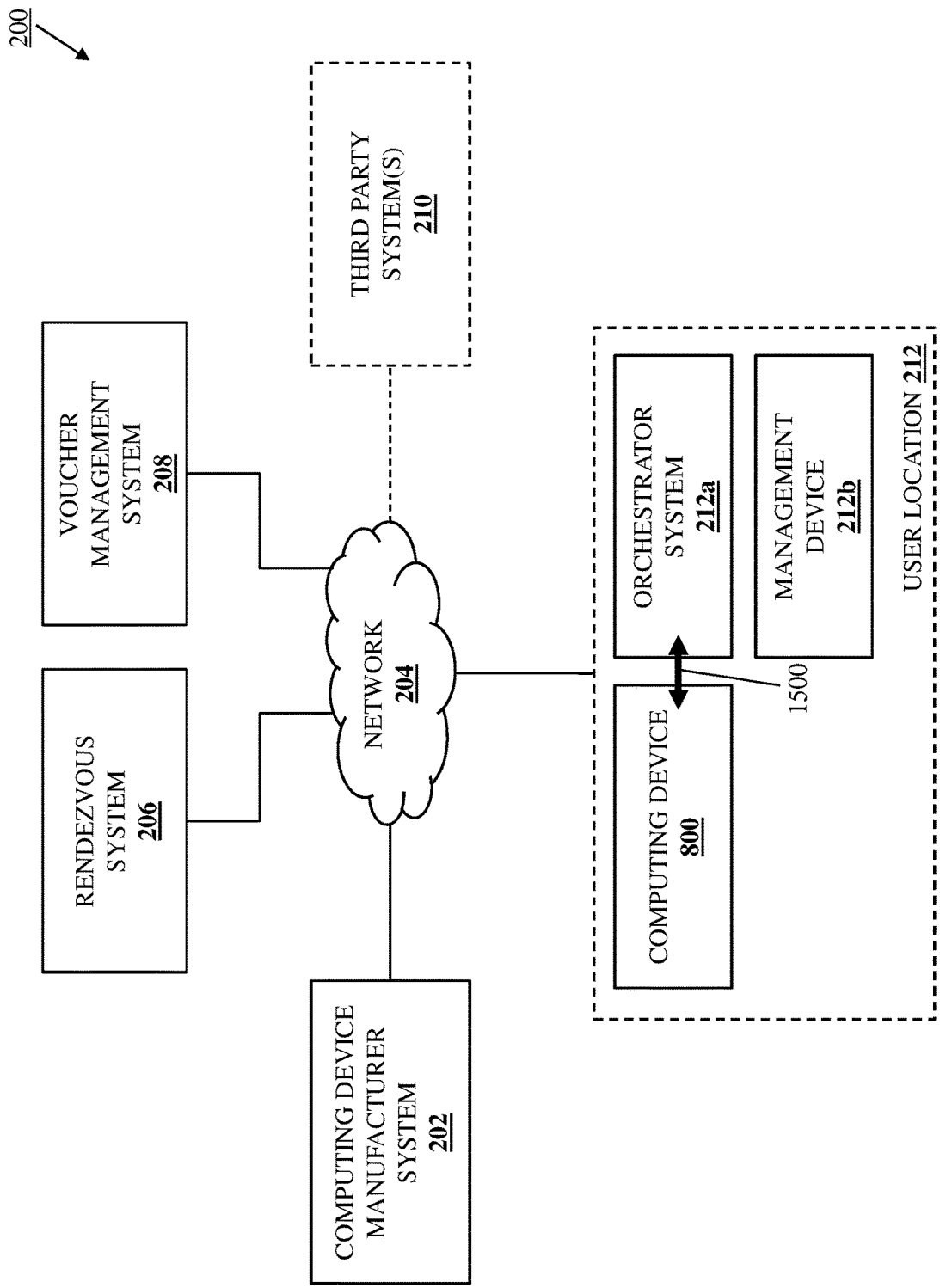
FIG. 15 is a schematic view illustrating an embodiment of the networked system of FIG. 2 operating during the method of FIG. 5.
Figure 16:
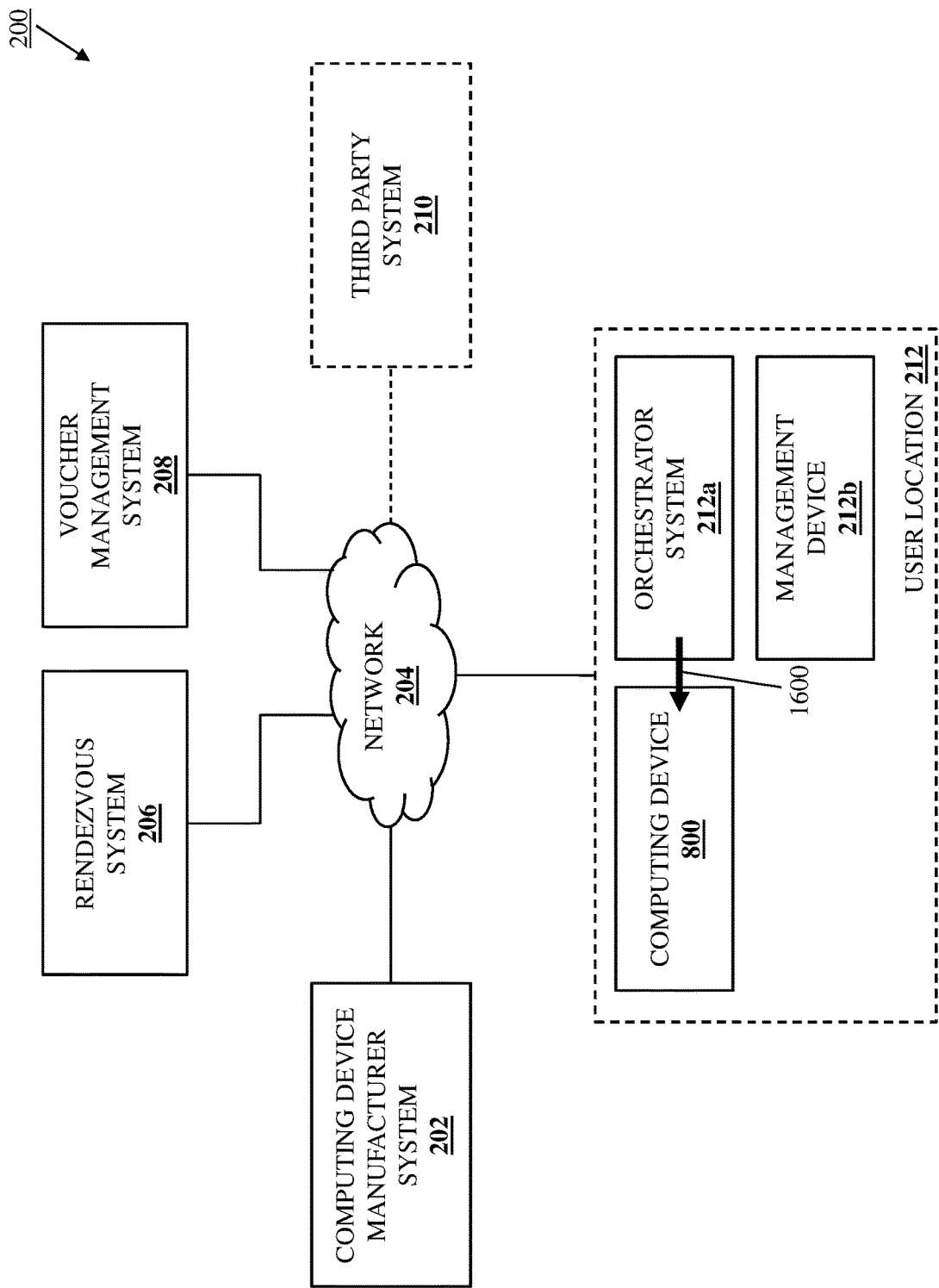
FIG. 16 is a schematic view illustrating an embodiment of the networked system of FIG. 2 operating during the method of FIG. 5.

With reference to FIG. 15, in an embodiment of block 514 and in response to being redirected to the orchestrator system 212a by the rendezvous system 206, the computing device 800 may perform authentication operations 1500 with the orchestrator system 212a. For example, the authentication operations 1500 may include FDO-TO2 protocol operations such as the orchestrator system 212a signing a nonce with its OS private key to generate an OS-private-key-signed nonce, transmitting the OS-private-key-signed nonce along with the ownership voucher 700 to the computing device 800, and the computing device 800 verifying the OS-private-key-signed nonce using the OS public key of the orchestrator system 212a, which one of skill in the art in possession of the present disclosure will recognize proves that orchestrator system 212a has control of the OS private key.

Similarly, the computing device 800 may sign a nonce with its computing device private key to generate a computing-device-private-key-signed nonce, transmit the computing-device-private-key-signed nonce to the orchestrator system 212a, with the orchestrator system 212a verifying the computing-device-private-key-signed nonce using the computing device public key of the computing device, which one of skill in the art in possession of the present disclosure will recognize proves that computing device 800 has control of the computing device private key. The computing device 800 may then retrieve the computing device manufacturer public key 702 from the ownership voucher 700, verify the computing device manufacturer public key 702, and then verify the CDMS-private-key-signed encoded VMS public key 704 and the VMS-private-key-signed encoded OS public key 1200 in the ownership voucher 700, which one of skill in the art in possession of the present disclosure will recognize verifies the chain of ownership secured by the private key signatures to authenticate the orchestrator system 212a as the owner of the computing device 800.

Furthermore, in an embodiment of block 514 and in response to receiving the hardware attestation certificate, the orchestrator system 212a may perform hardware attestation operations 1300 that include utilizing the hardware attestation certificate to verify that the hardware in the computing device 800 has not been altered subsequent to its manufacture. For example, the orchestrator system 212a may include an SCV application (or other TCG applications known in the art) that is configured to identify an inventory of the computing device 800, compare the inventory identified for the computing device 800 to the information identified as the inventory of the computing device that was ordered by the end user and manufactured by the computing device manufacturer system 202 and that is encoded in the hardware attestation certificate, and determine whether they match. For example, as discussed above, the orchestrator system 212a may verify a computing-device-manufacturer-private-key-signed nonce using the computing device manufacture public key of the computing device manufacturer in order to verify that computing device 800 has control of the computing device manufacturer private key that may have also been used to sign the hardware attestation certificate (e.g., a platform hardware attestation certificate), and thus any mismatch between the inventory identified for the computing device 800 to the information identified as the inventory of the computing device that is encoded in the hardware attestation certificate (e.g., due to the addition or replacement of Peripheral Component Interconnect express (PCIe) components in PCIe slots) will cause the hardware attestation to fail.

Following a match between the inventory identified for the computing device 800 and the information identified as the inventory of the computing device that is encoded in the hardware attestation certificate, a host operating system agent in the computing device 800 may retrieve the hardware attestation certificate from the orchestrator system 212a, and in some cases may perform a variety of platform certificate validation operations that would be apparent to one of skill in the art in possession of the present disclosure in order to validate a "chain-of-trust" for the platform hardware attestation certificate using a Certificate Authority (CA) provided by the computing device manufacturer system 202 (e.g., a DELL® CA provided by DELL® Inc. of Round Rock, Texas, United States in the examples above).

As will be appreciated by one of skill in the art in possession of the present disclosure, the hardware attestation operations discussed above may require a match between the inventory identified for the computing device 800 and the information identified as the inventory of the computing device that is encoded in the hardware attestation certificate in order to verify that the computing device 800 has not been altered subsequent to its manufacture prior to the use of the ownership voucher as discussed above to onboard the computing device 800 to the user location 212. As such, in the event a mismatch is identified between the inventory identified for the computing device 800 to the information identified as the inventory of the computing device that is encoded in the hardware attestation certificate, the orchestrator system 212a may prevent the computing device 800 from being onboarded to the user location 212.

As such, one of skill in the art in possession of the present disclosure will recognize that the computing device 800 may be utilized at the user location 212 following block 514. Thus, the "direct" computing-device-manufacturer-to-end-user scenario described above allows ownership of the computing device 800 to be transferred by the computing device manufacturer system 202 to the voucher management system 208, and then directly from the voucher management system 208 to the end user that ordered the computing device 800 without having any intermediate owners in between. However, as discussed below, an "indirect" computing-device-manufacturer-to-end-user scenario may be enabled in which ownership of the computing device 800 is transferred by the computing device manufacturer system 202 to the voucher management system 208, and then from the voucher management system 208 to one or more third parties ("intermediate owner(s)" in that example) before being transferred to the end user that ordered the computing device 800.

Figure 17B:
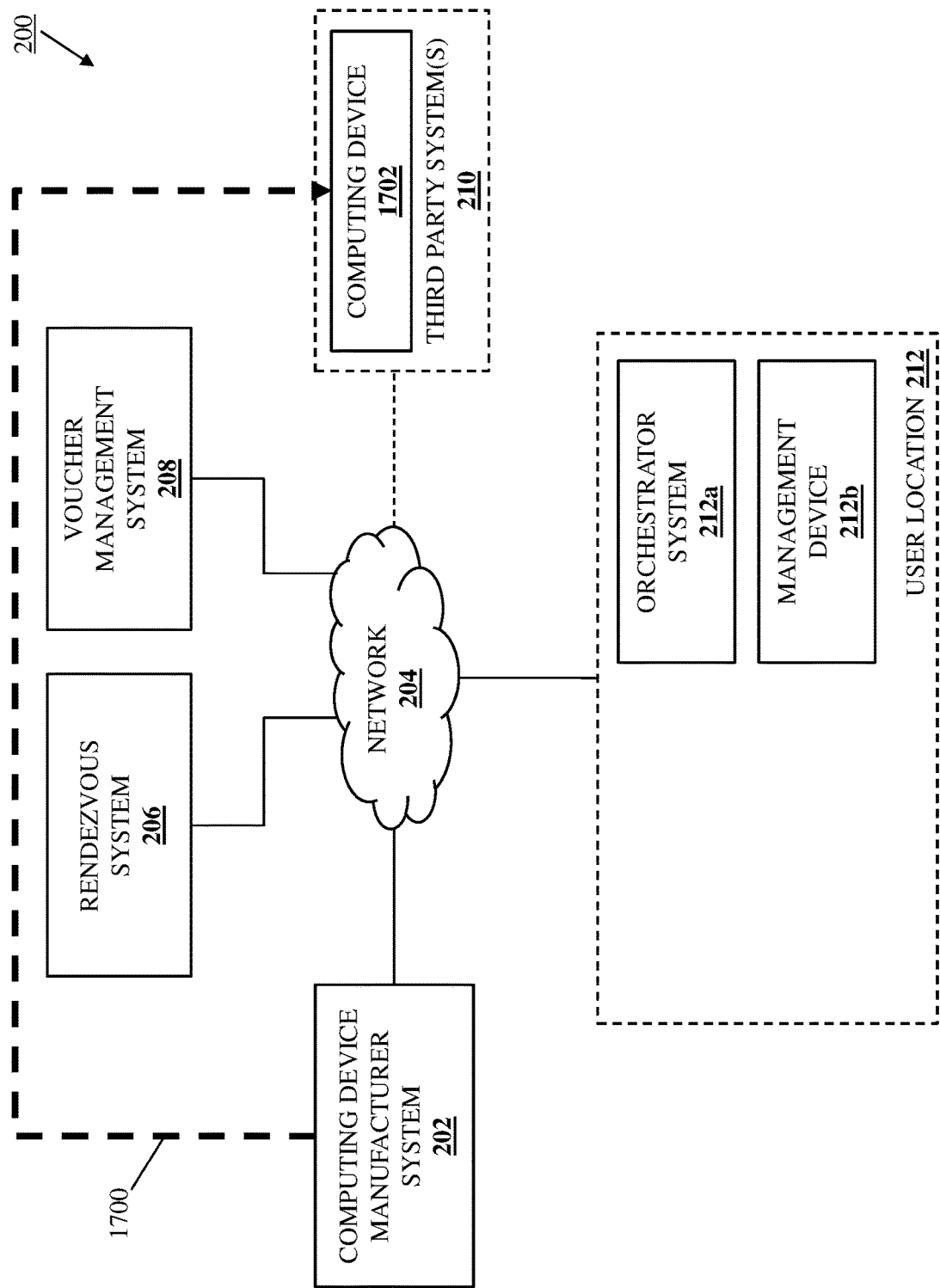
FIG. 17B is a schematic view illustrating an embodiment of the networked system of FIG. 2 operating during the method of FIG. 5.

In such an "indirect" computing-device-manufacturer-to-end-user scenario, block 502 may be modified such that, instead of the end user at the user location 212 ordering the computing device from the computing device manufacturer system 202, a third party (e.g., a reseller) may order the computing device from the computing device and system 202 in a manner similar to that described above between the end user and the computing device manufacturer system 202, with the end user at the user location 212 then ordering the computing device from the third party in a manner similar to that described above between the end user and the computing device manufacturer system 202. As such, with reference to FIGS. 17A and 17B, subsequent to the completion of the manufacturing of the computing device ordered by the third party, the computing device manufacturer system 300 may perform computing device provisioning operations 1700 that include the computing device provisioning subsystem 308 in the computing device manufacturer system 202/300 providing a computing device 1702 (which one of skill in the art in possession of the present disclosure will recognize is the computing device that was ordered by the third party as discussed above) to a location associated with the third party system 210. As will be appreciated by one of skill in the art in possession of the present disclosure, the computing device provisioning operations 1700 may be performed by shipping the computing device 1702 that was ordered by the third party and manufactured by the computing device manufacturer system 202/300 to the location associated with the third party system 210 for performing value-adds to the computing device 1702 (which may require the generation of the "delta" hardware attestation certificates discussed below), and/or otherwise providing for reselling to the end user. As such, following block 502, the computing device 1700 may be located at the location associated with the third-party system 210, and the ownership voucher 700 may be stored at the voucher management system 208 and may indicate that the voucher management system 208 owns the computing device 800.

Similarly as discussed above, in an embodiment of decision blocks 504 and 506, the third party that received the computing device 1702 at the location associated with third party system 210 may utilize the third party system 210 to perform voucher management system access operations that include accessing the voucher management system 208 via the network 204 in a manner similar to that discussed above by the end user. In response to authenticating the third party, the voucher management engine 404 in the voucher management system 208 may retrieve any computing device ordering information about computing device(s) ordered by the third party that was authenticated, use the computing device ordering information about computing device(s) ordered by the third party that was authenticated to identify any ownership vouchers/hardware attestation certificates in the voucher management database 406, and provide any of the ownership vouchers and hardware attestation certificates identified for the third party for display on the third party system 210. As such, one of skill in the art in possession of the present disclosure will recognize that the voucher management system 208 may provide a single, centralized location/source for third party to review any ownership vouchers that define the ownership of any computing devices ordered by the third party, as well as any hardware attestation certificates. As will be appreciated by one of skill in the art in possession of the present disclosure, such a single, centralized location/source for ownership voucher and hardware attestation certificate review may be particularly beneficial to third parties that order hundreds, and even thousands, of computing devices from the computing device manufacturer.

Similarly as described above, an embodiment of decision blocks 504 and 506 may include the third party using the third party system 210 to select one or more ownership vouchers that were provided for display by the voucher management system 208 on the third party system 210 in order to transmit the ownership transfer request for those ownership vouchers. Continuing with the example of the ownership voucher 700 discussed above, the third party may use the third-party system 210 to select the ownership voucher 700 in order to transmit the ownership transfer request that is received by the voucher management system 208 at decision block 504, and the method will then proceed to block 508 due to the third party being an "intermediate owner" of the computing device 1702.

Thus, returning to decision block 506, if the ownership transfer is to an intermediate owner, the method 500 proceeds to block 516 where the voucher management system automatically generates an intermediate owner public/private key pair. In an embodiment, at block 516, the voucher management engine 404 in the voucher management system 208/400 may generate a third-party public/private key pair (e.g., prior to the transfer of ownership of the computing device to that third party, in response a request to transfer ownership of the computing device to that third party, etc.) for any third party (an "intermediate owner" in this example) that takes possession of a computing device for eventual provisioning to an end user, and may store that third-party public/private key pair in its voucher management database 408. However, while the voucher management system 208 is described as generating the third-party public/private key pair described herein, one of skill in the art in possession of the present disclosure will appreciate how a third party may generate its own third-party public/private key pair (and provide its third-party public key to the voucher management system 208 for use as discussed below) in other embodiments while remaining within the scope of the present disclosure as well.

Figure 18A:
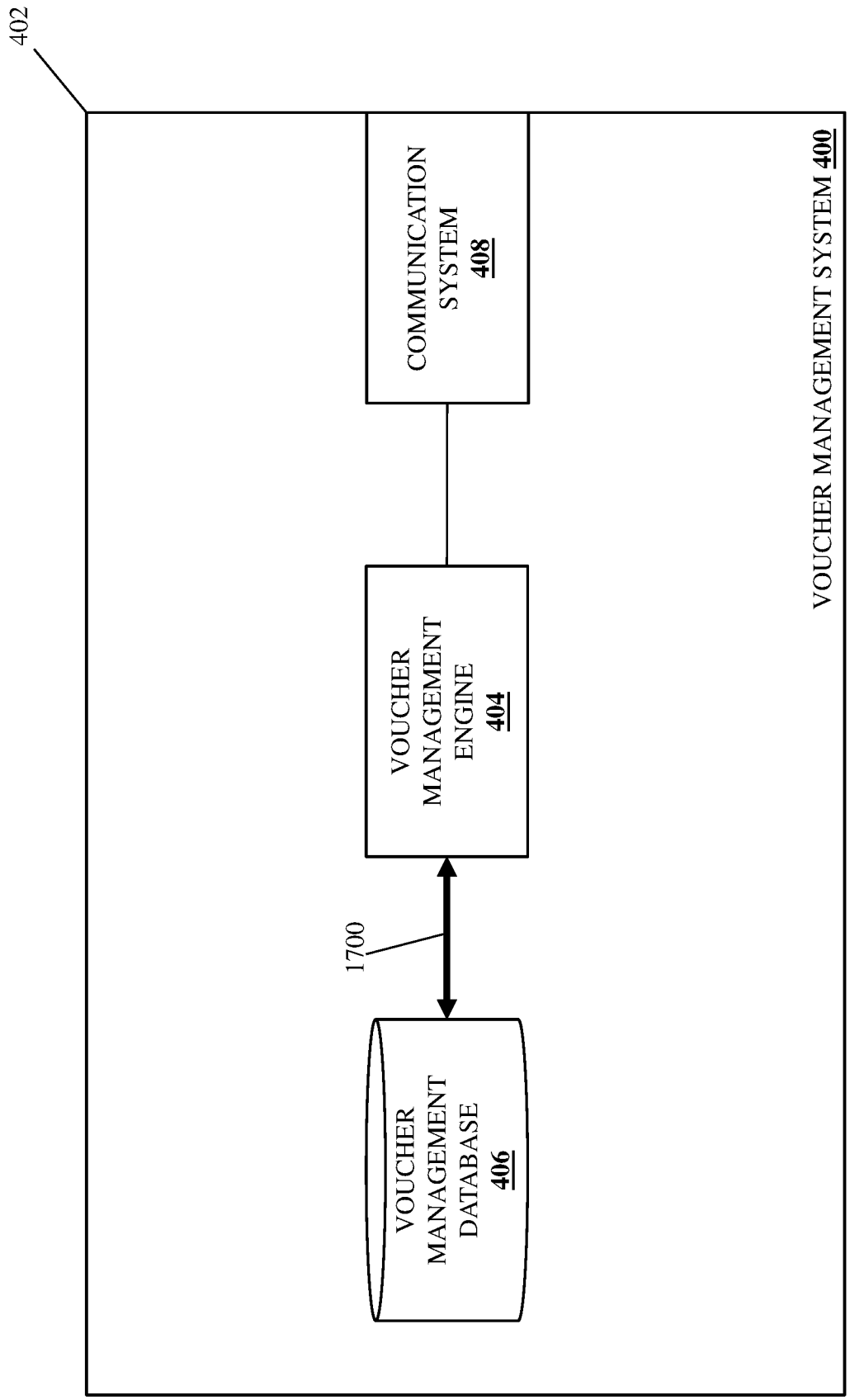
FIG. 18A is a schematic view illustrating an embodiment of the voucher management system of FIG. 4 operating during the method of FIG. 5.

The method 500 then proceeds to block 518 where the voucher management system automatically generates intermediate owner ownership transfer data. With reference to FIG. 18A, in an embodiment of block 518 and in response to receiving the ownership transfer request for the computing device 1702, the voucher management engine 404 in the voucher management system 208/400 may perform intermediate owner ownership transfer data generation operations 1700 that include using a VMS private key controlled by the voucher management system 208/400 to sign an encoded third party public key of the third party system 210 to generate a VMS-private-key-signed encoded third party public key 1800.

In a specific example, the voucher management engine 404 may generate the VMS-private-key-signed encoded third party public key 1800 according to the FDO protocol by using the third party public key of the third party system 210 that was generated by the voucher management system 208/400 (or received from the third party system 210) as discussed above, and performing a hashing operation on that third party public key, a GUID for the computing device 1702, computing device information associated with the computing device 1702 (e.g., serial number(s), MAC address(es), etc.), and/or other any other information that would be apparent to one of skill in the art in possession of the present disclosure in order to generate an encoded third party public key. The voucher management engine 404 may then sign that encoded third party public key with the VMS private key to provide the VMS-private-key-signed encoded third-party public key 1800. However, while a specific example of the generation of intermediate owner ownership transfer data provided by the VMS-private-key-signed encoded third party public key 1800 has been described, one of skill in the art in possession of the present disclosure will appreciate how the voucher management engine 404 may perform other operations according to the FDO protocol in order to transfer ownership of the computing device 800 to a third party system 210 using the ownership voucher 700 while remaining within the scope of the present disclosure.

Figure 18B:
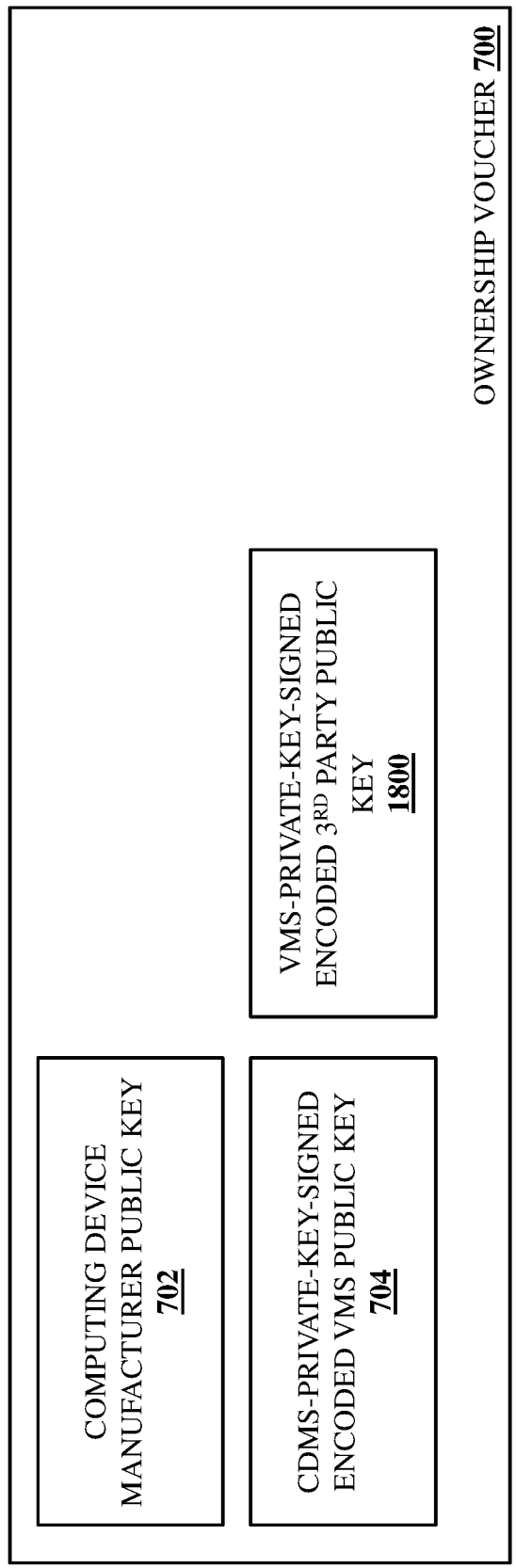
FIG. 18B is a schematic view illustrating an embodiment of the ownership voucher of FIG. 7A that may have been modified during the method of FIG. 5.

The method 500 then proceeds to block 520 where the voucher management system provides the intermediate owner ownership transfer data in the ownership voucher to transfer ownership of the computing device to an intermediate owner system. With reference to FIG. 18B, in an embodiment of block 520, the voucher management engine 404 in the voucher management system 208/400 may perform ownership transfer operations that include providing the VMS-private-key-signed encoded third-party public key 1800 generated as discussed above in the ownership voucher 700. As will be appreciated by one of skill in the art in possession of the present disclosure, the CDMS-private-key-signed encoded VMS public key 704 provides for the transfer of the ownership of the computing device 800 from the computing device manufacturer system 202 to the voucher management system 208, allowing the VMS-private-key-signed encoded third party public key 1800 to provide for the transfer of the ownership of the computing device 800 from the voucher management system 208 to a third party system 210. However, contrary to the "direct" computing-device-manufacturer-to-end-user scenario in which the ownership voucher 700 is provided to the orchestrator system 212a at the user location 212, in the "indirect" computing-device-manufacturer-to-end-user scenario the ownership voucher 700 may be stored in the voucher management database 408 of the voucher management system 208/400, although situations in which the ownership voucher 700 (or at least a copy of the ownership voucher 700) are provided to the third party system 210 are envisioned as falling within the scope of the present disclosure as well.

The method 500 then proceeds to decision block 522 where it is determined whether an ownership transfer request has been received. In an embodiment, at decision block 522 and following the transfer of ownership of the computing device 1702 to an intermediate owner (i.e., one of the third parties discussed above), the voucher management engine 404 in the voucher management system 208/400 may monitor for an ownership transfer request similarly as discussed above. If, at decision block 522, it is determined that an ownership transfer request has not been received, the method 500 returns to decision block 522. As such, the method 500 may loop as long as the voucher management system has not received an ownership transfer request. If, at decision block 522, it is determined that an ownership transfer request has been received, the method 500 proceeds to decision block 524 where the method 500 proceeds similarly as described above depending on whether the ownership transfer is to a last owner or an intermediate owner.

If, at decision block 524, it is determined that the ownership transfer is to an intermediate owner, the method 500 returns to block 516. As such, the method 500 may loop such that the voucher management system 208 performs blocks 516, 518, and 520 to transfer ownership of the computing device 1702 to any further third parties/intermediate owners using the ownership voucher 700 similarly as described above. For example, to transfer ownership from the "1$^{st}$ third party" discussed above to a "2$^{nd}$ third party", the voucher management system 208 may provide a 2$^{nd}$-third-party-private-key-signed encoded 1$^{st}$ third party public key in the ownership voucher 700 similarly as described above, with the CDMS-private-key-signed encoded VMS public key 704 providing for the transfer of the ownership of the computing device 800 from the computing device manufacturer system 202 to the voucher management system 208, and the VMS-private-key-signed encoded "1$^{st}$" third party public key 1800 providing for the transfer of the ownership of the computing device 800 from the voucher management system 208 to a 1$^{st}$ third party system 210, allowing the 2$^{nd}$-third-party-private-key-signed encoded 1$^{st}$ third party public key to provide for the transfer of the ownership of the computing device 800 from the 1$^{st}$ third party system 210 to a 2$^{nd}$ third party system 210. One of skill in the art in possession of the present disclosure will appreciate how this process may be repeated for any further intermediate owners prior to the last owner.

Figure 19:
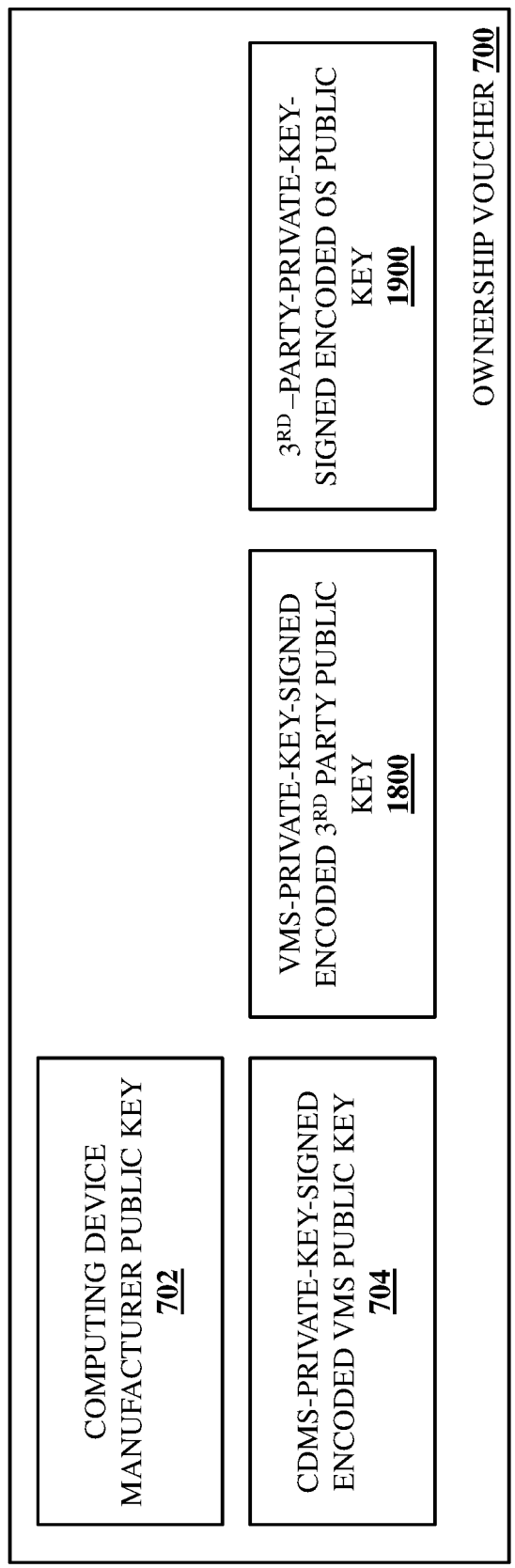
FIG. 19 is a schematic view illustrating an embodiment of the ownership voucher of FIG. 7A that may have been modified during the method of FIG. 5.

If, at decision block 524, it is determined that the ownership transfer is to a last owner, the method 500 proceeds to blocks 508, 510, 512, and 514 as discussed above. With reference to FIG. 19, continuing with the specific example above that includes one third party between the computing device manufacturer and the end user, one of skill in the art in possession of the present disclosure will appreciate how the performance of blocks 508, 510, 512, and 514 following the performance of blocks 516, 518, and 520 as discussed above may result in the voucher management system 208/400 providing a third-party-private-key-signed encoded OS public key 1900 in the ownership voucher 700 similarly as described above, with the CDMS-private-key-signed encoded VMS public key 704 providing for the transfer of the ownership of the computing device 800 from the computing device manufacturer system 202 to the voucher management system 208, and the VMS-private-key-signed encoded third party public key 1800 providing for the transfer of the ownership of the computing device 800 from the voucher management system 208 to the third party system 210, allowing the third-party-private-key-signed encoded OS public key 1900 to provide for the transfer of the ownership of the computing device 800 from the third party system 210 to the orchestrator system 212b.

Furthermore, with reference to FIG. 20, the third-party system 210 may perform computing device provisioning operations 200 that include providing the computing device 1702 (which one of skill in the art in possession of the present disclosure will recognize is the computing device that was ordered by the end user from the third party in a manner similar to that described above between the end user and the computing device manufacturer) to the user location 212. As will be appreciated by one of skill in the art in possession of the present disclosure, the computing device provisioning operations 2000 may be performed by shipping the computing device 1702 that was ordered by the end user from the third party (e.g., a reseller buying the computing device 1702 that was manufactured by the computing device manufacturer system 202/300) to the user location 212. As such, one of skill in the art in possession of the present disclosure will recognize that the computing device 1702 may be utilized at the user location 212 following block 514.

As will be appreciated by one of skill in the art in possession of the present disclosure, in some situations it may be desirable to change the ownership of the computing device 800/1702 to another orchestrator system at the user location 212 or in another user location. In such situations, the computing device 800/1702 may be reset to a factory state (e.g., using a reset command provided by the orchestrator system 212a, via the use of a reset button the computing device 800/1702, or using other reset techniques known in the art). The end user may then access the voucher management system 208 again as described with reference to FIG. 10A and perform the subsequent process described above to onboard the computing device to a different orchestrator system, as the voucher management system 208 will store or otherwise maintain the ownership voucher 700 received from the computing device manufacturer, while the orchestrator system 212a will store or otherwise maintain the ownership voucher 700 that transferred ownership of the computing device 800/1702 to the orchestrator system 212a.

As will be appreciated by one of skill in the art in possession of the present disclosure, some edge computing devices (e.g., Internet of Things (IoT) computing devices) may be provided by relatively low-cost disposable devices that are not intended to have any of their hardware modified (e.g., added, replaced, etc.), and thus the platform hardware attestation certificates provided by the computing device manufacturer system 200 may be sufficient to verify that the hardware in a computing device has not been modified subsequent to the manufacture of that computing device throughout its lifetime. However, some edge computing devices provided according to the teachings of the present disclosure (e.g., server devices) may support hardware modification (e.g., addition, replacement, etc.), and thus may require the ability to control such hardware modification and verify that such hardware modification is performed in compliance with security policies. As such, the user location 212 or the third-party systems 210 may be configured as discussed below to generated "delta" hardware attestation certificates that allow for the verification of hardware added to a computing device subsequent to its manufacture. Furthermore, while the configuration and operation of the user location to generate "delta" hardware attestation certificates is described below, one of skill in the art in possession of the present disclosure will appreciate how the third party system(s) 210 may be configured to operate similarly in order to, for example, generate "delta" hardware attestation certificate for "value-adds" to a computing devices while the computing device are in their possession while remaining within the scope of the present disclosure as well.

In an embodiment in which a hardware change will be made to a computing device at the user location (e.g., the computing device 800 discussed above in this example), an end user at the user location 212 may use the management device 212b to access the orchestrator system 212a to initiate that hardware change to the computing device 800 by, for example, identifying a hardware change (e.g., removal of a particular component, addition of a particular component, etc.) in the computing device 800 via an "inventory view" of the computing device 800 provided by the orchestrator system 212a for display on the management device 212b (e.g., via a management Graphical User Interface (GUI) generated for the computing device 800). In response, the orchestrator system 212a may instruct a host operating system agent in the computing device 800 to identify an expected inventory of the computing device 800 that will exist with the hardware change discussed above (e.g., an inventory of the computing device with a particular component removed, a particular component added, etc.), generate an "expected" delta CSR for an "expected" delta hardware attestation certificate similarly as described above for the "platform" hardware attestation certificate, and provide the expected delta CSR to the orchestrator system 212a.

In a specific example, the host operating system agent in the computing device 800 may generate the expected delta CSR for the expected delta hardware attestation certificate by determining an authorized inventory defined by the information encoded in the platform hardware attestation certificate and any existing "delta" hardware attestation certificate (which may have previously been generated similarly as described herein), identifying differences between the hardware changes identified by the end user and that authorized inventory, and using a computing device private key stored in a TPM in the computing device 800 in order to generate an expected delta CSR that identifies those differences. The host operating system agent in the computing device 800 may then provide that expected delta CSR to the orchestrator system 212a. However, while specific techniques for generating the expected delta CSR have been described, one of skill in the art in possession of the present disclosure will appreciate how the expected delta CSR of the present disclosure may be generated using other techniques while remaining within the scope of the present disclosure as well.

The expected delta CSR may then be used to have the computing device manufacturer system 202 sign an expected delta hardware attestation certificate for the computing device 800 that is configured to verify that the computing device 800 with the hardware including the hardware changes discussed above has not been modified subsequent to those hardware changes. For example, the end user may utilize the management device 212b to retrieve the expected delta CSR from the orchestrator system 212a, and may transmit that expected delta CSR to the voucher management system 208 using a secure API or other secure transmission techniques that would be apparent to one of skill in the art in possession of the present disclosure. The voucher management system 208 may then provide the expected delta CSR to the computing device manufacturing system 202 in order to have the computing device provisioning system 308 sign an expected delta hardware attestation certificate similarly as described above for the platform hardware attestation certificate, and may provide the expected delta hardware attestation certificate back to the orchestrator system 212a. Similarly as discussed above, the SCV application in the orchestrator system 212a may then validate the "chain-of-trust" for the expected delta hardware attestation certificate.

Following validation of the expected delta hardware attestation certificate, the orchestrator system 212a may then provide the expected delta hardware attestation certificate to the host operating system agent in the computing device 800, which may also operate to validate the "chain-of-trust" for the expected delta hardware attestation certificate and, in response, store the expected delta hardware attestation certificate in a database in the computing device 800 (e.g., separate from the "existing" delta hardware attestation certificate(s) discussed above) in preparation for the subsequent hardware changes that will be made to the computing device 800. When the end user performs the hardware changes on the computing device 800, the host operating system agent in the computing device 800 will detect the hardware change, identify a current inventory of the hardware in the computing device 800, and determine whether that current inventory matches the platform hardware attestation certificate, any existing delta hardware attestation certificates, and the expected delta hardware attestation certificate that was generated as discussed above in expectation of that hardware change.

In response to a match of the current inventory with the platform hardware attestation certificate, any existing delta hardware attestation certificates, and the expected delta hardware attestation certificate that was generated as discussed above in expectation of that hardware change, the host operating system agent may redesignate the "expected" delta hardware attestation certificate as an "existing" delta hardware attestation certificate by, for example, storing it with the existing delta hardware attestation certificate(s) in a database in the computing device 800, and may identify an updated inventory for the computing device 800 to the orchestrator system 212a. As will be appreciated by one of skill in the art in possession of the present disclosure, in response to a mismatch of the current inventory with the platform hardware attestation certificate, any existing delta hardware attestation certificates, and the expected delta hardware attestation certificate that was generated as discussed above in expectation of that hardware change, the host operating system agent may alert the orchestrator system 212a, prevent activation of, or disable, any device or slot that is associated with the mismatch, and may require subsequent authorization in order to allow activation or enablement of that device or slot. As such, hardware changes may be made by end users or resellers to the computing device, while still allowing an authorized inventory of that computing device to be validated in order to verify that no unauthorized changes are subsequently made to the computing device.

Furthermore, the hardware attestation certificate may also be used subsequently in order to perform periodic hardware monitoring and hardware "drift" detection for the computing device 800. As discussed above, computing devices (and particularly edge computing devices) are vulnerable to infiltration, and periodic or continuous monitoring of hardware in the computing device 800 may allow for the provisioning of alerts and possible mitigation in the event a hardware "drift" or other hardware change in the computing device 800 occurs. As will be appreciated by one of skill in the art in possession of the present disclosure, the computing device 800 may include a secure compute environment having a host operating system agent that performs secure communications between the computing device 800 and the orchestrator system 212a, and that host operating system agent may retrieve the platform hardware attestation certificates and the delta hardware attestation certificates discussed above, verify the "chain-of-trust" of each of those certificates, and store those certificates in the computing device 800.

The host operating system agent may then periodically identify the current inventory of the computing device 800, and verify that current inventory by comparing it with the information about the inventory of the computing device 800 that is included in the combination of the platform hardware attestation certificate and any delta hardware attestation certificates. In the event the host operating system agent detects a mismatch between the current inventory and the information about the inventory of the computing device 800 that is included in the combination of the platform hardware attestation certificate and any delta hardware attestation certificates, it may alert the orchestrator system 212a, prevent activation of or disable any device or slot that is associated with the mismatch, and may require subsequent authorization in order to allow activation or enablement of that device or slot. As will be appreciated by one of skill in the art in possession of the present disclosure, the monitoring and detection of such hardware "drift" within a computing device may prevent potential infiltration attempts via the addition or modification of unauthorized components in the computing device, and the activation prevention or disablement in the event of such hardware "drift" via the host operating system agent may provide particular benefits in situations where the computing device may be disconnected from orchestrator systems for extended time periods (e.g., when provided in a vehicle, ship, or other location that may have intermittent or occasional network connectivity).

Thus, systems and methods have been described that provide an ownership voucher management system that manages ownership vouchers utilized in the FDO protocol and hardware attestation certificates in order to facilitate the transfer of ownership of a computing device from a first owner to a last owner, and in some cases between one or more intermediate owners between the first owner and the last owner, while also providing for verification that hardware in the computing device has not been modified. For example, the FDO protocol ownership voucher management system of the present disclosure may be provided in a networked system including a first owner system and a second owner system coupled to a voucher management system. The voucher management system receives, from the first owner system, an ownership voucher having first ownership transfer data including a voucher management system public key that has been signed by a first owner system private key in order to transfer ownership of a computing device from the first owner system to the voucher management system, as well as a hardware attestation certificate. The voucher management system determines that the ownership of the computing device should be transferred to the second owner system and, in response, automatically generates second ownership transfer data by signing a second owner system public key with a voucher management system private key, and provides the second ownership transfer data in the ownership voucher in order to transfer ownership of the computing device from the voucher management system to the second owner system, and provides the hardware attestation certificate to the second owner system.

As such, ownership voucher transfer from a computing device manufacturer to an end user is simplified without breaking the FDO protocol (via the use of FDO-TO protocols at each transfer point) and without requiring end users/last owners or third parties/intermediate owners to provide, operate, and maintain FDO protocol support systems, while also providing for the verification that hardware in those computing device has not been modified. Thus, a cryptographically secure, "zero-touch" experience is provided for ownership voucher transfer from a computing device manufacturer to an orchestrator system, thus allowing "zero-touch" securing onboarding of computing devices to the orchestrator system. As discussed above, the systems and methods of the present disclosure enable migration of computing devices between orchestrator systems, while also enabling computing device ordering either directly from the computing device manufacturer or through resellers while still maintain secure FDO protocol ownership transfers. As will be appreciated by one of skill in the art in possession of the present disclosure, the systems and methods of the present disclosure may be combined with zero-touch automation techniques to enable relatively large-scale secure FDO protocol onboarding of hundreds (or even thousands) of computing devices simultaneously.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networked system, comprising:
   a computing device manufacturer system;
   an end user system; and
   a voucher management system that is coupled to the computing device manufacturer system and the end user system via a network, wherein the voucher management system is configured to:
      receive, from the computing device manufacturer system:
         an ownership voucher having first ownership transfer data including a voucher management system public key that has been signed by a computing device manufacturer system private key in order to transfer ownership of a computing device from the computing device manufacturer system to the voucher management system; and a hardware attestation certificate for the computing device that identifies a hardware inventory of the computing device and that is configured to verify that the computing device has not been altered subsequent to its manufacture;

associate the ownership voucher and the hardware attestation certificate with the computing device in a voucher management database; and determine that the ownership of the computing device should be transferred to the end user system and, in response:

automatically generate, in response to determining that ownership of the computing device should be transferred to the end user system, second ownership transfer data by signing an end user system public key with a voucher management system private key;

provide the second ownership transfer data in the ownership voucher in order to transfer ownership of the computing device from the voucher management system to the end user system; and provide the ownership voucher and the hardware attestation certificate to the end user system.

2. The system of claim 1, wherein the voucher management system is configured to:

retrieve the end user system public key that is signed by the voucher management system private key from the end user system.

3. The system of claim 1, wherein the voucher management system is configured to:

receive, from the computing device manufacturer system along with the ownership voucher, an end user system identifier identifying the end user system; and associate the end user system identifier with the ownership voucher and the hardware attestation certificate in the voucher management database.

4. The system of claim 1, wherein the voucher management system is configured to:

receive, from the end user system, authentication information;

authenticate, using the end user information, the end user system; and display, in response to authenticating the end user system and use the end user system identifier included in the authentication information, the ownership voucher and the hardware attestation certificate associated with the end user system identifier in the voucher management database.

5. The system of claim 1, wherein the hardware inventory of the computing device identified by the hardware attestation certificate is an inventory of the computing device ordered by an end user associated with the end user system.

6. The system of claim 1, wherein the hardware attestation certificate is signed with the computing device manufacturer system private key.

7. The system of claim 1, wherein the end user system is configured to:

use the hardware attestation certificate to verify that the computing device has not been altered subsequent to its manufacture; and use, in response to verifying that the computing device has not been altered subsequent to its manufacture, the ownership voucher to onboard the computing device.

8. An Information Handling System (IHS), comprising:
a processing system; and
a memory system that is coupled to the processing system and that includes instructions that, when executed by the processing system, cause the processing system to provide a voucher management engine that is configured to:

receive, from a computing device manufacturer system:
an ownership voucher having first ownership transfer data including a voucher management system public key that has been signed by a computing device manufacturer system private key in order to transfer ownership of a computing device from the computing device manufacturer system to the voucher management system; and a hardware attestation certificate for the computing device that identifies a hardware inventory of the computing device and that is configured to verify that the computing device has not been altered subsequent to its manufacture;

associate the ownership voucher and the hardware attestation certificate with the computing device in a voucher management database; and determine that the ownership of the computing device should be transferred to the end user system and, in response:

automatically generate, in response to determining that ownership of the computing device should be transferred to the end user system, second ownership transfer data by signing an end user system public key with a voucher management system private key;

provide the second ownership transfer data in the ownership voucher in order to transfer ownership of the computing device from the voucher management system to the end user system; and provide the ownership voucher and the hardware attestation certificate to the end user system.

9. The IHS of claim 8, wherein the voucher management engine is configured to:

retrieve the end user system public key that is signed by the voucher management system private key from the end user system.

10. The IHS of claim 8, wherein the voucher management engine is configured to:

receive, from the computing device manufacturer system along with the ownership voucher, an end user system identifier identifying the end user system; and associate the end user system identifier with the ownership voucher and the hardware attestation certificate in the voucher management database.

11. The IHS of claim 8, wherein the voucher management engine is configured to:

receive, from the end user system, authentication information;

authenticate, using the end user information, the end user system; and display, in response to authenticating the end user system and use the end user system identifier included in the authentication information, the ownership voucher and the hardware attestation certificate associated with the end user system identifier in the voucher management database.

12. The IHS of claim 8, wherein the hardware inventory of the computing device identified by the hardware attestation certificate is an inventory of the computing device ordered by an end user associated with the end user system.

13. The IHS of claim 8, wherein the hardware attestation certificate is signed with the computing device manufacturer system private key.

14. A method for Fast IDentity Online (FIDO) Device Onboarding (FDO) protocol computing device hardware attestation, comprising:
receiving, by a voucher management system from a computing device manufacturer system:
an ownership voucher having first ownership transfer data including a voucher management system public key that has been signed by a computing device manufacturer system private key in order to transfer ownership of a computing device from the computing device manufacturer system to the voucher management system; and
a hardware attestation certificate for the computing device that identifies a hardware inventory of the computing device and that is configured to verify that the computing device has not been altered subsequent to its manufacture;
associating, by the voucher management system, the ownership voucher and the hardware attestation certificate with the computing device in a voucher management database; and
determining, by the voucher management system, that the ownership of the computing device should be transferred to the end user system and, in response:
automatically generating, by the voucher management system in response to determining that ownership of the computing device should be transferred to the end user system, second ownership transfer data by signing an end user system public key with a voucher management system private key;
providing, by the voucher management system, the second ownership transfer data in the ownership voucher in order to transfer ownership of the computing device from the voucher management system to the end user system; and
providing, by the voucher management system, the ownership voucher and the hardware attestation certificate to the end user system.

15. The method of claim 14, further comprising:
retrieving, by the voucher management system, the end user system public key that is signed by the voucher management system private key from the end user system.

16. The method of claim 15, further comprising:
receiving, by the voucher management system from the computing device manufacturer system along with the ownership voucher, an end user system identifier identifying the end user system; and
associating, by the voucher management system, the end user system identifier with the ownership voucher and the hardware attestation certificate in the voucher management database.

17. The method of claim 14, further comprising:
receiving, by the voucher management system from the end user system, authentication information;
authenticating, by the voucher management system using the end user information, the end user system; and
displaying, by the voucher management system in response to authenticating the end user system and use the end user system identifier included in the authentication information, the ownership voucher and the hardware attestation certificate associated with the end user system identifier in the voucher management database.

18. The method of claim 17, wherein the hardware inventory of the computing device identified by the hardware attestation certificate is an inventory of the computing device ordered by an end user associated with the end user system.

19. The method of claim 18, wherein the hardware attestation certificate is signed with the computing device manufacturer system private key.

20. The method of claim 19, further comprising:
using, by the end user system, the hardware attestation certificate to verify that the computing device has not been altered subsequent to its manufacture; and
using, by the end user system in response to verifying that the computing device has not been altered subsequent to its manufacture, the ownership voucher to onboard the computing device.

\* \* \* \* \*